(12) United States Patent
Nedivi

(10) Patent No.: US 11,694,564 B2
(45) Date of Patent: *Jul. 4, 2023

(54) MAZE TRAINING PLATFORM

(71) Applicant: SHARELOOK PTE. LTD., Singapore (SG)

(72) Inventor: Raanan Nedivi, Singapore (SG)

(73) Assignee: SHARELOOK PTE. LTD., Singapore (SG)

( * ) Notice: Subject to any disclaimer, the term of this patent is extended or adjusted under 35 U.S.C. 154(b) by 46 days.

This patent is subject to a terminal disclaimer.

(21) Appl. No.: 17/378,756

(22) Filed: Jul. 18, 2021

(65) Prior Publication Data
US 2022/0005366 A1 Jan. 6, 2022

Related U.S. Application Data

(63) Continuation of application No. 16/773,992, filed on Jan. 28, 2020, now Pat. No. 11,069,250, which is a continuation-in-part of application No. 16/699,761, filed on Dec. 2, 2019, which is a continuation of application No. 16/015,203, filed on Jun. 22, 2018, now Pat. No. 10,497,272, which is a continuation-in-part of application No. 15/821,828, filed on Nov. 23, 2017, now abandoned.

(60) Provisional application No. 62/798,452, filed on Jan. 29, 2019, provisional application No. 62/425,625, filed on Nov. 23, 2016.

(51) Int. Cl.
*G09B 5/02* (2006.01)
*H04L 65/403* (2022.01)
*G09B 5/06* (2006.01)
*H04W 4/06* (2009.01)
*G09B 7/08* (2006.01)
*H04L 67/50* (2022.01)

(52) U.S. Cl.
CPC ............ *G09B 5/02* (2013.01); *G09B 5/06* (2013.01); *G09B 7/08* (2013.01); *H04L 65/403* (2013.01); *H04L 67/535* (2022.05); *H04W 4/06* (2013.01)

(58) Field of Classification Search
CPC .... G09B 5/02; G09B 5/06; G09B 7/08; H04L 7/535; H04L 65/403; H04L 4/06
See application file for complete search history.

(56) References Cited

U.S. PATENT DOCUMENTS

| | | | |
|---|---|---|---|
| 6,988,128 B1 * | 1/2006 | Alexander | G06Q 10/109 709/206 |
| 8,182,270 B2 * | 5/2012 | Elzinga | G09B 7/00 434/350 |
| 2013/0236870 A1 * | 9/2013 | Wasserman | G09B 5/06 434/262 |

(Continued)

*Primary Examiner* — William L Bashore
*Assistant Examiner* — Gregory A Distefano
(74) *Attorney, Agent, or Firm* — Horizon IP Pte Ltd

(57) ABSTRACT

A method and system comprising an adaptive learning platform having a backend component for managing 3D lessons for display on an interface of a user device. A 3D lesson comprises a plurality of scenarios with choices which lead to a next scenario of the 3D lesson. A learner after completing the 3D lesson can analyze results of a completed 3D lesson using an analyzer unit of the adaptive learning platform. In addition, the platform also recommends other 3D lessons based on analytics performed on the learner user's results.

20 Claims, 36 Drawing Sheets

(56) References Cited

U.S. PATENT DOCUMENTS

2015/0254214 A1\* 9/2015 Rosenberg .............. G09B 7/08
715/202

\* cited by examiner

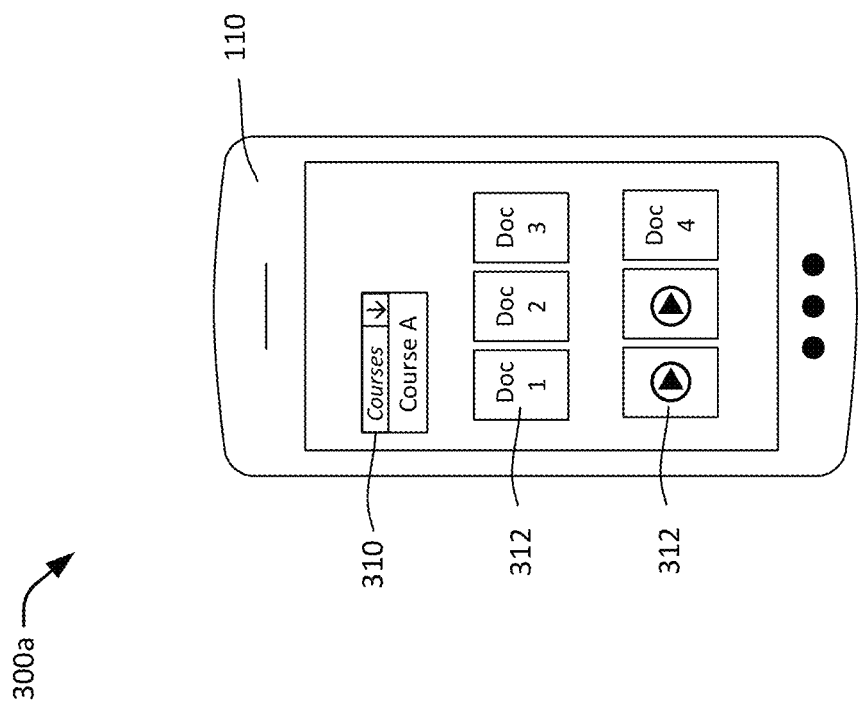

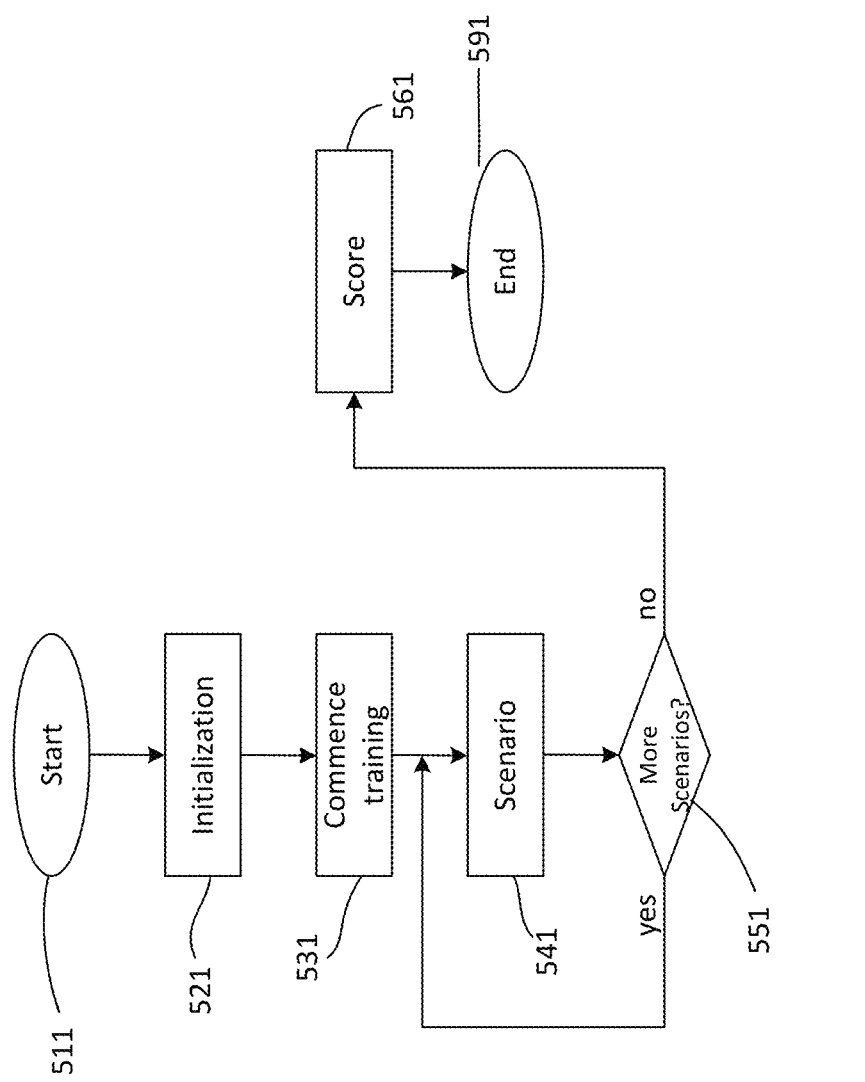

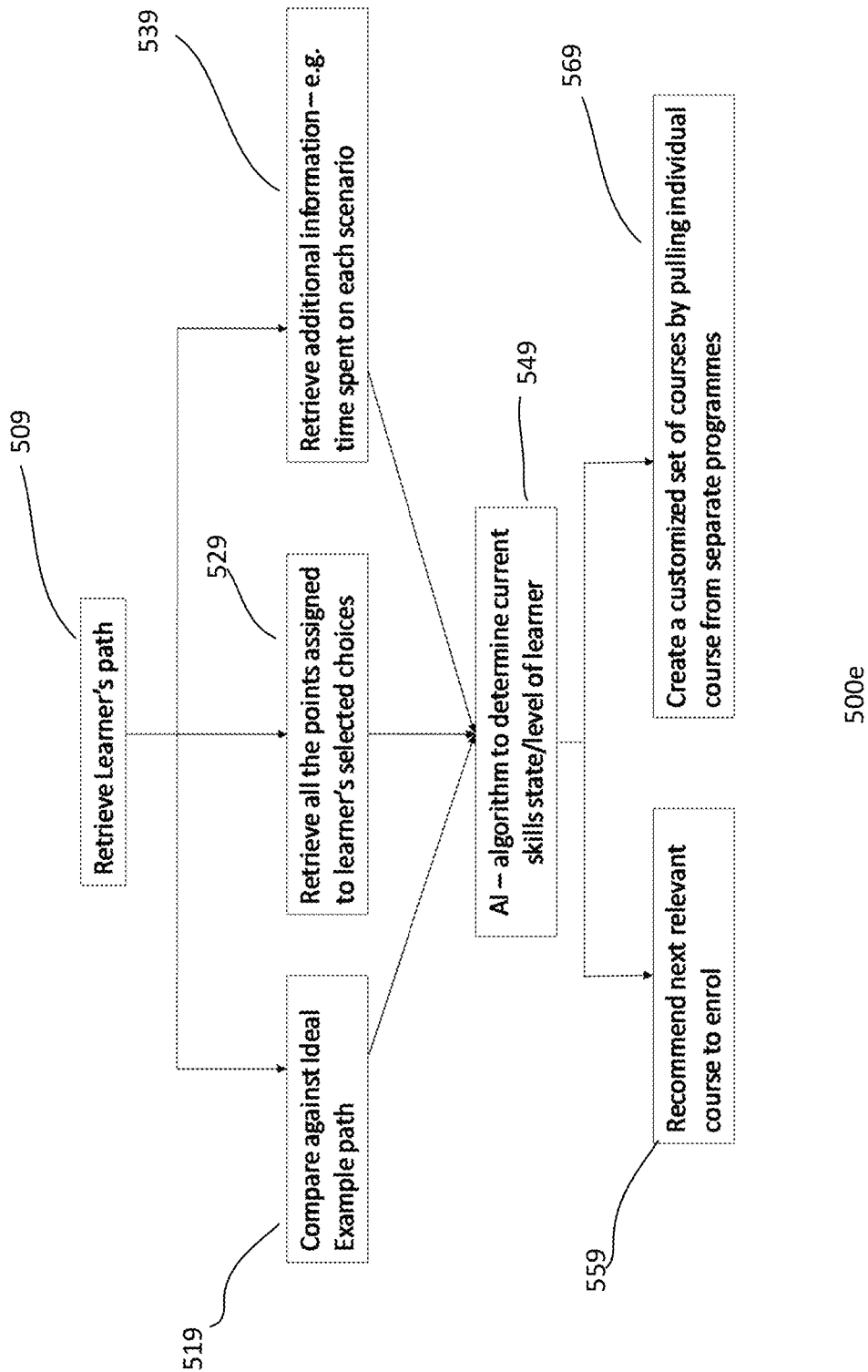

MAZE TRAINING PLATFORM

CROSS-REFERENCE TO RELATED APPLICATION

This application is a continuation of U.S. patent application Ser. No. 16/773,992, filed on Jan. 28, 2020, which claims the benefit of U.S. Provisional Application Ser. No. 62/798,452, filed on Jan. 29, 2019 and is also a continuation-in-part of co-pending U.S. patent application Ser. No. 16/699,761, filed on Dec. 2, 2019, which is a continuation of co-pending U.S. patent application Ser. No. 16/015,203, now U.S. Pat. No. 10,497,272, filed on Jun. 22, 2018, which is a continuation-in-part application of co-pending U.S. patent application Ser. No. 15/821,828, abandoned on Jun. 27, 2019, filed on Nov. 23, 2017, which claims the benefit of U.S. Provisional Application Ser. No. 62/425,625, filed on Nov. 23, 2016. All disclosures are herein incorporated by reference in their entireties for all purposes.

FIELD OF THE INVENTION

The present invention is generally related to a networked platform for interactive learning. More specifically, the present invention is directed to an interactive virtual learning platform for multiple end-users.

BACKGROUND

The development and deployment of technological social networking systems and the possibility of instant reach to information, particularly in a wireless environment has changed the way people learn and communicate today. Furthermore, mobile devices have become ubiquitous in today's society. Many people use mobile devices such as personal digital assistants (PDAs), laptops, tablet devices or any smart device in their daily lives. The development of a networked and connected world has resulted in mushrooming of social networks, which grant end-users the opportunity to connect with others in ways not possible before. However, little has been done towards providing people with a virtual learning platform that encourages social interaction between end-users.

Accordingly, there is a need for a computer implemented method and system that provides a learning experience through combining interactive learning opportunities with social interaction to provide the learner with higher levels of interest and involvement during learning activities.

SUMMARY

The present disclosure describes exemplary systems and methods to facilitate remote learning, remote teaching and remote evaluation during a live event. The disclosed example systems and methods may be more effective than conventional remote learning and teaching methods.

One embodiment includes a method for adaptive learning on an adaptive learning platform including providing the adaptive learning platform. The adaptive learning platform includes a backend system which includes a creation module. The creation module is configured to create a three-dimensional (3D) maze lesson including generating a maze framework of the 3D maze lesson based on a level input and a choice input. The maze framework includes x levels of nodes based on the level input and y number of choices at each node based on the choice input, wherein the nodes correspond to scenarios of the 3D maze lesson, a number of nodes at a level is equal to $y^{i-1}$, where i is from 1 to x and is an $i^{th}$ level of the maze framework, where 1 is a highest level and x is a lowest level, a parent node of an ith level has y child nodes in a next level ($i^{th}$+1), wherein a path of the parent node to one of the y child nodes in the next level is based on one of y selected choices, nodes having no child nodes correspond to termination nodes. Creating the three-dimensional (3D) maze lesson further includes updating a status of each node of the maze framework during creation of the 3D maze lesson to provide progress information. The method also includes providing a frontend system configured to execute on a user device. The frontend system includes a user interface to access various modules of the backend system, and the user interface is configured to access the creation module for a trainer user to create a new 3D maze lesson.

Another embodiment includes an adaptive learning platform for adaptive learning including a backend system which includes a creation module. The creation module is configured to create a three-dimensional (3D) maze lesson including generating a maze framework of the 3D maze lesson based on a level input and a choice input. The maze framework includes x levels of nodes based on the level input and y number of choices at each node based on the choice input, wherein the nodes correspond to scenarios of the 3D maze lesson, a number of nodes at a level is equal to $y^{i-1}$, where i is from 1 to x and is an $i^{th}$ level of the maze framework, where 1 is a highest level and x is a lowest level, a parent node of an ith level has y child nodes in a next level ($i^{th}$+1), wherein a path of the parent node to one of the y child nodes in the next level is based on one of y selected choices, and nodes having no child nodes correspond to termination nodes. Creating the three-dimensional (3D) maze lesson further includes updating a status of each node of the maze framework during creation of the 3D maze lesson to provide progress information. The platform also includes a frontend system configured to execute on a user device. The frontend system includes a user interface to access various modules of the backend system, and the user interface is configured to access the creation module for a trainer user to create a new 3D maze lesson.

These and other advantages and features of the systems and methods herein disclosed, will become apparent through reference to the following description and the accompanying drawings. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various implementations. In the following description, various implementations of the present disclosure are described with reference to the following, in which:

FIGS. 3*a*-3*d* show exemplary illustrations of an interface screen that can be output for display in accordance with various implementations of the system described in FIGS. 1-2;

FIGS. 5a-e show various exemplary processes within a maze framework;

DETAILED DESCRIPTION

A framework for an interactive learning system and method is described herein. In particular, the present disclosure relates to a learning system and method that integrates live online learning and self-paced learning within a digital learning platform. In some implementations, the digital learning platform allows learners to access learning materials maintained in the platform at any time, and attend multiple scheduled live events remotely. The scheduled live events are, for example, hosted by the digital learning platform described herein, which integrates a stream of the live events along with one or more native interface elements to provide an interactive learning experience for learners attending the live events remotely.

Some embodiments provide a techno-pedagogic solution specifically tailored, designed and developed for corporate or business needs or users, or for academic needs and users.

Some embodiments provide relevant learning objects and learning activities that are interactive, thereby encouraging the learner to be actively involved in the learning process; and constructive, assisting knowledge building. A learner's pedagogic goals are supported and assisted by the adaptive learning platform described herein, which selectively allocates and assigns various digital learning objects and learning activities to learners, or to groups of learners, according to the courses (e.g., learning programs, curriculum) associated to each learner.

Some embodiments are adapted to improving learners' learning effectiveness by motivating trainers to develop higher levels of teaching competencies, which include: knowledge building skills; ability to build skills and competencies of learners; ability to adapt the teaching process to learning needs; and ability to dynamically adopt suitable pedagogical approaches to efficiently teach different groups of learners having different learning competencies. For example, each learner is able to provide feedback on the trainer's performance, or the learner's satisfaction level, for a learning/teaching activity.

Some embodiments are adapted to evaluate a learner's performance after completion of a course provided on the learning platform described herein. Accordingly, some embodiments provide a solution for receiving practical feedback on the effectiveness of a course (e.g., learning program, curriculum) provided on the learning platform.

Figure 1:
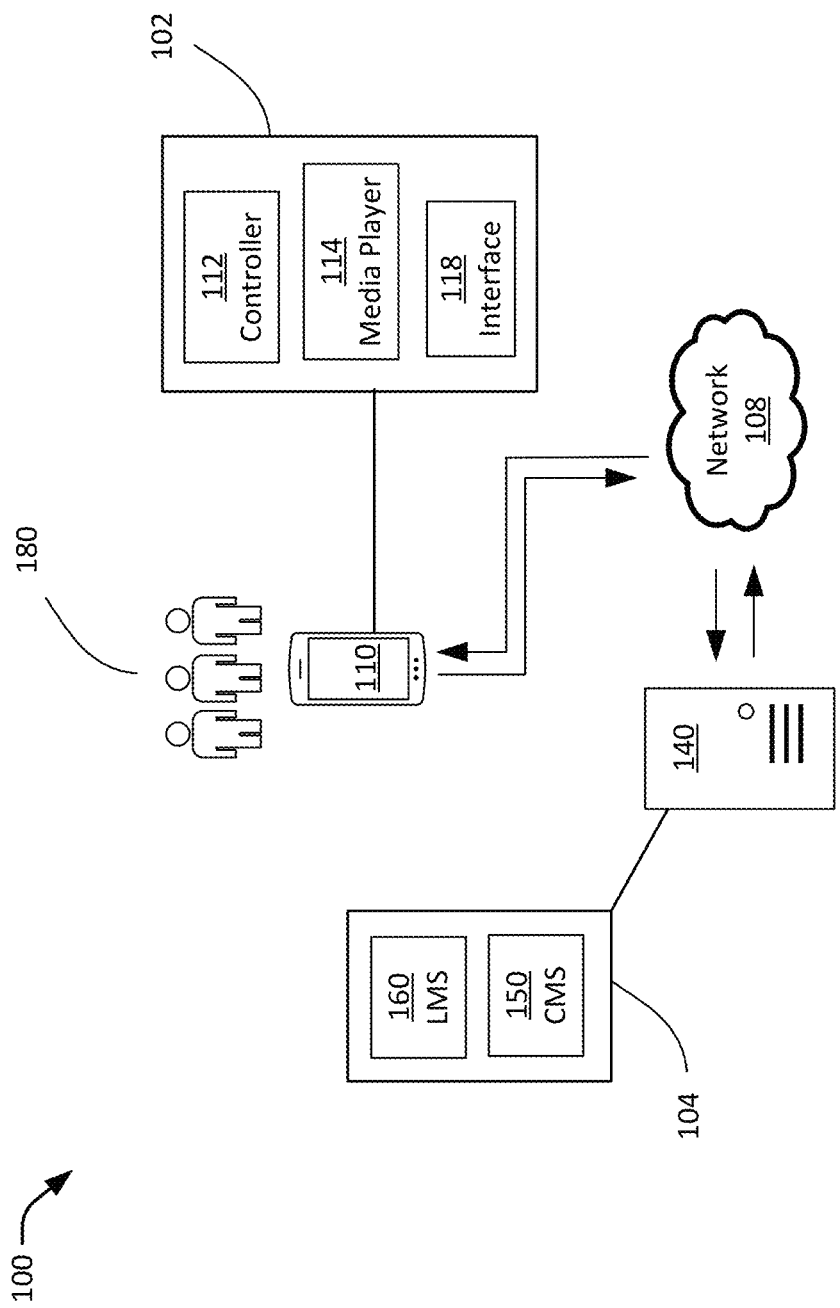
FIG. 1 shows a simplified diagram of a system implemented within a computerized learning environment.

FIG. 1 shows a simplified diagram of a learning system 100, according to an exemplary implementation. The system 100 may include one or more components, modules or layers, which may be implemented using software and/or hardware, optionally across multiple locations or using multiple devices or units. An overview of the system 100 is described in relation to FIG. 1. Thereafter, a more detailed description of the system 100 is provided in relation to remaining figures.

The system 100 can each be implemented as a single system, multiple systems, distributed systems, or in any other form. In one implementation, the system 100 includes a digital learning platform (hereinafter "learning platform") having a frontend system (e.g., presentation layer) 102 and a backend system 104 (e.g., data access layer) in communication with the frontend system 102. The frontend system, for example, runs on client device 110. The client device 110 illustrated in FIG. 1 is a representative of a large number of client devices that can be included in the system 100.

The client device 110 can be any manner of computer or computing device with, for example, local memory and processor. A memory may be volatile or non-volatile types of non-transitory computer-readable media, such as magnetic media, optical media, random access memory (RANI), read-only memory (ROM), removable media, or any other suitable local or remote memory unit. The memory can include digital data that can be accessed by the processor. A processor may be any type of device, or multiple devices, capable of manipulating or processing information from a non-transitory computer-readable media (e.g., a memory). For example, a processor includes a central processing unit (CPU) for processing computer-executable program instructions to perform one or more processes. Various types of portable and/or non-portable computing devices may serve as client device 110. For example, the term "client device" as used herein includes a personal computer (PC), a workstation, a computer station, a network computer, a kiosk or a mobile computing device, such as smart phones, PDAs (personal digital assistants), portable media players, tablet computers, or laptops. Other types of computing devices may also be used.

In one exemplary implementation, the client device 110 is a mobile computing device, such as a smart phone and/or laptop. The client device 110 may include, for example, a processor, a memory, a network communication connector, a display screen, a camera, a speaker and a microphone. Providing other features for the client device may also be useful.

One or more client device 110 may be associated with an end-user 180 (hereinafter "user") of the system 100. For example, a user 180 interacts (or interfaces) with the system 100 using the client device 110 associated to the particular user. The user 180 illustrated in FIG. 1 is representative of a large number of end-users that can be included in the system 100. A user 180 may download the frontend system 102 to a client device 110 associated with the particular user 180 as a computer application (hereinafter "App"). For example, the frontend system (or App) 102 resides on the client device 110. The App may include software components in the form of computer executable program instructions (hereinafter "computer instructions") for implementing or running the App on the client device 110. The computer instructions may further specify a unique name and/or logo for the App. The App is installed and displayed at the client device 110 using the unique name and/or logo. In one implementation, the frontend system 102 is a mobile application. The App, for example, may be a native mobile application downloaded from an online App store or marketplace and directly installed onto the client device 110. In an alternative implementation, the frontend system may be a web-based application (hereinafter "web app"). A web app is, for example, an Internet-enabled app that is accessed through the client device's web browser. Other configurations of the App may also be useful.

The App 102 is able to interface with the client device's 110 resources, such as native features, information and hardware. In one implementation, the App 102 includes a controller module 112, a media player module 114 and an interface module 118. For example, the controller module 112 may control the interface between various modules of the App 102 and the client device's 110 resources, including camera, microphone and speaker, as further described in conjunction with FIGS. 3a-3d. As used herein, the term "module" refers to programming modules executed by computing systems (e.g., processors) that are part of the system 100, including client device 110 and server computers 140.

In one implementation, when the App is running on the client device 110, the interface module 118 will display the App as a full screen application and provide access to the learning activities, learning objects, information and functionalities implemented in the system 100. The interface module 118 presents information output for display on the screen of the client device 110, which allows the user 180 to navigate the system 100 and interact with the components, modules, layers or digital content therein. For example, the interface module 118 allows a user 180 to select or browse through learning objects stored in the backend system 104, and participate in live events hosted by the backend system 104.

As used herein, the term "learning object" refers to digital content storable on a computing device in any form, such as computer-readable data. A learning object includes, for example, a text document (e.g., text files, word-processing documents, spreadsheets, notes, and presentations), a video file, an audio file, a digital image, or other media file that stores digital content. A learning object may be, for example, subject to viewing, listening, typing, or otherwise interacting (e.g., passively or actively) by a user 180 utilizing a client device 110. For example, a learning object can include audio/video content (e.g., an AVI or MPG or WMV or MOV video file) which is intended for passive viewing/hearing by the user 180, a standalone application (e.g., Flash application or Shockwave application), applet (e.g., a Java applet in which the user 180 is required to type text in response to questions posed), program (e.g., a JavaScript program in which the learner selects answers in a multiple-choice quiz), or the like. Other types of learning objects may also be provided.

In one implementation, the interface module 118 may present a touch-based interface. For example, the interface module 118 allows user 180 to navigate and interact with the system 100, including the frontend and backend systems 102 and 104, by touching native interface elements (e.g., pictures or text) presented on the screen of the client device 110. In alternative implementations, the interface module 118 may present a graphical user interface. For example, a graphical user interface enables the user to navigate and interact with the system 100 through the use of peripheral input devices (e.g., keyboard, mouse etc.). Providing other types of interface modules 118 may also be useful.

In one implementation, digital representations of live events are stored in the system 100 as learning objects. A digital representation of the live event may include digital content (e.g., video file) and/or a stream of digital data (e.g., video data stream). Digital representation of a live event may include a video recording of the live event integrated with other digital content such as, but not limited to, message records. For example, a video recording of an interactive live training event is integrated and synchronized with one or more learner-originated messages presented via a native messaging interface during the live training event to provide a digital representation of the live event, as further described in conjunction with FIG. 3c. In an alternative implementation, a video recording (e.g., video file) of the live learning event may be integrated and synchronized with one or more data structures (e.g., graphs, tabular data, etc.) to provide a digital representation of the live learning event. Integrating a video recording of a live event with other types of digital content with may also be useful.

Live events hosted by the backend system 104 can include interactive learning activities (e.g., live training events) and assessment activities (e.g., quizzes). In one implementation, a video data stream of a live event is presented on the screen of client devices 110 for viewing by users 180 via the media player module 114 embedded in the frontend system 102. The media player module 114 includes, for example, a Flash player or an HTML5 player. Providing other types of media player may also be useful. Learning activities may be associated with a course (e.g., cooking course, customer service course, retail management course), course segment (topics or themes of a course delivered in sequence or in accordance to a designed course structure), or other properties. For example, learning activities may also be associated with one or more groups of learners associated with a course, or associated with each other in some way (e.g., coworkers).

The backend system 104 of the learning platform may be implemented on one or more server computers 140. The server computer 140 illustrated in FIG. 1 may represent multiple computing devices in communication with each other to perform the actions of a server computer (e.g., cloud computing). Alternatively, the server computer 140 may represent a single computing device.

Each server computer 140 can include a processor (e.g., CPU) and memory (e.g., RAM, ROM, etc.), and one or more storage devices storing data structures and/or computer instructions for execution by the processor. For example, each server computer can include one or more computer-readable data stores to facilitate managing app requests from client device 110. Various types of computers may be employed for the server. For example, the computer may be a mainframe, a workstation, as well as other types of processing devices. The memory may include digital data that can be accessed by the processor. The server computer 140 and/or data store may be coupled with various databases or storage devices in the form of any suitable computer readable medium, such as a hard disc drive, a memory device, a flash drive or an optical drive.

In some implementations, the systems and computing devices described herein (e.g., client devices, server computers) are communicably connected to each other by a network 108. The network 108 may include, for example, one or more communications networks of any suitable type in any combination, including wireless networks (e.g., WI-FI network), wired networks (e.g., Ethernet network), local area networks (LAN), wide area networks (WAN), personal area networks (PAN), mobile radio communication networks, the Internet, and the like. Further, the network 108 may include one or more network topologies, including a bus network, a star network, a ring network, a mesh network, a star-bus network, a hierarchical network, and the like. It should be appreciated that the server computer 140 may also be in communication with other remote servers or various client devices through other networks or communication means.

Communications between the client device 110 and server computer 140 may be facilitated through various communication protocols, including data transmission media communications devices, Transmission Control Protocol (TCP), Internet Protocol (IP), File Transfer Protocol (FTP), Hypertext Transfer Protocol (HTTP), Hypertext Transfer Protocol Secure (HTTPS), Session Initiation Protocol (SIP), Real-Time Transport Protocol (RTP), Global System for Mobile Communications (GSM) technologies, Code Division Multiple Access (CDMA) technologies, Short Message Service (SMS), Long Term Evolution (LTE) technologies, wireless communication technologies, in-band and out-of-band signaling technologies, and other suitable communication networks and technologies.

In some implementations, the system 100 includes one or more communication interfaces (not shown) to facilitate communications between the frontend system 102 and backend system 104 using the various communication protocols. A communication interface may include hardware and/or software. In one implementation, the communication interface may include digital signal processing circuitry to provide one or more interfaces for communication (e.g., packet-based communication) between computing devices or networks. For example, a communication interface may include a network interface controller (MC) or network adapter for communicating with an Ethernet or other wire-based network or a wireless NIC (WNIC) or wireless adapter for communicating with a wireless network, such as a WI-FI.

Figure 2:
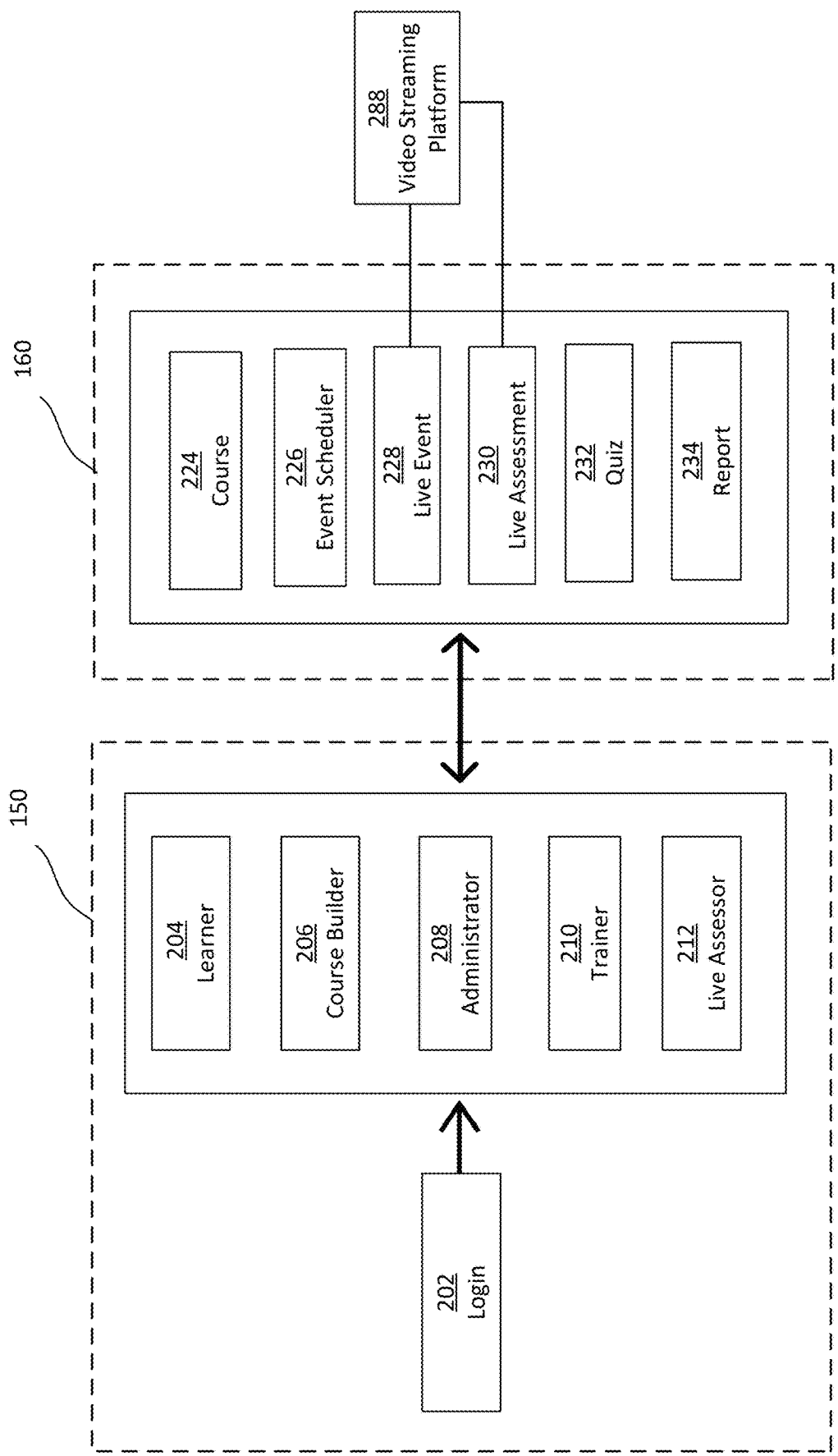
FIG. 2 shows a block diagram of exemplary systems, components, modules and/or functionalities implemented in the system of FIG. 1.

In one implementation, the backend system 104 includes a first resource management system 150, as further described in conjunction with FIG. 2. The first resource management system is, for example, a content management system (CMS), such as a web content management system. The CMS 150 may be implemented using server computer 140 to administer a user account registry and to store learning objects and/or other types of digital content on one or more content repository residing on one or more computer-readable data stores. Implementing a CMS using other suitable computing device, or a group of computing devices, having data processing and communication capabilities may also be useful. In one implementation, the system 100 requires users 180 to have a registered user account with the CMS for accessing information and learning objects stored within the system 100 through one or more client devices associated with the user 180. A user account maintained at the CMS 150 may include identification information about the user 180, as well as information related to the user's role or predefined function in the system 100. The CMS can implement access control functions to differentiate between different types of users 180 in the system 100. For example, the CMS 102 may grant users 180 role dependent access to resources and functionalities in the system 100. The client device 110 can communicate with CMS to perform various functions, including storing learning objects and/or accessing learning objects in various storage locations of the system 100. As used herein, the term "storage location" refers to a location where learning objects are stored and may include content repositories, data stores, or other storage structure elements in which digital content is stored.

In one implementation, the backend system 104 of the learning platform includes a second resource management system 160 utilized in conjunction with the first resource management system 150, as further described in conjunction with FIG. 2. The second resource management system is, for example, a learning management system (LMS) 160 implemented using server computer 140. Implementing a LMS using other suitable computing device, or a group of computing devices, having data processing and communication capabilities may also be useful. In one implementation, the LMS implements functions that facilitate management of a registered user's learning activities in the system 100. For example, the LMS 160 can facilitate the process of delivering learning objects and/or invitation to learning activities to one or more registered users 180, tracking user's learning progress, and receiving user's completed work product including online tests and quizzes. The LMS may track user's learning progress using any suitable standards, including "Tin Can" Application Programming Interface (API) protocol, and Sharable Content Object Reference Model (SCORM) protocol.

FIG. 2 shows a block diagram of exemplary systems, components, modules and/or functionalities implemented in the backend system 104 of the learning platform. For example, the backend system 104 includes a CMS 150 and a LMS 160 utilized in conjunction with the CMS 150, as described with respect to FIG. 1. Additional systems may also be utilized in conjunction with the CMS or LMS. Each of these systems, components, modules and/or functionalities can be provided in the form of computer instructions that are executed by a processor or computer, such as the one or more server computers 140 in the backend system 104.

The CMS 150 is operable to provide a network accessible interface by which users can access learning objects stored in learning content repository residing on data stores of a server computer 140. In one implementation, each user 180 can have a registered user account with the CMS 150 for controlled access to information, modules, digital content (e.g., learning objects) and functionalities (e.g., learning activities) associated with the system 100. For example, the CMS 150 allows the user 180 to register a user account with the CMS for accessing information and learning objects stored in the backend system 104 through one or more client devices 110 associated with the user account via the interface module 118 displayed in the context of an App 102 at the client device 110. For example, the CMS 150 can provide registered users 180 with controlled access to interact with learning objects stored in the learning content repository through the one or more client devices 110. The CMS 150 may communicate with client device 110 to obtain information for the user account, which can be an account that a user 180 establishes with the user account registry in the CMS 150 to create, delete, store, move or modify learning objects in various storage locations within the system 100.

In one implementation, the client device 110 can establish a login session with the CMS 150 by logging into a registered user account via the App 102 running on client device 110. For example, a user 180 can log in to the user account by entering login credentials such as a username and a password into a login module 202 output for display on the client device 110. Entering the login credentials can cause client device 110 to establish a connection with the CMS 150 to verify the credentials and initiate a login session. In one implementation, the login session is a persistent login session. Alternatively, the login session can terminate when the user 180 logs out or when the user closes the mobile app.

The CMS 150 can store and manage various types of digital data (e.g., digital content, metadata). Some of the digital data stored and managed by the CMS 150 can include access control information associated with one or more registered user 180 accounts. Examples of registrable user accounts include learner accounts 204, course builder accounts 206, administrator accounts 208, trainer accounts 210, and live assessment accounts 212.

The learner accounts 204 are each associated with a particular type of user 180 who is enrolled into one or more courses (e.g., course of study, training program etc.) implemented within the system 100. Users 180 associated to learner accounts may be referred to as "learners". A learner's access to interact with the system 100 may be course-dependent. For example, learners may only view or retrieve learning objects, and participate in learning activities (e.g., live events, online quizzes), which are related to the one or more courses associated with the particular learner.

The course builder accounts 206 are each associated with a particular type of user 180 who is designated to create (e.g., design and build) one or more courses implemented within the system 100. A course may be built by creating a sequence of course segments corresponding to a predetermined course structure. Users 180 associated to course builder accounts may be referred to as "course builders". Course builders may be given access to create and store learning objects associated with the courses implemented within the system 100.

The administrator accounts 208 are each associated with a particular type of user 180 who is designated to monitor and administer the services and functionalities of the system 100 through a computer or computing device. Users 180 associated to administrator accounts may be referred to as "administrator". An administrator may be given authority to perform a range of administrative functions in the system 100 such as, but not limited to, creating learner accounts for association with particular users 180; adding (or enrolling) learners to, and removing learners from, one or more courses implemented in the system 100; assigning learning activities to learners; and generating performance-related reports of one or more learners.

It is to be appreciated that the CMS 150 can also be configured to provide for registration of super administrator accounts that are each associated with a particular type of user 180 (hereinafter "super administrator") who is conferred elevated authority to perform a wider range of administrative functions in the system 100 relative to users 180 associated with the administrator accounts 208. For example, a super administrator may be given authority to perform exclusive administrative functions such as, but not limited to, creating administrator accounts for users 180 designated as administrators, in addition to performing the range of administrative functions associated to an administrator.

The trainer accounts 210 are each associated with a particular type of user 180 who is assigned to teach one or more courses implemented in the system 100. Users 180 associated to trainer accounts may be referred to as "trainers". A trainer may be conferred authority to conduct (or host) one or more learning activities (e.g., live event, online quizzes). For example, a trainer can host a scheduled live event, which is broadcast in real-time (or near real-time) to client devices 110 associated with one or more learners 204.

The live assessment accounts 212 are each associated with a particular type of user 180 who is assigned to observe or evaluate the performance of one or more performers during a live assessment event. As used herein, the term "performer" refers to one or more human, who may or may not be an user 180 of the system 100. Users 180 associated to live assessment accounts may be referred to as "live accessors". A live accessor may be conferred exclusive authority to conduct (or host) a particular type of live event (e.g., live assessment event); create a recording of the live event; and generate a performance-related report in the context of the live event. For example, a live accessor can host and record a live assessment event, which is broadcast in real-time (or near real-time) to client devices 110 associated with one or more particular types of users 180 (e.g., learners, trainers) in the system 100.

It is to be appreciated that other types of user account and digital data can also be configured at the CMS 150, depending on operation requirements. For example, a single registered user account in the CMS 150 may be designated with multiple roles such as, but not limited to, trainer and live accessor roles.

As briefly mentioned, the backend system includes an LMS 160 utilized in conjunction with the CMS 150. In one implementation, the LMS 160 includes modules for performing various functions within the system 100 including, but not limited to, creating and managing courses and learning objects, scheduling live events, broadcasting and/or recording live events, administrating assessment activities (e.g., online quizzes and/or other assignments), and tracking each learner's activities in the system 100 and collate results of each learner's performances in assessment activities. In one exemplary implementation, the LMS 160 includes modules such as, but not limited to, a course module 224, an event scheduler module 226, a live event module 228, a live assessment module 230, a quiz module 232, and a report module 234.

The course module 224 facilitates implementation, delivery and management of a catalogue of courses (e.g., educational programs, training programs) maintained in the system 100. Each course includes one or more course segments and a collection of information and learning objects relating to one or more courses. The courses may be created by a course builder who is associated with one of the course builder accounts 206. Course builders can utilize the course module 224 to create and store information associated with a particular course, such as a course identifier (e.g., course name, course code), a course description, course structure (e.g., course format, organization of course segments), and to link to the course-related learning objects. The learning objects may be in the form of text documents, video files, digital images, or the like. In one implementation, learners may receive notification of new information (relating to the courses in which the learners are enrolled) made available in the system 100. For example, when new learning objects relating to Course A, or a course segment of Course A, are created and stored in the learning content repository, electronic notifications are delivered online from the backend system 104 to the frontend system 102 on the client device 110 associated to learners enrolled into Course A. For example, learners not associated to Course A may not receive any notification of the new learning objects relating to Course A. The notification may be automatically delivered to the frontend system 102 in the form of in-application (in-app) notification and/or push notification.

In one implementation, learners may enroll into a course by selecting a course from the catalogue of courses maintained in the courses module 224 and associating their respective learner account 204 with the course, such as by entering into their respective learner account 204 a course code that identifies the course. In an alternative implementation, an administrator who is associated with one of the administrator account 208 may selectively associate one or more learner accounts 204 with one or more courses in the system 100. For example, an administrator can utilize user-related information to identify learner accounts 204 associated to learners who are to be enrolled into one or more courses maintained in the courses module 224. Information that can be utilized to identify the learner accounts 204 includes names, usernames, user profiles, email addresses, and the like. For example, information identifying the learners for one or more courses may be retrieved, such as by digital data transmission over a network, from a data source such as a server computer in the backend system 104, by an administrator. In yet another implementation, the CMS 150 can use information from learner accounts 204 of a plurality of learners to associate any of the plurality of learners with a course maintained in the course module 224. For example, users 180 of the system 100 may include a plurality of learners that may be associated with each other in some way (e.g., co-workers), or may not be specifically associated with each other beyond having learner accounts 204 maintained in the CMS 150.

In one implementation, the LMS 160 can store the collections of information and learning objects relating to a course in the CMS 150, and cause those information and learning objects to be opened for editing at the LMS 160. For example, existing courses and course-related learning objects can be archived or copied from the course module 224 into the learning content repository managed by the CMS 150 for storage and retrieval. In one implementation, the collections of information and learning objects stored in the CMS 150 can be used as templates for creating other courses maintained in the LMS 160. For example, a new course can be built and maintained in the course module 224 by copying and/or modifying previous courses or course segments, and one or more learning objects associated with the previous course may also be associated with the new course.

In one implementation, the LMS 160 includes an event scheduler module 226. The event scheduler module facilitates the management of course-related interactive live events that are scheduled for different instances of time to be broadcast to the client device 110. For example, the live events may be upcoming virtual events such as live-stream classes, lectures, seminars, tutorials, workshop, live assessment, and the like, conducted in a virtual setting for users 180 in the system 100 to attend the live event remotely. The event scheduler module 226 can provide information regarding each scheduled live event and the one or more courses that are associated with each scheduled live event including, but not limited to, event name, event description, course identifier, course segment identifier, and learning objects that are related to each live event. The event scheduler module 226 allows designated users 180 such as administrators and live accessors, to schedule upcoming live events and selectively assign learners with access to attend the scheduled live events. In one implementation, learners may receive notification of an invitation to attend a scheduled live event related to the respective courses in which the learners are enrolled. For example, when learners are assigned access to a scheduled live event, electronic invitations to attend the particular live event are delivered online from the backend system 104 to the frontend system 102 on client devices 110 associated to the learners. The invitations may be automatically delivered to client devices 110 in the form of in-application (in-app) notification and/or push notification.

In one implementation, the event scheduler module 226 includes a data matching module for searching and identifying learners who are enrolled in courses related to respective scheduled live events maintained in the event scheduler module. For example, the data matching module utilizes information (e.g., metadata) stored in the CMS 150 to match a particular scheduled live event to learners associated with a course related to the particular scheduled live event. The data matching module may perform matches based on a set of predefined rules which processes information in the CMS 150 and LMS 160 including the predefined course identifier and/or course segment identifier for the particular scheduled live event, and the one or more courses associated with a learner account. Such rules define the circumstances under which a learner is assigned (or invited) to attend a scheduled live event. For example, data matching module may utilize a set of matching rules relating to matching a learner account associated with a course identifier (e.g., course code) and a schedule live event having a same course identifier as the learner account. The data matching module can automatically deliver invitations to the learner accounts matched with the particular scheduled live event. The invitation can include in-app options (presented by the interface module 118 as native interface elements) such as an "Interested" option, an "Attending" option, and a "Not attending" option, for recipients (e.g., learners) to either register an interest in attending the scheduled live event, or provide an indication of their attendance status (e.g., attending, not attending) for the scheduled live event.

The data matching module may be invoked in real time by another process (e.g., the event scheduler module 226 may invoke the data matching module when a live event is scheduled), or it may be invoked manually by an authorized user 180 (e.g., administrator). Upon invocation, the data matching module processes the information stored in the CMS 150 to match a scheduled live event in the LMS 160 with any learner accounts associated to one or more courses relating to the particular scheduled live event. Thereafter, a learner who receives an invitation to attend the scheduled live event may utilize in-app options to register an interest in attending the scheduled live event, or provide a confirmation of his/her attendance status for the scheduled live event.

In one implementation, the event scheduler module 226 includes a reminder module to deliver in-app reminder notifications (hereinafter "reminders") to learners who are attending an upcoming scheduled live event. The reminders are delivered online from the backend system 104 to the frontend system 102. In one implementation, learners who registered an interest in attending one or more scheduled live events may receive reminders to confirm their attendance status for the particular scheduled live event. In another implementation, learners who confirmed their attendance for one or more scheduled live events may receive timely event reminders in advance of each corresponding scheduled live event. In yet another implementation, learners who confirmed their absence from one or more scheduled live events may not receive any reminders for the corresponding schedule live events. The reminder module may deliver event reminders to learners through their respective client devices 110 in the form of in-app notifications and/or push notifications. The reminder module may deliver reminders to learners within predefined timeframes prior to the scheduled live event.

In one implementation, the LMS 160 includes a live event module 228. The live event module may provide all or part of a scheduled live event maintained in the event scheduler module to the client devices 110 in the system 100. In one implementation, the live event module 228 provides a video data stream (hereinafter "stream") of a scheduled live event to an internet-based video streaming platform (e.g., wowza)

288 for broadcasting in real-time. The scheduled live event is associated to a course implemented in the system 100 and may be a live workshop. For example, the video streaming platform broadcasts a stream of the live workshop in real-time to client devices 110 associated to learners attending the live workshop. Learners may view a stream of the live workshop on the screen of their client devices. Learners viewing a stream of a live event may be referred to as "viewers".

A live event may be conducted (or hosted) by at least one performer. In one implementation, an educational performance by the performer is presented during the live event. The performer is, for example, a trainer assigned to teach a course associated to the live event. For example, a client device 110 associated to a trainer, who is conducting (or hosting) a live event (e.g., live workshop), includes resources such as camera and microphone for capturing a stream of the trainer's performance (e.g., presentation, demonstration, lecture). The trainer-associated client device 110 provides a stream of the trainer's performance for broadcasting in real-time to viewer-associated client devices 110 via the video streaming platform 288. The client device 110 can present the live event to viewers (e.g., learners) via the media player module 114 in the frontend system 102. The video streaming platform may be implemented on streaming servers.

In one implementation, the video streaming platform 288 may facilitate capturing a stream of the live event (e.g., live workshop) to create a video recording of the trainer's performance and store the video recording as a learning object in the learning content repository of the CMS 150. A video recording may be stored in the form of a video file. For example, a video file containing a video recording of the trainer's performance during a live workshop can be stored as a learning object in the system 100. A video file can include information about a particular video recording such as, but not limited to, audio and visual data captured from a stream of the live event, a video identification, an event identification, length of the video replay, and the like. For example, learners enrolled into Course A may access the system 100 at a later time after the end of a broadcast of a first live workshop, which is associated to Course A and conducted by Trainer A who is assigned to teach Course A, to locate a video file generated from a stream of the first live workshop and playback a video recording of Trainer A's performance (e.g., presentation, demonstration, lecture) for self-learning or self-revision.

The live event module 228 can facilitate in-app connection between multiple client devices 110 such that multiple viewers can interact with each other through the live event module during a stream of the live event. For example, the live event module 228 allows the LMS 160 to serve as an event host or server to which one or more client devices 110 can connect. Client devices 110 may connect to the live event module 228 via registered user accounts maintained in the CMS 150. In one implementation, the live event module 228 includes a messaging module to facilitate communication between a performer (e.g., trainer) conducting a live event and viewers attending the particular live event. The messaging module, for example, can directly receive messages from client device 110 of viewers attending the live event, and trainer messages from client device 110 of the trainer conducting the live event. Messages received at the messaging module are simultaneously presented on the screen of client devices of the trainer and viewers.

In one implementation, the messaging module can assimilate messages (e.g., viewer and/or trainer messages) received from multiple client devices 110 into a message stream. The messaging module can directly output messages from the message stream for display on a screen of the client device 110. The messaging module can also create computer instructions for how and when to present messages. The computer instructions can be metadata that indicates when to present a message, a presentation order, a presentation sequence number and the like. The messaging module can also include computer instructions to present a message according to its timestamp (the particular instance of time the message was received at the messaging module). The messaging module can present messages from the message stream to client devices 110 via a messaging interface incorporated within the interface module 118 in the frontend system 102, as described in conjunction with FIG. 3c. The messaging module can use computer instructions to ensure synchronization of messages presented on the client device 110. For example, the message stream is implemented using a message queue, where the messaging module sorts each message and sends the messages to the client device 110 to be presented according to the order in which the messaging module sorted the messages.

The messaging module can store messages received from client device 110 during a live event as message records in the learning content repository managed by the CMS 150. The learning content repository may include any number of message records. A message record can include any number of messages and information about each message, including the content of the message itself. For example, the message record can include message identification, a time the message was received, a user account identification associated with the sender of the message, an event identification, and the like. In one implementation, multiple messages (e.g., viewer and/or trainer message) from client devices 110 associated to different users 180 are entered into the message stream via the message interface in the frontend system 102. The client device 110 transmits the messages, along with information about each message (as described above), to the messaging module via network 108. The messaging module can assimilate the messages and cause the messages to be stored as a message record on the learning content repository. The messaging module can also receive and present the messages on a screen of client device 110 via the message interface in real-time during a live event. After a broadcast of a live event ends, the message record is integrated and synchronized with a video file of the live event stored in the learning content repository to create a digital representation of the live event. For example, the messaging module utilizes information (e.g., event identifier) in the message record to match or identify a video file of a particular live event for integration and synchronization such that the video file is modified to include a replay of the messages presented from the message stream in chronological order. For example, a digital representation of the live event includes a playback of a video recording of the particular live event and a replay of the message stream as it was presented at different instances of time during the particular live event.

In one implementation, the LMS 160 includes a live assessment module 230. The live assessment module 230 facilitates collection and reporting of performance-related data from a location (hereinafter "site") at which one or more performances of interest take place. A site can be a front line service environment (e.g., customer contact point) of a business or organization. A performance of interest at a site, which can be physical or virtual, can include any interpersonal interaction involving at least one human being associated with the site, such as a front line staff, and at least one human being (e.g., live accessor) not associated with the site, which may be observed or experienced, reviewed, reflected upon and/or evaluated. In one implementation, the human being associated with the site is a performer engaged in a performance of interest, and the human being not associated with the site is a live accessor interacting with the performer to observe and evaluate the performer's performance. The performer and the live accessor may be physically co-located at a particular site while interacting with each other, or may be interacting virtually over the internet at a single virtual site. A physical site includes, for example, a financial center, a retail store, a restaurant, a government office, and the like. A virtual site includes, for example, a virtual space where virtual avatars of the performer and the live accessor may interact in what may be viewed as a performance of interest, or where two individuals (e.g., performer and live accessor) who are not co-located may engage in a computer-assisted real-time exchange in what may be viewed as performance of interest.

Similar to the live event module, the live assessment module 230 may provide all or part of an interactive live event to the client devices 110 in the system 100. In one implementation, the live assessment module 230 provides a stream of a live assessment event (interpersonal interaction between a performer and a live accessor) to the video streaming platform 288. In one implementation, the video streaming platform broadcasts a stream of the live assessment event in real-time to client devices 110 associated to users 180 (or viewers) attending the live assessment event. The video streaming platform 288 may facilitate generating and storing a video recording of the live assessment event in the learning content repository of the CMS 150. For example, a video recording of the performer's performance during a live assessment event is stored in the form of video file for use as a learning object in the system 100 and/or for further evaluation of the performer's performance of interest at a later time. A performer may eventually receive feedback on their performance through a review process of the broadcast or video recording.

In one implementation, the live assessment event is conducted (or hosted) by a live accessor for characterizing the salient aspects of an interpersonal interaction between the live accessor and a performer (e.g., frontline staff of a retail store). For example, a live accessor who is conducting the live assessment event can broadcast the live assessment event to client devices 110 in real-time (or near real-time) for viewers to rate the performer's performance at different instances of time during a stream of the live assessment event. The client device 110 can present a stream of the live assessment event to viewers (e.g., learners) via the media player module 114 in the frontend system 102.

In one implementation, the LMS 160 includes a quiz module 232. The quiz module 232 facilitates the assessment of a learner's progress at the end of a learning activity, including a live event. For example, course builders can utilize the quiz module 232 to create, distribute, grade, and/or return quizzes (short assessments that gauge a learner's retention and comprehension of a topic) during or after a live event. Quizzes are created by course builders providing collections of documents relating to a course in the system 100, or created using a predefined template document stored in the CMS 150. Creation of a quiz can include receiving, at the LMS, information such as a quiz title, quiz description, quiz instructions, quiz questions, a completion timeline, or information identifying the quiz as being related to a course (e.g., course identifier) or course segment (e.g., course segment identifier), and the like.

In one implementation, a course builder can create a quiz by storing a document in the CMS 150, and designating the document as being a template document that learners will use to complete the quiz. In order to allow the learners to complete the quiz, a copy of the template document will be made for each learner that is enrolled in the course, and the copy can be open for editing at the LMS 160 via the quiz module 232. The copy for each learner can be made at the time that the learner accesses the template document. Access control information for each copy may designate each learner as an owner of a respective copy of the document, and optionally designate users 180 not associated to a learner account (e.g., trainer, administrator) as being authorized to access and view each copy of the document. The learners complete the quiz by opening the document and editing the document to present their answers to each question in the document.

In one implementation, the quiz module 232 includes a marking module, which facilitates grading of quizzes completed by learners. For example, a course builder can create and assign an answer key to the questions in the template document that learners used to complete the quiz. When the learner is finished with a quiz, an interface element, such as a "submit" button is operated by the learner. The "submit" button can be incorporated in an interface screen for the quiz module, and can be displayed as part of the interface screen for the quiz module 232. After the "submit" button is operated, the access control information for the document is modified such that the learner is no longer able to modify the document, and the document is submitted for grading by the marking module. The marking module automatically marks the submitted document by, for example, comparing the learner's answers for each question with the predefined answer key. Once the submitted document is marked, the marking module automatically generates the grading information of the submitted document and returns the graded document to the learner. The process of marking and returning the documents to learners is executed instantaneously (or near instantaneous). The quiz module 232 can provide information to the LMS 160 regarding, for example, which learners have accessed the document, the length of time of access, whether each learner has completed the quiz, and the grading information of each learner in relation to the quiz.

In one implementation, the LMS 160 includes a report module 234. The report module monitors, logs and generates a report of the activities of learners in the system 100. For example, learning and/or assessment activities (e.g., quizzes and live event participation) are monitored, recorded and stored in a format that allows subsequent searching, querying and retrieval. Data mining processes and analysis processes may be performed on the tracked and logged operations that learners perform in the system 100. The data mining and analysis may determine conclusions with regard to the performance, the achievements, the strengths, the weaknesses, the behavior and/or other properties of one or more learners.

The report module 234 may generate reports at various times and using various methods, for example, based on the choice of the administrator. Reports may be generated, for example, at the end of a course; at the end of each course segment; at particular times (e.g., at a predefined day of each month); upon demand, request or command of a particular user (e.g., administrator); upon a triggering event or when one or more conditions are met (e.g., upon completion of a quiz by a learner or group of learners). The generated reports are used to assess learner performance, learner knowledge, learner attendance record in the context of assigned live events, learner behavior during live events (e.g., number and content of messages entered during a stream of the live event), or other learner parameters. In one implementation, the report module 234 is capable of generating and/or updating a progress report of a learner, a group of learners, learners associated with a course, learners associated with each other in some way, or the like. For example, the report module 234 may perform data mining and analysis processes on quiz results stored in the learning content repository to generate and/or update the progress report associated with Learner A, indicating the proficiency of Learner A in a particular course segment or course. In another example, the report module may perform data mining and analysis processes on message records associated with Learner A to determine Learner A's level of participation during one or more live events. In yet another example, the report module 234 may perform data mining and analysis processes on learner accounts 204, or event scheduler module 226, to monitor Learner A's frequency of attendance in live events and the duration of attendance in each of the attended live events (e.g., to determine whether Learner A attended the live event from start to finish).

FIGS. 3a-3d show exemplary illustrations of an interface screen 300 that can be output for display on the screen of the client device 110 through the interface module 118 during some implementations of the system 100 described in FIGS. 1-2. The client device 110 is, for example, associated with a learner enrolled into one or more courses implemented within the system 100. A learner logs into a registered learner account via the frontend system 102 running on client device 110 to access information, learning objects and functionalities within the system 100.

FIG. 3a shows an exemplary illustration of an interface screen 300a that can be output for display through the interface module 118 for interfacing with the course module 224 of the LMS 160. The interface screen 300a includes a native interface element 310 for selecting a course associated with the learner. The interface element 310 is, for example, a drop-down menu listing one or more courses that the learner is enrolled in, while courses not associated with the learner will not be listed for selection in the drop-down menu 310. Each course can be represented by a course identifier (e.g., course title or course code) within the drop-down menu 310 for selection by the learner. The drop-down menu 310 may be configured to access one or more predefined data storage locations in the system 100 (e.g., learning content repository in the CMS 150) for displaying information and learning objects associated with a particular course (e.g., Course A) selected from the drop-down menu 310.

Once the learner operates the drop-down menu 310 and selects a course from the drop-down menu 310, the interface screen 300a displays native interface elements 312 for accessing learning objects, such as documents and video files, associated to the course selected from the drop-down menu 310. The interface elements 312 can be displayed in the form of digital images for selection by the learner and may include learning object identifiers (e.g., learning object name, digital file type) to differentiate between different types of learning objects, such as text documents and video files, and to describe the content within each learning object. In one implementation, the course module 224 determines which learning objects are presented to the learner using access control information that is associated with each learning object. The interface screen 300a, for example, only presents learning objects 312 that the learner is authorized to access. The learner can be authorized to browse and select one or more learning objects 312 if, based on the access control information, the learning object is shared with the learner by the system 100 and/or an administrator. For example, a learner may be authorized to browse all or a predetermined selection of learning objects associated to a particular course (e.g., Course A) selected from the drop-down menu 310.

Figure 3B:
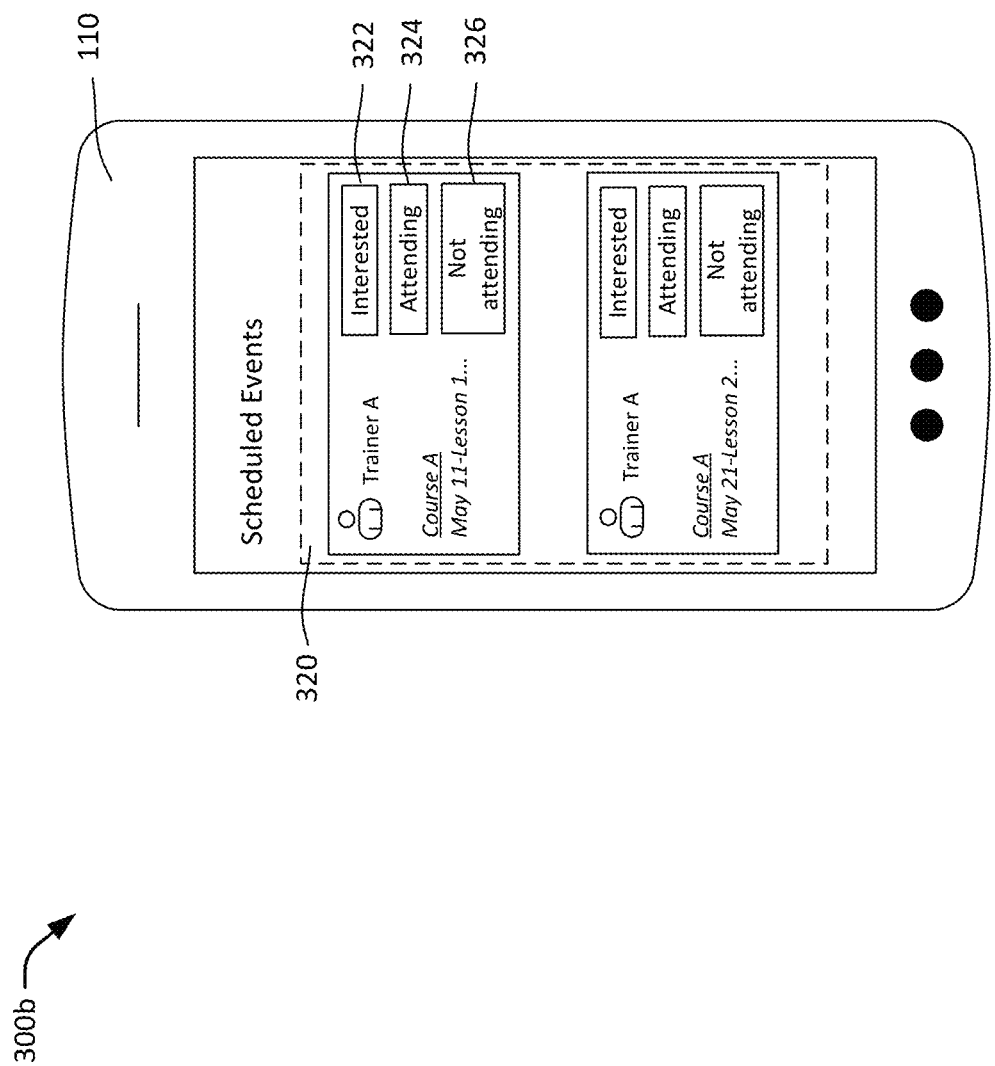

FIG. 3b shows an exemplary illustration of an interface screen 300b that can be output for display through the interface module 118 for interfacing with the event scheduler module 226 of the LMS 160. The interface screen 300b includes an events feed 320 that outputs (or posts) information regarding upcoming scheduled live events for display to learners. The events feed 320 can present multiple posts that each include information regarding a respective scheduled live event. For example, each post can include information identifying the course and/or course segment associated with the live event (e.g., live workshop, live assessment event), information identifying the trainer conducting the live event, information giving instructions in relation to the live event, a scheduled date and time for broadcasting the live event, and an attendance status indicator that indicates whether the learner associated to the client device 110 is attending the scheduled live event. Objects can be embedded in one or more posts in the events feed 320. These objects can include, for example, images relating to the particular live event (e.g., digital photo of the trainer conducting the live event); or links to learning objects (e.g., documents, video files) relating to the particular live event. Each post can include interface elements 322, 324 and 326 that allow learners to enter into the system 100 their attendance status for a scheduled live event. For example, a learner can operate (or select) the "Interested" interface element 322 to register an interest in attending the scheduled live event 322; operate the "Attending" interface element 324 to register a positive confirmation of their attendance for the scheduled live event; or operate the "Not attending" interface element 326 to register their absence from the scheduled live event.

The event scheduler module 230 includes access control information specified by the system 100 and/or an administrator. In one implementation, access control information specified by the system 100 can cause a learner's events feed 320 to selectively post schedule live events relating to one or more courses associated with the particular learner, while scheduled live events not relating to any course associated with the particular learner will not be posted on the learner's events feed 320. For example, learners can only view posts of upcoming live events relating to the one or more courses (e.g., Course A) they enrolled in. In one implementation, an administrator can selectively modify the access control system specified by the system 100 such that one or more scheduled live events not relating to any course associated with the particular learner are posted on the learner's events feed 320. For example, an administrator can selectively assign any scheduled live event, including live assessment events, for display on the events feed 320 of one or more particular learners.

Although FIG. 3b illustrates scheduled live training events presented on the events feed 320, it is to be appreciated that the event scheduler module 226 can output for display any type of scheduled live events, including upcoming live assessment events, depending on the access control information associated with the particular live event. In the case of a scheduled live assessment event, the events feed 320 may outputs (or posts) limited information regarding an upcoming scheduled live mystery events to protect the integrity of the live assessment event. For example, posts relating to live mystery events may only include information giving instructions in relation to the live mystery event, a scheduled date and time for broadcasting the live event, and an attendance status indicator that indicates whether the learner associated to the client device 110 is attending the scheduled live event.

Figure 3C:
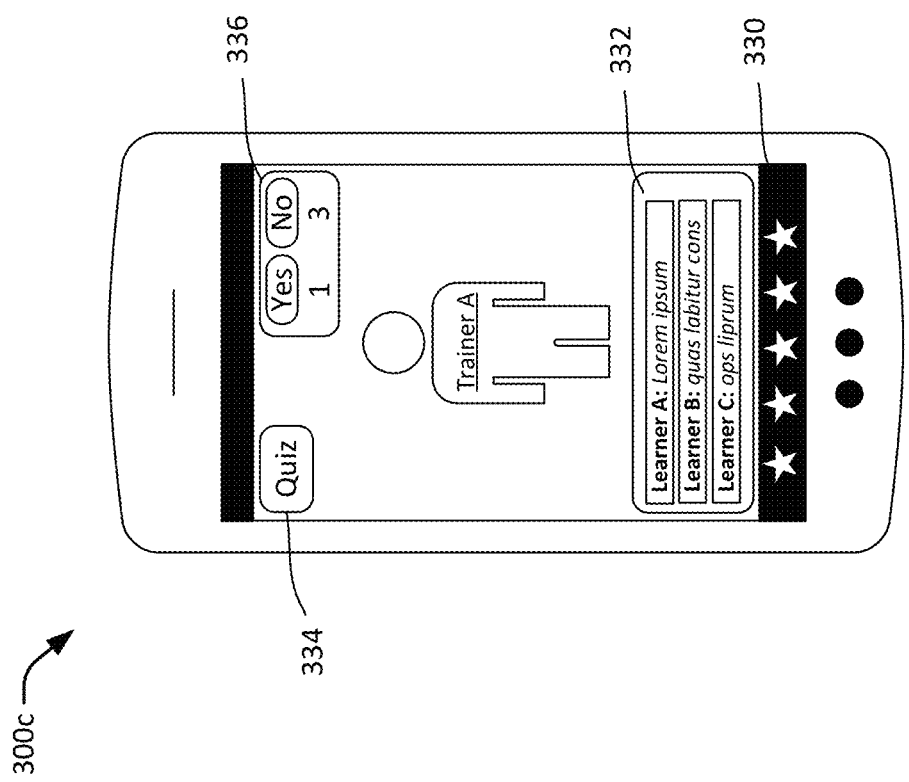

FIG. 3c shows an exemplary illustration of an interface screen 300c that can be output for display through the interface module 118 for interfacing with the live event module 228 of the LMS 160. For example, the live event module 228 presents a stream of a live event on the interface screen 300c of each client device 110 of a plurality of learners attending the live event remotely. In the interface screen 300c, a trainer (e.g., Trainer A) is conducting a live workshop and broadcasting the live workshop to a plurality of learners who are in remote attendance. The live workshop is associated with a course that the learners are enrolled in. The trainer broadcasts the live workshop to learners attending the live workshop to communicate information regarding the particular course, or course segment of the particular course. In one implementation, the trainer broadcasts the live workshop using a client device 110 associated with the trainer. The client device 110 may be a mobile computing device (e.g., smartphone, laptop) having native features, such as a camera and microphone, to generate audio and visual data of the live workshop for broadcasting in real-time. For example, when the App is running, the control module 112 may be configured to cause the camera and microphone to operate, providing a stream of the trainer's performance (e.g., demonstration, presentation) during the live workshop for broadcasting to learners (or viewers) in real-time. A stream of the live event can be captured (or recorded) to generate a video file of the live event for storing in the learning content repository, as described in FIG. 2.

A stream of the live event may be presented on the screen via the media player module 114. The media player module 114 includes a display of the trainer conducting the live event in real-time (or near real-time). The interface module 118 may be configured to provide one or more interface elements overlaying the media player module 114 to interface with the live event module 228. For example, learners attending a live workshop may view a stream of the live workshop through the media player module 114 and simultaneously operate one or more interface elements overlaying the media player module 114, as shown in FIG. 3c.

In one implementation, the interface screen 300c includes a real-time rating interface 330. The real-time rating interface 330 is an interface element provided for rating the performance of the trainer (e.g., Trainer A) during a stream of the live event. Learners can operate the real-time rating interface 330 once at any instance of time prior to the end of the live event. The real-time rating interface 330 is, for example, utilized by learners (or viewers) in remote attendance to provide feedback on the trainer's performance (e.g., teaching competency) and/or the quality of live event. As an exemplary illustration, the real-time rating interface 330 may include a unipolar five-point rating scale for rating the trainer's performance. The real-time rating interface 330 can be configured to display on the screen of client device 110 associated to the trainer and/or the viewers (learners in remote attendance), an average rating value calculated from the scale points enter by viewers of the live event. In one implementation, viewers can operate the real-time rating interface 330 at any instance of time during the live event to enter a scale point between 1 point to 5 points (e.g., 1 star-5 stars), including 1 point and 5 points. Prior to the end of the live event, viewers can repeatedly replace (or modify) the previously entered scale point by operating the real-time rating interface 330 to enter a new scale point until a predetermined timeframe prior to the end of the live event. For example, the real-time rating interface 330 repeatedly calculates and updates the average rating value on display based on the newest scale points enter by viewers of the live event.

Providing a real-time rating interface 330 allows viewers (e.g., learners in remote attendance) a means of appraising the effectiveness of a trainer's teaching performance (e.g., teaching competency) in a particular live event, and encourages trainers to improve on unsatisfactory performance levels during a live event or in subsequent live events. For example, a trainer can choose to change pedagogic approaches during a live training event upon receiving less than satisfactory average rating values. For example, satisfactory average rating values serve to validate a trainer's choice of pedagogic approach.

In one implementation, the interface screen 300c includes a messaging interface 332. The messaging interface 332 is an interface element provided for viewers to interface with the messaging module of the live event module 228 during a stream of the live event. Learners attending the live event remotely can operate the messaging interface 332 to communicate with the trainer (e.g., Trainer A), and with other learners in remote attendance, by text messages. In one implementation, learners can operate the messaging interface 332 to enter one or more messages for display on the messaging interface 332. For example, messages are entered into a message stream via the messaging interface 332 and the messages are presented in chronological order, as described in FIG. 2. The messaging interface 332 can display messages from the message stream in real-time (or near real-time) to the viewers during a stream of the live event and can also display information identifying the sender of each message.

In one implementation, the interface screen 300c includes a quiz interface 334. The quiz interface 334 is an interface element provided for viewers to interface with the quiz module 232 of the LMS 160 during a stream of the live event. Viewers may operate the quiz interface 334 to access a quiz document associated to the particular live training event, as described in conjunction to FIG. 2.

In one implementation, the interface screen 300c includes a live poll interface 336. The live poll interface 336 is an interface element provided for trainers to conduct one or more live polls during a stream of the live event. As an exemplary illustration, the interface element 336 can display Yes/No polling options for viewers to provide answers to a trainer's question during a stream of the live event. It is understood that the live poll interface 336 can also be configured to display other types of polling options including numbered options and true/false options. The live poll interface 336 can display an aggregate number of times each polling option was selected during the live event. For example, a numerical value can be displayed below each polling option to represent the number of times the corresponding polling option was selected by viewers. A trainer can spontaneously conduct a live poll during a stream of the live event in the context of one or more closed-ended questions directed to the viewers to assess viewers' understanding of a course-related concept or topic.

Figure 3D:
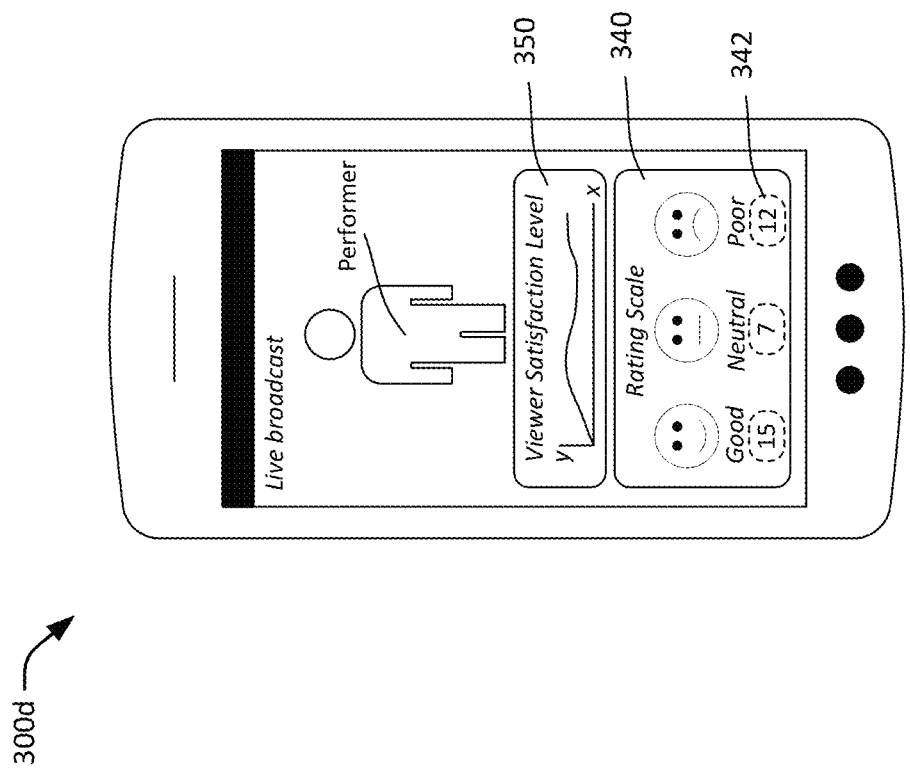

FIG. 3d shows an exemplary illustration of an interface screen 300d that can be output for display through the interface module 118 for interfacing with the live assessment module 230 of the LMS 160. For example, the live assessment module 230 presents a stream of a live event on the interface screen 300d of each client device 110 of a plurality of viewers (e.g., learners attending the live event remotely). In the interface screen 300d, a client device 110 (e.g., smartphone) associated with a live accessor is discreetly used to provide a stream a live assessment event for broadcasting in real-time. For example, at least one live accessor (not shown) is conducting a live assessment event to observe the performance of a performer at a predetermined site. The client device 110 of the live accessor may send a stream of the live assessment event to the streaming platform 288 for broadcasting to a plurality of learners who are in remote attendance. The client device 110 may be a smartphone having native features such as a camera and microphone. For example, when the App is running, the control module 112 may be configured to cause the camera and microphone to operate, generating audio and visual data of the live assessment event for broadcasting to viewers in real-time (or near real-time).

In one implementation, the stream of the live assessment event may include an image and audio feed of the performer, and an audio feed of the live accessor, while an image feed of the live accessor is not included. For example, the live accessor is discreetly directing the camera on the client device at the performer to provide a stream of the performer's performance. Although only one live accessor is described, it is appreciated that the live assessment event may include more than one live accessors. In an alternative implementation, the live assessment event may include an image and audio feed of the performer and a first live accessor. For example, a second live accessor is discreetly directing the camera on the client device at the performer and first live accessor to provide a stream of the performer's performance. A stream of the live mystery event can be captured to generate a video file of the live assessment event for storing in the learning content repository, as similarly described in FIG. 2 with respect to the live event module 228.

In one implementation, the live accessor conducts the live assessment event to evaluate the performance of one or more performers (e.g., front line staff, service staff). The performer may or may not be associated with a user account maintained in the system 100. A stream of the performer's performance during the live assessment event may be presented on the screen via the media player module 114. In one implementation, the interface module 118 is configured to provide one or more interface elements overlaying the media player module 114 to interface with the live assessment module 230. In one implementation, the interface screen 300d includes a real-time rating interface 340. The real-time rating interface 340 is an interface element provided for viewers to rate the performer's performance at any instance of time during a stream of the live assessment event. In one implementation, viewers can operate the real-time rating interface 340 more than once to rate the performer's performance at different instances of time during the live assessment event. For example, viewers can enter different ratings at different instances of time during a stream of the live assessment event. As an exemplary illustration, the real-time rating interface 340 may include at least a bipolar three-point rating scale having "Good", "Neutral" and "Poor" response options for rating particular instances of the performer's performance during the live assessment event. It is to be appreciated that the real-time rating interface 340 may also be configured to include additional scale points to more reliably reflect viewers' level of contentment for the performer's performance at different instances of time. For example, the real-time rating interface 340 may be configured to include a bipolar five-point rating scale having "Very Good", "Good", "Neutral", "Poor", and "Very Poor" response options. Providing other configurations of bipolar rating scale may also be useful. A numerical value 342 is displayed below each response option to represent the number of times the corresponding response option was selected by viewers during the stream of the live assessment event.

In one implementation, the real-time rating interface 340 can also translate into a performance graph 350 the aggregate number of times each response option was selected during a stream of the live mystery event. For example, each response option provided by the real-time rating interface 340 can include an intrinsic numerical score for calculating viewers' overall level of contentment for the performer's performance. For example, the "Good" response option may include an intrinsic score value equal to +1; the "Neutral" response option may include an intrinsic score value equal to 0; and the "Poor" response option may include an intrinsic score value equal to −1. Configuring each response option with other internal numerical score values may also be useful, depending on performance requirements. The aggregate score generated by the real-time rating interface 340 in one instance of time can be stored and used to calculate the new aggregate score in the next instance of time. The real-time rating interface 340 can continuously calculated the aggregate score at predefined time intervals (e.g., every 5 seconds) and translate the aggregate scores into data points of the performance graph 350 displayed on the interface screen 300d to map (or measure) the overall level of contentment for the performer's performance at different instances of time during a stream of the live mystery event. For example, the performance graph 350 plots a continually extending timeline as denoted by the x-axis against an aggregate score of the performer's performance at different instances in the timeline as denoted by the y-axis.

A digital representation of the live assessment event can be generated and stored as a video file in the learning content repository for further review and analysis after the end of the live assessment event. For example, the digital representation of the live assessment event includes a video recording of the live assessment event integrated and synchronized with the real-time rating interface 340 to present any changes in the numerical values of the bipolar rating scale and the performance graph 350 during a playback of the live assessment event. The video recording can be used as feedback on a course (e.g., customer service course) or a performer; or as reference material for a course implemented in the system.

The system 100 disclosed herein is a digital learning platform that utilizes a LMS 160 in conjunction with a CMS 150. The CMS and LMS are implemented integrally on a digital platform in the form of an App. Users 180 of the system are associated to various types of registered user accounts, including learner accounts associated to learners. In the system 100, learners are selectively allocated and assigned (or invited) access to learning objects and live events depending on the courses they are enrolled in. This facilitates management and targeted delivery of relevant education programs (or training programs) which are of interest to each learner in the system 100. The system 100 includes a live event module 228 which allows trainers to conduct and broadcast live training events to a group of learners who may be spatially separated over one or more geographical locations, and a messaging module that allows learners in remote attendance to communicate in real-time with the trainer conducting the live event. For example, learners may share opinions and direct questions to the trainer or to other learners during a stream of the live training event through the messaging module. This provides learners with an interactive and engaging learning experience. The system 100 includes a quiz module which allows trainers to conduct assessment activities during a live training event. Providing quizzes during a live training event reinforces the concepts and information communicated during the live training event. The system includes a real-time rating interface 330 provided for a live event conducted by a trainer. The real-time rating interface 330 provides trainers with real-time feedback from viewers (learners in remote attendance) on the effectiveness of the teaching process during a particular live training event. This allows trainers the option of changing pedagogic approaches during the live training event to improve the effectiveness of the teaching process. A trainer's selection of pedagogic approach is validated when the average rating value displayed by the real-time rating interface 330 increases prior to the end of the live event. As a consequence, the real-time rating interface 330 assists and encourages trainers to identify a pedagogic approach which meets the particular learning needs of different groups of learners during a live training event, or in subsequent live training events.

The system 100 includes a live assessment module which allows designated live accessors to broadcast live assessment events to learners and/or other types of users 180 in the system 100 for rating particular instances of a performer's performance during a stream of the live mystery shopping. For example, a second live accessor may also be assigned access to remotely attend the live assessment event for the purpose of evaluating a predetermined performer's performance during a stream of the live assessment event. A digital representation of the live assessment event can be stored for further review after the broadcast of the live assessment event has ended.

Consumer Service Companies (CSCs, entities such as retailers, healthcare providers, hospitality providers or other entities delivering face-to-face service through one or more service outlets may find it challenging to measure and report on the service performance of their employees working in service outlets and of the service outlets themselves. The live assessment module can also be utilized to generate a video report for CSCs to evaluate their service staff's performances. By incorporating a video recording of the performer's performance with a real-time rating interface 340 and a performance graph 350, the performer's performance can be more reliably evaluated by multiple evaluators as compared to conventional live assessment events which are subjectively assessed by a live accessor. In addition, any negative results delivered to the performer (e.g., service staff) can be backed up with video data to illustrate why or how the judgement was made.

Performance-related data collected from the live assessment event can be used as feedback on the effectiveness of a particular course (e.g., customer service course) or a particular performer who may or may not have a learner account maintained in the system 100. For example, an employer may use the live assessment module to compare the performances and/or behavioral aspects of employees before and/or after enrolling the employees in one or more courses implemented in the system 100. Alternatively, the live assessment event may also be utilized as a learning activity for learners (e.g., users 180 enrolled into a customer service course maintained in the system 100) to observe particular examples of desirable and undesirable interpersonal interactions, and for trainers (or employers) to drive and support any necessary or desired front line customer service behavior change.

In another embodiment, a framework for developing 3-dimensional (3D) training programs may also be provided. The 3D training programs may include maze-type training programs. A maze training program includes scenarios or scenes and choices. Depending on a choice selected at a scenario, the user is directed to another or next scenario until the maze is finished. Typically, each choice will lead to a different next scenario. The differences in each of the next scenarios could be minor or major, such as being completely different. The more scenarios and the more choices, the more complex the maze. This is due to the non-linear nature of a multi-path story defined by the maze. The framework may be employed to develop other types of 3D training programs also. For example, a 3D training program may include a single 3D object that the users can explore and answer questions about it.

The framework provides an easy way to create and manage 3D training programs as well as conducting training using the 3D training programs. The 3D training may involve training on different courses, such as a 3D curriculum. For example, a 3D training curriculum may include different 3D courses or programs with 3D lessons. A training session may refer to completion of training with a single 3D course. Other categorizations of courses and lessons may also be useful. The system provides flexibility for student users to be trained on one or more courses. For example, a student may start training on multiple courses in parallel. Furthermore, a course need not be completed in one sitting. For example, a student may take multiple sittings to finish a course.

In the case of a maze training program, it involves training with different maze courses or programs. Within each course, there are maze lessons. A maze lesson within a maze course may include different scenarios. A training session may refer to a single journey of the student through a particular maze course. A student user may be trained on a particular maze course more than once. For example, a student may have multiple training sessions of the same maze course. Other categorizations of maze courses and lessons may also be useful. The system provides flexibility for student users to be trained on one or more courses. For example, a student may start training on multiple courses in parallel. Furthermore, a maze course need not be completed in one sitting. For example, a student may take multiple sittings to finish a course.

The system can analyze results of a training session upon completion to determine weaknesses and to provide recommendations for other maze courses to strengthen the skills of a student user. The framework may be a stand-alone system or integrated with the CMS and LMS framework. The 3D framework includes a 3D engine along with avatars and text-to-speech capabilities, creating an overall 3D training experience. In addition, the 3D environment may be configured to operate or support a virtual reality (VR) or augmented reality (AR) environment. For example, a virtual reality headset may be used to provide a virtual reality environment. The platform may be implemented using services provided by Amazon Web Services (AWS), such as AWS Sumerian and AWS Polly. Implementing the framework using other services may also be useful. In one embodiment, the framework is developed with an ability to switch between 3D modes, including VR and AR, and non-3D modes by using different types of display media.

Figure 4A:
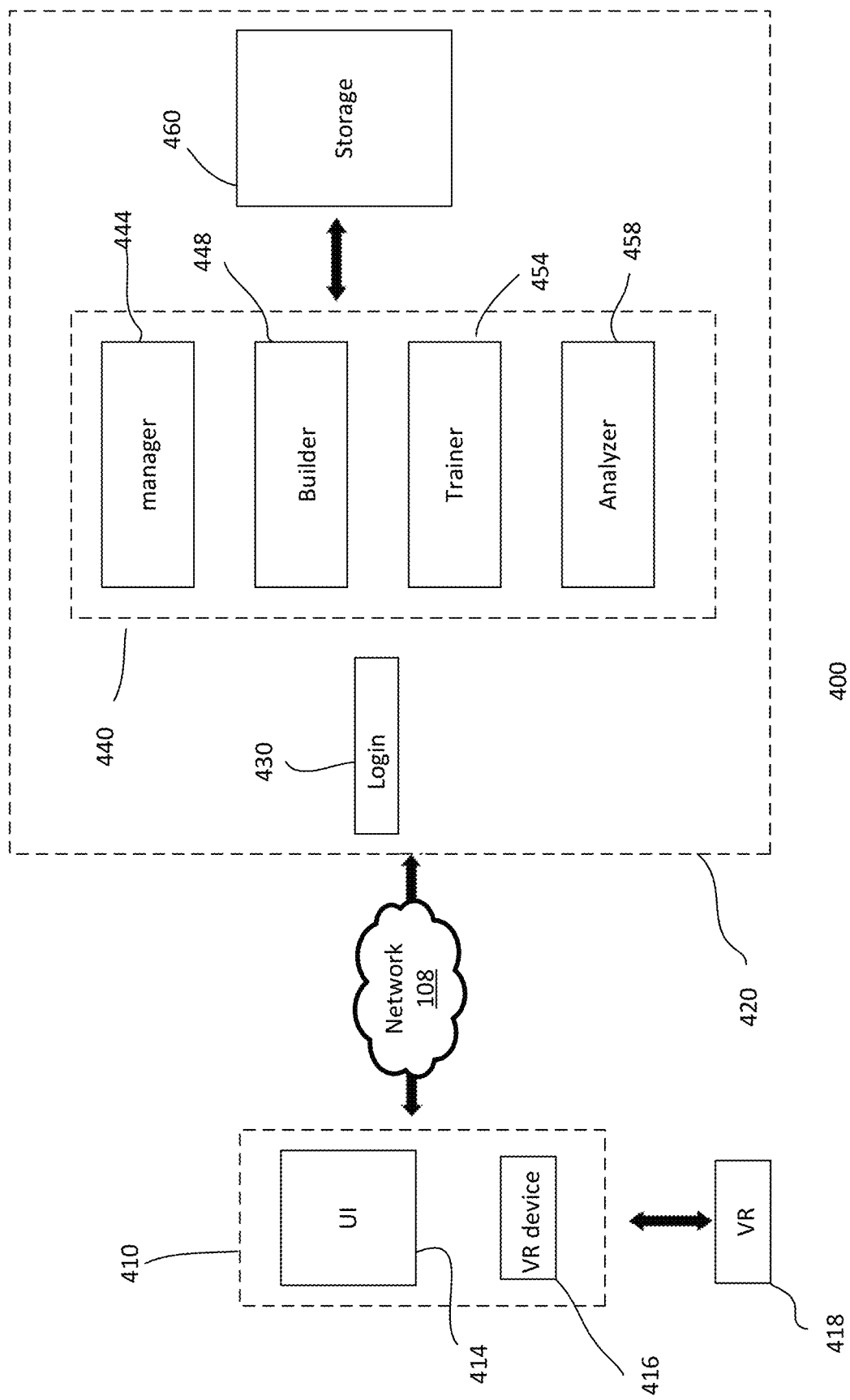
FIGS. 4a-b show simplified diagrams of an exemplary embodiment of a maze framework implemented with a system within a computerized learning environment.

FIG. 4a shows an embodiment of a 3D framework 400. The framework, for example, may include a backend component running on a server 420. The backend component, for example, may be referred to as a data access layer. The server, for example, may be a computer with a processor and memory. The server may be a single server or multiple servers. The server may be located on a cloud. Alternatively, the server may be a private server.

The backend component communicates with a frontend component running on a user or client device 410. The frontend component, for example, may be referred to as a presentation layer. The user device, for example, may be a computer, such as a laptop or a tablet, a smartphone, or other types of computing devices. The frontend component communicates with the backend component via a communication network 108.

A user may access the backend component by an user interface module 414 of the user device. For example, the user may access the backend component by initiating an App of the maze platform, which generates a home page of the platform. Alternatively, the user may access the backend component by going to the homepage of the platform using a browser. Other techniques for accessing the platform may also be useful.

In one embodiment, the backend component includes a login module 430, a processing module 440 and a storage module 460. As such, the processing module includes an accounts manager unit 444, a builder unit 448, a trainer unit 454 and an analyzer unit 458. As for the storage module, it may be a non-transient memory which stores information of the platform. In one embodiment, the builder unit facilities in building 3D training programs, such as maze programs, the trainer unit facilities training using the 3D training programs and the analyzer unit analyzes results of the training session.

The login module controls registrations of new users or logging in by registered users. The platform is configured to accommodate different types of users. For example, the platform may include student or learner users, builder users and administrator users. Other types of users may also be provided for the system. Different users may be configured to have access to different functions of the platform. Some users may be in more than one user category. Users are categorized based on the user's information acquired during the user registration process. In one embodiment, a builder user status may be a temporary status. For example, once a 3D course is completed, the builder user of the 3D training program becomes or is recategorized to an administrator user.

The manager unit 444 of the processing module, among other functions, manages the various registered user accounts. For example, the accounts manager unit will limit the user access to certain resources of the platform based on the user type.

The builder unit 448 enables a builder user to easily create a 3D program. In one embodiment, the builder unit facilitates in building maze programs or courses. A maze program may include a plurality of lessons with one or more scenarios. The builder unit enables, for example, a builder or administrator user to configure and manage content, such as text and image content, of the 3D program. For example, the builder unit facilities managing the content of the maze program. Based on the content provided by the builder user, the system generates a maze in a 3D or virtual medium. In addition, the builder unit provides a visual representation which maps the maze and scenarios or scenes therein. The builder unit can track a status of each scenario within the maze, enabling the builder user to easily identify which scenarios need to be completed. Once the maze program is completed, the maze is stored in the storage module as a maze course and becomes available to other users. For example, the maze is published, making it accessible to student users. In addition, published mazes may be employed by the builder user or other builder users as a base to generate new maze programs or courses. For example, a published maze course may be modified by a builder user to create a new maze program. In some cases, minor modifications may be made to the maze program. For example, a student may retake the course with the minor modifications. This is useful to ensure that the student is learning from the training and not by memorizing from memory of the previous training session.

The trainer unit 454 enables a student user to be trained by the 3D program, such as a maze program. For example, a student initiates a maze course. The trainer unit, in response, launches the selected maze course or program on the user device. The student user may select to experience the training in a virtual reality medium. For example, the user device may include a virtual reality driver 416 which connects to a virtual reality gear 418 to be worn by the student user.

When the training is completed, the analyzer unit 458 analyzes the training session. The analyzer, for example, may provide the student with an analysis of the training. For example, the analyzer may compare paths taken by the student based on choices made with an ideal path, as defined by, for example, the builder user. For example, the analyzer provides a comparison of the user's decisions against an established internal standard of decisions. The analyzer unit may analyze a path of the maze training session and identify weaknesses, if any, and recommend additional training courses to improve a skill set of the student user. The analysis may be initiated by the trainer or by the system automatically, for example, after completion of a training program.

The manager unit, in addition to managing the different user accounts, also manages the courses stored in storage as well as course building progress by a builder, training results of a course by a student, progress of the training of a course by the student, and recommendations of courses to the student. The manager unit may serve other management or housekeeping functions.

As an example, when a builder user logs in, the manager unit may display on a user interface page on the user device with a status of a course or courses which the builder user is building as well as a list of courses stored in the storage module. The builder may select the course which is in progress, an existing course to modify or a new course to build. The builder module causes the appropriate user interface pages to display, depending on the builder user's selection. The user interface page facilitates easy programming and management of the 3D program creation process. For example, the user interface facilities easy programming and management of the maze creation process.

The builder user may view the 3D program. In one embodiment, the builder user may view a maze map using a maze navigation page. The maze navigation map enables the user to select a scenario within the maze map to edit or to add. Once selected or added, a scenario definition page may be displayed for programming the scenario. For example, the scenario definition page may display various input boxes associated with defining the scenario. This may include title, color selection, status, avatar, voice as well as a content editor. In addition, pages may be added or deleted for the scenario. These pages, for example, may include defining an environment of the scenario, as well as choices available for the scenario. Also, the builder user under different fields may have the capability to add images, videos, files and 3D models.

In the case of a student user, a student's history may be displayed. For example, a list of 3D programs, such as maze programs, which the student user has taken, results, status, recommended courses based on previous training results, as well as a complete list of 3D programs, may be displayed. In one embodiment, the list may be in a hierarchical order. For example, maze courses may be listed and within each maze course are maze lessons of the maze course. The maze lessons of a maze course may be displayed by clicking on the maze course.

The student user may select a maze program in the training session. This may be a new course or one which the student has already started but not completed. Generally, it is preferable that a student user completes a course before moving onto another course. However, it is understood that a student may be trained on multiple courses in parallel. The student user may select whether the training is experienced in a virtual environment or non-virtual environment. If the virtual environment option is selected, the student may put on a virtual reality gear. The selected course is launched and the student proceeds with the training. For example, with each scenario, the student user selects from one of the available choices, which leads the student to another scenario. This continues until the training session is completed or until the user suspends the training.

After the training session is completed, the system may analyze results of the training by the student user. For example, a comparison of decisions by the student is made against an established internal standard of decisions and provided to the user. Analytics may be performed on the training session to identify weaknesses based on a path of the maze and provides recommendations to the student for other courses to take.

Figure 4B:
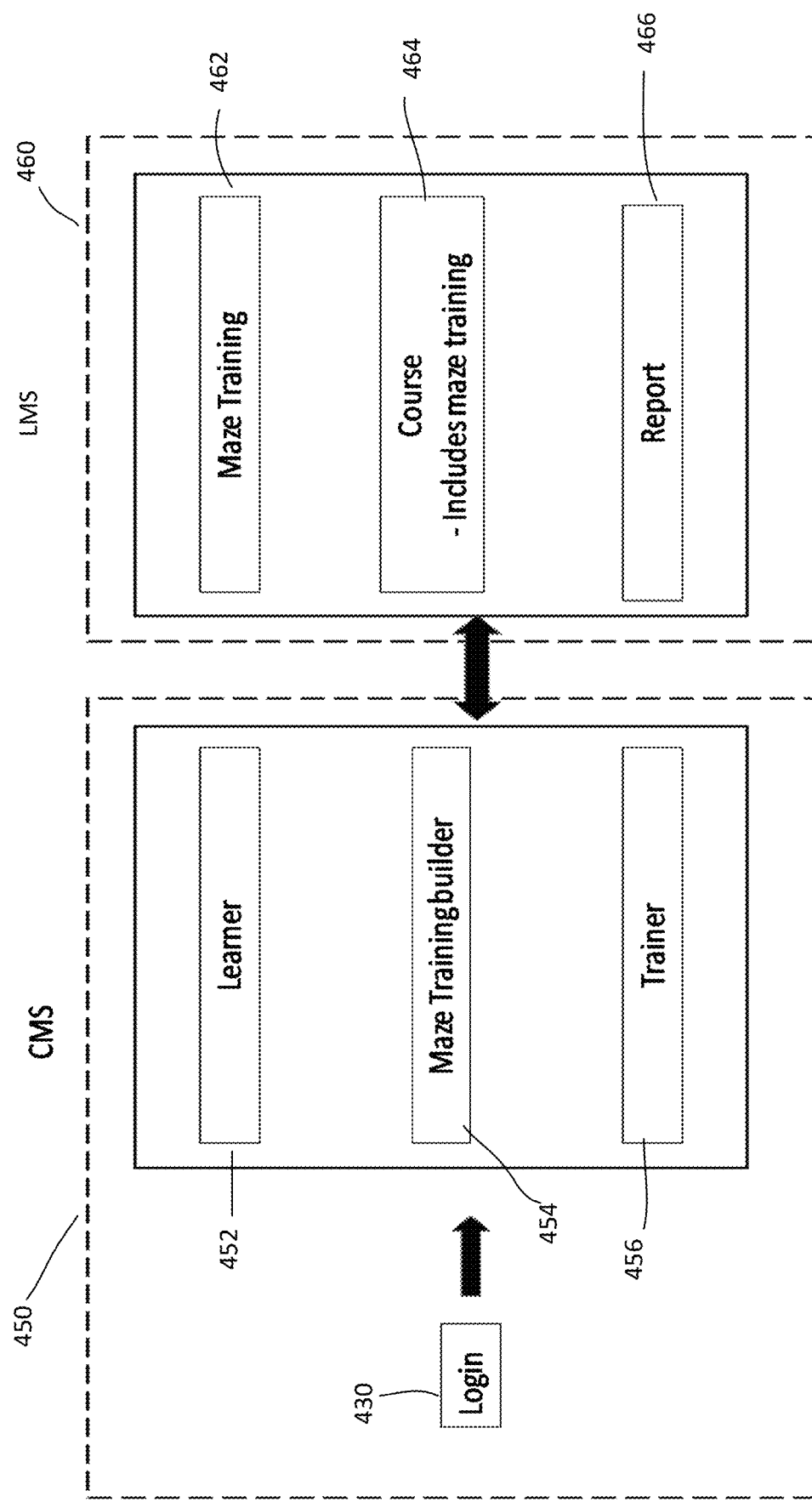

FIG. 4b shows an embodiment of a backend component 420 of the 3D framework. As shown, the backend component includes a first resource management system 450 which interacts with a second resource management system 460. The first resource management system is, for example, a content management system (CMS), such as a web content management system. The CMS 450 may be implemented using a server computer to administer a user account registry and to store learning objects and/or other types of digital content on one or more content repository residing on one or more computer-readable data stores. Implementing a CMS using other suitable computing device, or groups of computing devices, having data processing and communication capabilities may also be useful.

In one embodiment, the system requires users to have a registered user account with the CMS for accessing information and learning objects stored within the system through one or more client devices associated with the user. A user account maintained at the CMS 450 may include identification information about users, as well as information related to roles of users or predefined functions in the system. The CMS can implement access control functions to differentiate between different types of users in the system. For example, the CMS may grant users role dependent access to resources and functionalities in the system. The client device can communicate with CMS to perform various functions, including storing learning objects and/or accessing learning objects in various storage locations of the system.

In one embodiment, the CMS includes a login module 430. The CMS includes various account units for managing the different types of accounts. For example, the CMS includes a learner account unit 452 for managing learner or student accounts, a maze training builder unit 454 for managing maze or 3D program developers and a trainer account unit 456 for managing trainer accounts. In some cases, trainers and 3D developers may be the same users. In other cases, they may be distinct users. For example, trainers may be evaluators of students who have taken programs developed by 3D developers.

As for the second resource management system, it is, for example, a learning management system (LMS) 460. The LMS may be implemented using a server computer. Implementing the LMS using other suitable computing devices, or groups of computing devices, having data processing and communication capabilities may also be useful. The LMS and CMS may be implemented on the same server computer or on different server computers. In one embodiment, the LMS stores 3D programs or courses developed by program developers in a program unit. The LMS includes a training unit 462 which manages training of student users and a course unit 464 for storing 3D programs or course. In addition, the LMS includes a report unit 466 which provides reports of students training progress and performance of training on the programs.

Figure 5A:
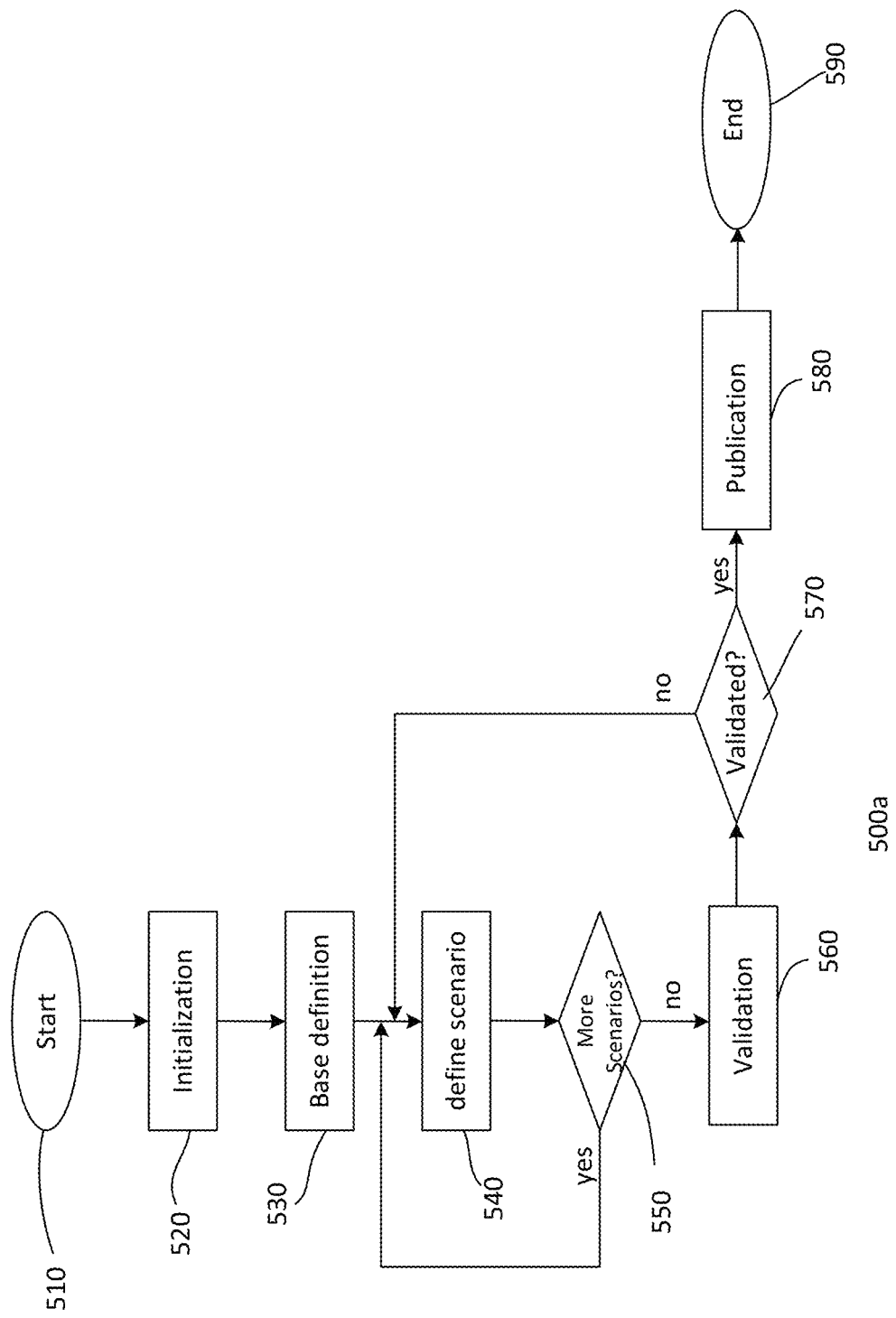

FIG. 5a shows an embodiment of a 3D program, such as a maze program, that includes a build process 500a for creating content. A builder user starts the build process at 510. For example, the user may login to the system. To login, the user may access a site of the system and click on a login button and provide necessary login information, such as username and password. Once successfully logged into the system, the system may display a user overview or home page, which enables the user to select from various options, such as display directory of existing mazes, mazes created by the user, create a new maze, select a maze for training, recommended mazes to train on. Other options may also be provided.

The builder user, in creating the 3D program, selects the 3D program creation option. For example, the user selects the maze creation option for creation of a maze program. Selecting the maze creation option causes the system to display a maze creation page view. The maze creation section view may include various options or sections related to maze development. In one embodiment, the options include program configuration, structure definition, content management and publishing. The maze creation page may include other specific options related to maze creation. Selecting an option causes the system to display the appropriate option section view. For example, the program configuration option directs the user to the program configuration section view, the structure definition option directs the user to the structure definition section view, the content management option directs the user to the content management section view and the publishing option directs the user to the publishing section view. In one embodiment, different section views may include different options, enabling the user to switch easily from one section view to another.

To start the process of creating a maze, the user selects program configuration section or option at 520. In one embodiment, the program configuration option directs the user to the program configuration section view, which facilitates initial or basic set up of the maze program. In one embodiment, basic setup enables a user to define basic information of the maze program. Such basic information may include defining a name of the program, an organization associated with the program. In addition, a user may include branding or design settings for the program. For example, the user may include a corporate logo for advertisement and/or branding purposes.

Basic setup may also include defining an environment of the program. For example, defining the environment may include the user selecting an avatar from an avatar library to serve as a trainer, voice of the avatar from a voice library, language of the avatar from a language library, and a 3-D scene of the maze from a scene library. Other types of set features may also be provided. For example, depending on types of 3D programs, basic setup may be different. For example, the configuration section may be configured or tailored to different types of 3D programs.

Once the basic setup of the maze program is completed, the user proceeds to define a base structure of the maze at 530. The base structure, for example, indicates a number of scenario layers of the maze and a number of choices of each scenario. A scenario layer refers to all scenarios of the same level after a choice is made. The number of scenarios of a next layer is equal to the number of scenarios and choices available. For example, in the case where there are 3 scenarios in a scenario layer, such as scenario layer 2, and one scenario has 3 choices while the other 2 scenarios have 2 choices, then the next scenario layer, such as scenario layer 3, would include 7 scenarios. The scenarios at the last layer correspond to the end of the maze.

To define the base structure of the maze, in one embodiment, the user selects on a structure option in the maze creation page. This directs the user to the structure definition section view or page. The user may define the base structure in the structure definition page. For example, the user may enter the number of scenario layers and number of choices for different scenarios. The structure definition page may provide for a default number of choices for the scenarios. For example, the system may define a default number of choices, such as 3, for each scenario. Other default numbers of choices for each scenario may also be useful. In some embodiments, the user may have an option to define other default numbers of choices. For example, the user may enter the default number in the structure definition page. In such cases, the user needs only to define the number of scenario layers and the default number. In the case the default number is set by the system, then the user needs only to enter the number of scenario layers. The structure definition page may also enable the user to define specific number of choices for different scenarios. Table 1 below shows an example of a base maze structure with 5 scenario layers and 3 default number of choices for each scenario:

TABLE 1

|         | Scenarios |
|---------|-----------|
| Layer 1 | 1         |
| Layer 2 | 3         |
| Layer 3 | 9         |
| Layer 4 | 27        |
| Layer 5 | 81        |

After the base maze structure has been defined, the structure definition page adds an option for the user to display the maze map. For example, a display map (or open map) button may be added to the structure definition page. By clicking on the button, the system displays the maze map for the builder user to navigate to different scenarios. The display map button may also be provided for the other section views as well, enabling the user to switch back and forth between different option views or pages and the map. For example, the map display button may be provided for the structure, content management and publication section views. In some embodiments, the section view and map view may be configured to be viewed together in one view (combined view) or multiple views on the display.

The user may define a scenario in the basic maze structure at 540. This can be achieved by clicking on the scenario in the maze display. A user may navigate to any scenario on the map to select the scenario. At the beginning of the process, no scenarios are defined. In such a case, each of the scenarios will all have a default status of a "placeholder", indicating no content in the scenarios. A scenario may have a status of "in progress" if it is being defined or "completed" if it is finished. Providing statuses for the scenarios easily informs the user of the progress of the maze. In one embodiment, the status of a scenario may be updated manually by the builder user.

Typically, the user will define the first or top scenario on the first layer. To select a scenario to define, the user may click on the scenario to be defined on the maze map. After selecting the scenario, the user may click the content management section option. This directs the user to the content management page for creating content for the selected scenario. In some embodiments, both the maze map and content management view can be configured to be displayed together. For example, clicking on a scenario on the map also brings up the content management view of the selected scenario. Displaying the maze map and content management view may, in some cases, depend on a size and/or resolution of the display. A builder user can easily jump to different scenarios by clicking on a desired scenario on the map view, causing the corresponding content management view to be displayed.

The content management view may include a map view and a page content view. The map view shows the maze map and can be activated by pressing the display map button on the page content view. The page content view includes details of the page associated with the scenario. For example, each scenario is associated with a content management page by a scenario page number. In other words, each scenario is associated with its respective content management page. The scenario page number is provided during the base definition of the maze structure. The page number can be changed by the builder user. For example, the builder user may assign a scenario title in place of the scenario page number. The title can be edited directly on the map view. For example, the builder user may click to edit the page number to a desired title on the map.

In one embodiment, the user may modify the base structure by adding or deleting pages manually. For example, scenarios may be manually added or deleted from the base structure. When a page is added, it serves as a placeholder for a scenario. The scenario may be a choice scenario with choices or an end state scenario with no choices, serving as an end of a path. In the case of a choice scenario, the user will also have to add pages corresponding to next scenarios linked to the choices until the end of path is reached. In the case of deleting a scenario, the system automatically deletes next scenarios related to the deleted scenario.

The page content view includes information of the selected page of the 3D program. In one embodiment, in the case of building a maze program, the page content view includes information of the scenario associated with the selected page. The page content view may also be referred to as the scenario page. Each scenario includes its own content management page with its own page content view.

The page number may be provided in the page content view of the selected scenario (selected page content view). In addition, there may be page information fields in which the user may enter or set details regarding the selected scenario. These fields provide information regarding the selected scenario. For example, page title, scene tag and status fields may be provided. The user can define a title of the scenario page in the page title field, the scene tag field allows the user to determine a color to facilitate identifying arbitrary paths in the map view and the status field indicates a status of the scenario page. As discussed, the status of the scenario page may be a placeholder (no content), in progress (incomplete content), or completed (finished).

The page content view also includes a content block for providing content of the scenario. The content block, depending on the type of scenario, may include a single content block or multiple content sub-blocks. For example, in the case of a choice scenario with choices, there may be a question content sub-block for the question and answer content sub-blocks associated with choices or answers of the question. For example, a choice scenario may have 1 question sub-block associated with the question and a choice content sub-block for each choice. In the case of an end state scenario, the content block may be a final message content block with a final message related to the end state. Other types of content block or content sub-blocks may be provided, depending on the type of 3D program which is to be built.

A content block or sub-block is provided with fields for selecting settings, actions as well as inputting information regarding the scenario. In one embodiment, fields may include a voice setting field, an image setting field, a point setting field and a goto setting field. Other fields may also be provided for the content blocks. The voice setting field enables the user to define a voice used in 2D mode. However, in 3D mode, a voice associated with the avatar which is set in the program configuration mode is linked. The image setting field enables the user to define an image to display in the 3D scene next to the scenario text. The points setting field enables the user to define a score (points) if the choice is selected in the scenario. The goto setting field enables the user to define the next scenario to go to if the choice is selected.

In addition, a content block includes a body text field. The body text field enables the user to enter text information associated with the scenario. The body text field may include various editing or formatting functions, such as those functions available in a text editor or word processor. For example, in the case of a question content sub-block, the user may input the question of the scenario in the body text field. In the case of an answer content sub-block, the user may input the choice available for the scenario. As for the final text content block, the user may input the final text message of the scenario.

Once the user is finished with the scenario page, the user updates the status field to "completed". Should the user leave the page before it is finished, the status field is updated to "in progress". At 550, if there are more scenarios to be defined, the process returns to 540 to define another scenario. The process of defining scenarios continues until all scenarios are completed.

The maze program content is automatically stored in the user's local computer while the user is working on it. For example, the maze program content is stored in the browser's memory. This provides convenience for the user to work on the maze program. In addition, saving the maze program in the browser memory enables the system to retrieve the maze program. This serves as a fail-safe in case the browser or the user's computer crashes while the user is creating the maze program. For example, the system has a copy of the maze program (unfinished) which can be used by the builder user to recover work done if lost due to a crash.

After the maze program is completed, the builder user may save the maze program. For example, the maze program may be saved in the user's user account in the system. The default save or publish setting is private, which means only the user can view the program. The setting may be switched to be viewable by selected users or to public, which means that the maze program is viewable by all users.

An overview page may be displayed by the system. For example, the user may select the overview page to be viewed. The overview page is, for example, displayed when the user logs into the system. The user may select a maze program. The overview page may include an overview menu icon. Hovering or clicking on the menu icon displays a menu of various functions which can be performed on the selected maze program.

In one embodiment, the various functions of the overview maze menu may include editing, test bot, set example path, move to folder, clone and delete. Providing other functions for the menu may also be useful. The editing function causes the system to return to the content editor map of the selected maze program. For example, the system returns to the content management page. In the case that there is a local draft, the system will query the user which version to use. The test bot function launches a stimulation of having automated users going through the maze course. The test bot function is useful for viewing to determine if there are any gaps as well as for generating analytics. The set example path function enables the user to set which path is the ideal path of the training. The move to folder enables the user to move to a folder created by the user. Folders may be useful in organizing the programs. A create folder function may be provided for the user at the top right corner of the page. The cloning function allows a user to make a copy of the saved program which can be customized for a different use case. This function can also be used to share generic mazes with users for use with their own organizations. The delete function is used to delete the program.

The maze program may be validated at 560. Validating the program may include testing the program to ensure that the maze program functions as desired or intended. For example, selection of choices directs the user to the next appropriate scenarios, appropriate scoring, correct message, as well as scene and voice. Validating the program may be facilitated by using the test bot function. For example, the user may click on the test bot function in the menu.

If the maze program is not validated, the process returns to 540 to edit the scenario or scenarios. For example, the user may select the scenario to modify so it functions as desired and goes through validation at 560. The validation/editing process repeats until the maze program is validated. Once validated at 570, the user publishes the maze program for access by other users at 580. For example, publishing the maze program puts it into a cloud storage so other users, such as learners, may train using the maze program. Trainer users may also access the maze program to modify it to customize the training to suit their purpose. The process ends at 590.

In developing the maze, the user can stop at anytime by saving the maze program and return to it and continue editing in another session. For example, the user may select the saved maze to continue editing.

As described, the process describes defining the base structure of the maze. This is only performed once. Once defined, the structure cannot be defined again. To make changes to the structure, the user can select a scenario page and edit it. For example, a user may delete a choice or answer block. Deleting a choice causes all scenarios in the lower scenario layers to also be deleted. Likewise, the addition of a choice adds scenarios associated with that added choice in scenario layers below. In one embodiment, the system processes the addition or deletion of choices by automatically modifying the maze structure. The added scenarios will, for example, take on a default number of choices as defined in the base structure definition. Alternatively, a user may manually add or delete the scenarios of the scenario layers below the added or deleted choice.

As described, the maze map includes a map of the scenarios and paths. The map view may be activated by clicking on, for example, the map view button on the content management page. The map can be dragged around using, for example, a mouse. Other types of pointers, such as a touchpad, may also be useful. The mouse wheel may be configured to zoom in and out of the map. In addition, there may be action icons on the map view page for zooming in, zooming out as well as to close the map. The action icons may be located on a top right corner of the map view.

The map includes the scenarios which may be represented by rectangular page or scenario blocks and arrows or lines indicating the paths. Other shaped blocks may also be useful, including circular shapes. The map includes information related to the scenarios. Such information may include, status, color tag, page number and title. In addition, the map may indicate a selected page for editing. The status of a scenario may be indicated by various techniques, such as color, solid versus dotted lines, words or a combination thereof. In one embodiment, the status may be indicated by an outline of each page or scenario. For example, a dotted grey line may indicate that the page is a place holder (e.g., no content), a solid grey line may indicate that the page is in progress and a solid green line may indicate that the page is completed. Other designations for the page may also be useful. The color tag of the page may be determined by a color bar on a side of the page block.

In one embodiment, the map view may include various functions related to the pages. For example, when the mouse pointer hovers over a selected scenario or page block, various block options are displayed for the selected page. The block options, in one embodiment, include title, editing, deleting, adding, as well as color. The title option enables user to define a title of the page, the editing option opens the page content editor for the selected page, the delete option deletes the selected page and entire path below the selected page, and the color option sets the color tag for the selected page. When a page is selected, an icon, such as a red icon, may indicate that the page is a currently selected page.

Figure 5B:
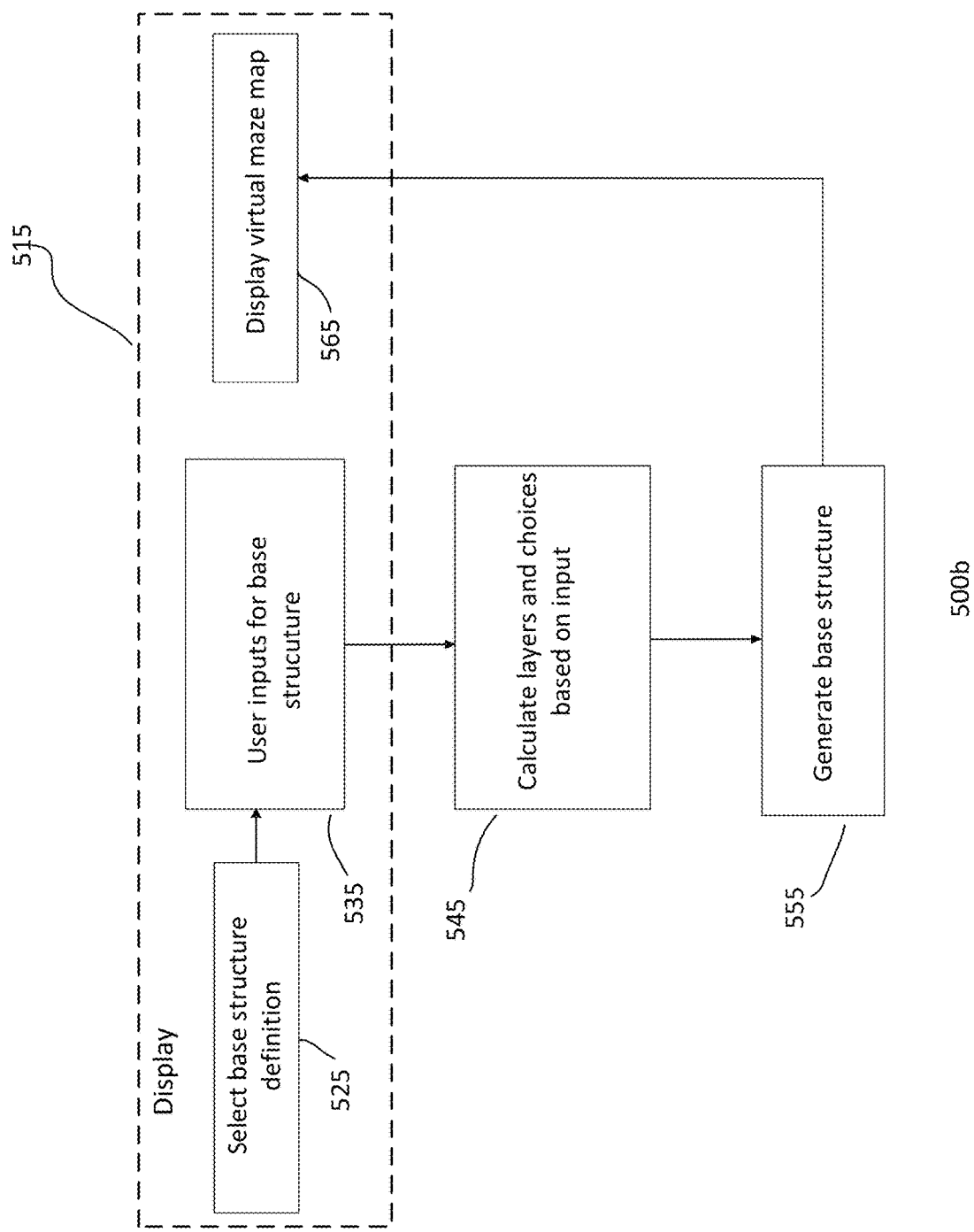

FIG. 5b shows a block diagram of an embodiment of a process 500b for defining a base structure of the maze. As shown, blocks 525, 535 and 565 are displayed on the user interface of the user device. When the user desires to define the base structure, the user selects on the structure option in the maze creation page. The display launches an input page at 525. The user inputs information related to the base structure in the input page at 535. For example, the user inputs the number of layers of the maze and the number of choices for each scenario. For example, the user may input 5 layers with three choices for each scenario.

The system calculates the number of layers and choices for each scenario based on the user input at 545. At 555, the system generates a base structure according to the user input. At 565, the system displays the virtual maze map generated based on the user input.

FIG. 5c shows an embodiment of a training session 500c by a learner user. A learner user starts the training session at 511. For example, the user may log in to the system. To login, the user may access the site of the system and click on the login button and provide the necessary login information, such as username and password.

Once successfully logged into the system, the system may display a user overview or home page, which enables the user to select from various options. In the case of a learner user, the user home page may provide information with respect to training programs. Such training program information may include available training programs for the user, past training programs, performance of past training programs, recommended training programs, as well as training programs that have not been completed. Other information may also be provided.

The user may perform initialization at 521. Initialization may include selecting the maze to run. The maze program may be one which is assigned, based on a recommendation, one which is available or one which has already been started. Selecting the maze program causes the system to load and run the maze program to commence training at 531. For example, the maze program is launched on the user device. The maze program is launched with a 3D environment if the user device supports 3D. If not, it is run in a 2D environment. In addition, the user may select the maze program to run in a VR mode.

In the 3D mode, at 541, the scenario is displayed on the display of the user device. The scenario, for example, is a 3D scene with a host (selected avatar or host). In the 3D environment, the host will present the scenario through voice. The scenario, in one embodiment, is based on a text in the question content block. The host, voice, and language of the scenario presented may be according to selections by the builder. In addition, the host may include lightly and naturally animated with lipsync, gestures and blinking, as selected by the builder.

After presenting the scenario, the host will provide the various choices for the scenario. The choices, for example, are based on the answer blocks. For example, the host may present the choices, similar to the scenario. Likewise to the presentation of the scenario, the host may be configured to be lightly and naturally animated with lipsync, gestures and blinking.

The user, based on the scenario, selects a choice presented. The user may select the choice using various techniques. The user may select the choice by using voice. For example, the user may speak the selected choice, such as speaking the desired option. This may be by speaking option 1, option 2 or option 3 or reading the text of the choice. Other terms may be spoken to effect the desired choice to be selected. The system may utilize speech-to-text capabilities to effect the selection by the user. Other techniques for selecting the choice may be also useful, such as by clicking on the choice. The system may be configured to enable multiple techniques for selecting the choice.

In the virtual reality mode, it may be similar to the 3D environment, except that a VR headset enables the user to be in the environment itself. For example, the user may turn its head and effect a shift in the scene of the scenario. To select the desired choice, the user may speak the choice. Other techniques for effecting the selection of choices may also be useful. For example, virtual reality hand gear may be used to select the desired choice.

In the case of text mode, the user device may display the text of the scenario and the choices. The user may select the choice by clicking on the desired choice. In the case of voice mode, the user device verbally communicates the scenarios and the messages to the user. The user may use voice to select the desired choice. In the case of text and voice mode, the scenario is presented to the user in both text and voice, and the user has the option to either click or speak the desired choice.

According to the choice selected, the user is directed to another scenario in a lower scenario layer. However, before the user is directed to another scenario, a final message is provided to the user. The final message, for example, is based on the content of the final text block. The process repeats in presenting the scenario, presenting choices, selection of a choice by the user, presenting the final message, until there are no more scenarios at 551.

The system tracks details of the training by the user. For example, the system tracks a time it takes for the user to complete each scenario and a score of each scenario based on the choice selected. Other metrics may also be tracked by the system. At 561, the user may be presented with a score of his training based on the choices made. The training terminates at 591.

As discussed, the user may suspend the training session at any point in the process. Upon suspension, the system saves the information of the training up to that point. Such information may include scenarios completed, choices and time to finish each completed scenario as well as scores of each completed scenario based on choices selected. The user may return to the suspension point at any time to complete training on the maze.

Furthermore, information captured based on the performance of the user may be analyzed later. For example, analytics may be performed to determine strengths and weaknesses of the user and to recommend other mazes for training to further improve performance. This is particularly useful for companies to understand their employees and how to enhance their performance, improving overall performance of the company.

Figure 5D:
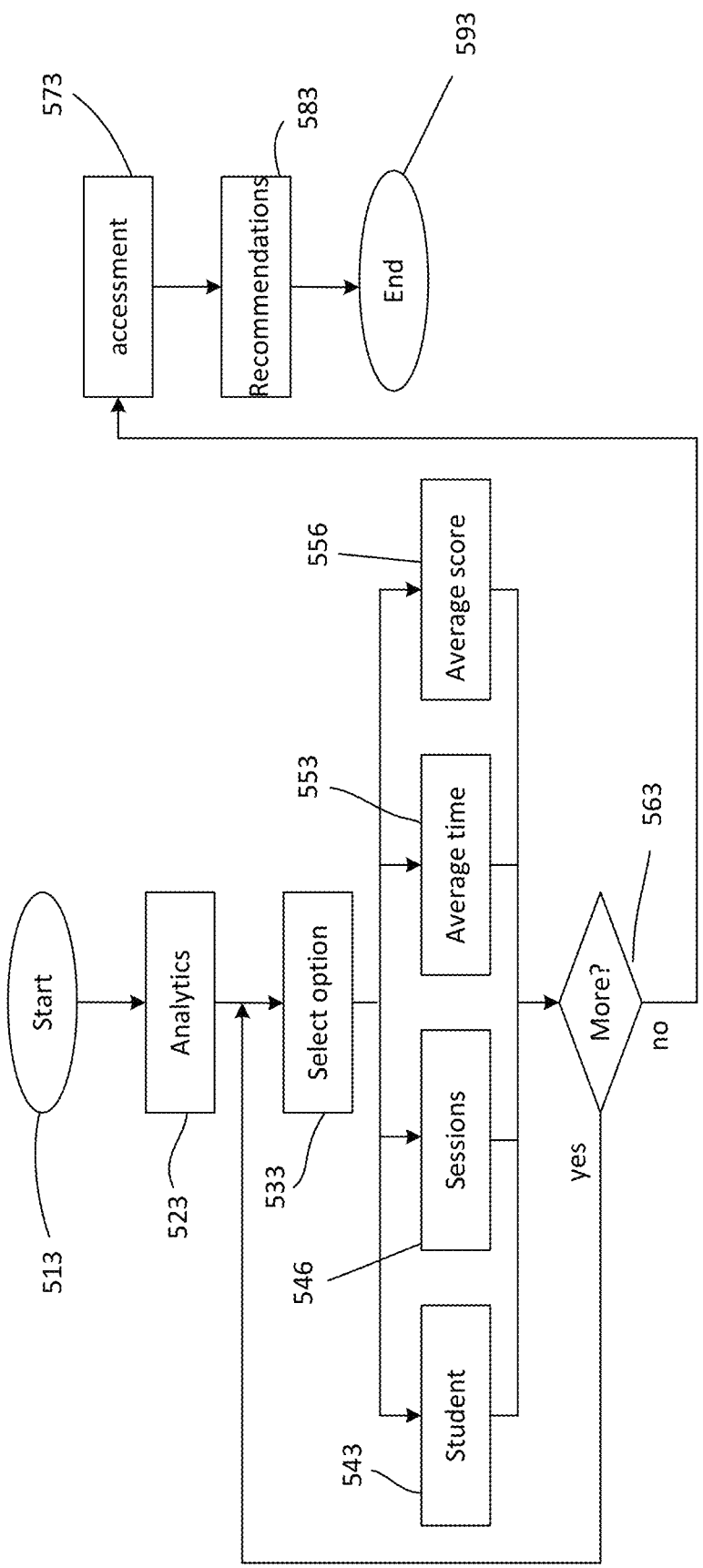

FIG. 5*d* shows an embodiment of performing analytics 500*d*. At 513, a user, such as a trainer or an administrator user, may start the analytics process. Typically, the administrator user is a trainer user. For example, the user may log in to the system. To login, the user may access the site of the system and click on the login button and provide the necessary login information, such as username and password. Once successfully logged into the system, the system may display a user overview or home page, which enables the user to select from various options. One option available is to perform analytics. Selecting the analytics option at 523 directs the user to the analytics page.

In one embodiment, the overview page may include sessions blocks. A sessions block, in one embodiment, is a folder containing information of all training sessions taken by all users for a specific maze program. Different sessions blocks are provided for different maze programs. For example, the overview page groups the different maze programs into respective sessions blocks. The sessions blocks may be arranged by alphabetical order. Arranging the sessions blocks according to other factors, such as date of creation, may also be useful. Providing the user an option to change an ordering of the sessions blocks may also be useful. By selecting a sessions block, the system directs the user to the analytics page which contains detailed session information for the maze program associated with the sessions block. For example, the analytics page of a specific program may be accessed by clicking on a sessions block for the specific program on the overview page. Selecting the specific program in the overview page directs the user to the program analytics page for the selected maze program.

The program analytics page contains details of training sessions of a specific training program taken by all users. The details may include, for example, user information, number of times that the user has taken the training program, date and time that the sessions were started, status of the sessions, details related to the sessions, such as total score of the sessions, time required to complete the sessions, choices made at each scenario of the sessions, score at each scenario (or page) of the sessions and time taken at each scenario of the sessions. Other information useful for analytics may also be provided. The various session information may be contained in the program analytics page as well as other pages accessed through the analytics page, such as drill-down pages.

The program analytics page includes various sections or options to view different types of information. At 533, the user can choose the various sections or options to view different types of information. The different sections may be selected by clicking on the appropriate tab on the program analytics page. In one embodiment, the program analytics page includes a student tab, a sessions tab, an average time tab, and an average score tab. The student tab includes the number of students who have taken the maze program, the sessions tab includes the total number of sessions taken by all the students, the average time tab includes the average time of all the sessions, and the average score includes the average score of all the sessions. Providing other tabs for other sections may also be useful. The different tabs provide the user with different information. The user may select the student tab at 543, the sessions tab at 546, the average time tab at 553, or the average score tab at 556.

Selecting the student tab causes the program analytics page to display a section which includes the number of students who have taken the maze program and the number of times that the student has taken the program. In one embodiment, the student section groups the specific training sessions according to users. For example, the student section may include a folder for each user who has taken the maze program. In the case of 10 users who have taken the maze program, there would be 10 user sessions folders. The folders, for example, may be displayed in a row format. In one embodiment, a row corresponds to a user who has taken the maze program. In addition, a row contains the number of times that the user has taken the same maze program. The user sessions folders may be arranged in alphabetical order. Arranging the user sessions folders according to other factors may also be useful. Providing the user the option to change the ordering of the user sessions folders may also be useful.

In addition, a user sessions select button may be provided in the row to select the sessions taken by that user. Selecting the user sessions select button directs the user to the user sessions section, which contains the session details of each session taken by that user. In some cases, the user sessions section may be a user sessions page. Other configurations of the user sessions may also be useful. Details of a session may include user information, date and time that the session was started, status of the session, details related to the session, such as total score of the session, time required to complete the session, choices made at each scenario of the session, score at each scenario (or scenario page) of the session and time taken at each scenario of the session.

The session information may be grouped by each session. For example, each session taken by the user has a session folder which contains the details of that session. The session folders may be arranged in chronological order, such as the most recently taken session being first in order. Arranging the session folders in other configurations may also be useful. Providing the user an option to change the ordering of the session folders may also be useful.

In one embodiment, the session folders are displayed in a row format. For example, each row corresponds to a session. A session row may include the date and time that the session was taken, the duration of the session, the score of the session, and the status of the session. The status may indicate that the session is "completed", "in progress" or has an "error". An error may refer to a misconfiguration in the maze program. For example, an error may include missing a goto page for a choice scenario or a scenario without any choices or an end state. In addition, a select button may be provided for each row to select the session. Selecting the session may be achieved by clicking on the session select button for the specific session. Selecting the session directs the user to the session details section for the selected session. The session details section may be a session details page.

The session details section displays the session details of the session. For example, session details include scenarios and choices made at each scenario, time taken at each scenario, a score of each scenario, and a status of each scenario.

In one embodiment, the details may be provided in row format. For example, each row corresponds to a scenario or page. A row includes the page number of the scenario, title of scenario, choices available and the choice selected by the student, the score of the choice and status of the scenario. Depicting the session details in other formats may also be useful. For example, the session details may be depicted in graphical form for analytics.

In one embodiment, the session details may be depicted in a screenie format. For example, the session details may include a graph with nodes corresponding to scenarios and paths connecting the scenarios which are dependent on choices made by the student. The nodes, as shown, are circular shaped nodes. Different shaped nodes may also be employed. For example, different shaped nodes may be employed to distinguish the different nodes.

The nodes may be interconnected by a line representing the path taken by the student user. For example, a graph includes a session path taken by the user based on choices made. The line connects the page to the next page according to the choice made, with the choice disposed between the two scenario pages.

In addition, the graph may include one or more ideal paths. An ideal path can be defined in the program menu or in the user session detail section. The ideal path is created to indicate what is believed by the trainer or organization to be a best path that the student user should take. The ideal path or paths may be employed to benchmark a student's knowledge against expectations of the trainer, both before and after the session. Different ideal or example paths may be used for different comparisons, serving different objectives. This is an important feature as it easily provides benchmarking of a student's knowledge against the expectations of the trainer, both before and after a session or course.

In one embodiment, color coding may be employed to represent different elements or components of the map. For example, scenario components may have a scenario color, choice components may have a choice color, potential paths may have a potential path color, a session path may have a session path color and an ideal path may have an ideal path color. In addition, various scenario colors may be employed to identify the types of scenario components. For example, an end state scenario may have an end state scenario color and a choice scenario may have a choice scenario color. In addition, other scenario colors, such as still in progress color and error color may be provided for a scenario component to indicate its status. Other techniques may also be employed to distinguish the different components, such as size and shape or a combination of size, shape, and color. This enables the trainer to easily discern differences between the ideal path and session path. Also, details of the scenarios and choices may be displayed by clicking on the scenario or choice components. The details may also include the time taken at the scenario. Other information may also be provided for each scenario and choice.

In one embodiment, the analytics page also includes a comparative function. The comparative function compares one or more sessions, whether completed or not, against each other and/or with the ideal session. Using a filtering function, the trainer can select the sessions to be compared. For example, student users may be grouped by categories. The trainer may select sessions of a desired group of users to be compared. The filtering function may be used to select the latest sessions of the users or all sessions from a user. Other filtering configurations may also be useful.

As an example, a comparison of the latest sessions of all the users may be performed against the ideal session. The results may be graphically shown in a screenie or graph. The graph, as discussed, includes scenario components and connected by session paths of the different student users and one or more ideal paths. The different components can be distinguished by color, shape and/or size, as previously discussed.

In one embodiment, scenario and choice components are circular shaped components with different colors, such as dark blue for scenarios and light blue for choices. Status colors may be provided for scenario components to indicate their statuses. For example, a completed color, such as green, may be provided to a scenario component to indicate that it is a completed path, an in progress color, such as yellow, may be provided to indicate that the scenario component has not been completed while an error color, such as red, is provided to indicate an error. Scenario components may also include a number and the path may also have different thicknesses to represent the number of sessions that took that path. In addition, an ideal session path color, such as green, represents the ideal path. Other configurations for distinguishing the different components as well as the number of sessions that have taken a specific path may also be useful.

Selecting the student tab causes the program analytics page to display the number of students who have taken the maze program and the number of times that the student has taken the program.

Selecting the sessions tab causes the program analytics page to display the sessions taken by all users. The session information may include users, date and time taken by users, duration of the session, status, and scores. The session information may be displayed in a row format. In addition, the session information may be depicted in a simple graph.

Selecting the average time tab causes the program analytics page to display the average time of the sessions taken by all users. The average time information may be displayed as a simple graph or chart.

Selecting the average score tab causes the program analytics page to display the average score of the sessions taken by all users. The average score information may be displayed as a simple graph or chart.

At 563, if there are more analytics to be performed, the user returns to 533 and selects one of the analytics options. This process repeats until analytics is completed. At 573, the user accesses results of the analytics. For example, the trainer, based on the various information, can assess strengths and weaknesses of the student. Based on the assessment, the trainer may provide recommendations at 583 to strengthen the weaknesses or new courses for further development and growth of the student. The analytics is completed and terminated at 593.

FIG. 5e shows a block diagram of an embodiment of a process 500e for analyzing the results of a student session, identifying weaknesses and making recommendation or creating customized set of courses to improve the student skills. An evaluator, at 509, may retrieve a student's session results. For example, the path taken by the student is retrieved. The path taken by the student is compared with an ideal path at 519. In addition, all points assigned to the student's selected choice are retrieved at 529. Other information related to the session, such as time spent at each scenario, is also retrieved at 539. At 549, analytics is performed based on the retrieved information from the session. For example, artificial intelligence (AI) may be employed to determine a current skill state or level of the student based on the retrieved information as compared to what is expected. Form the analytics, the system may recommend next relevant courses to enroll to improve the student's skill set at 559. The system may also automatically create a set of customized courses from existing courses at 569 for the student to take. For example, individual courses may be pulled from different programs to create a new set of customized courses for the student.

Figure 6:
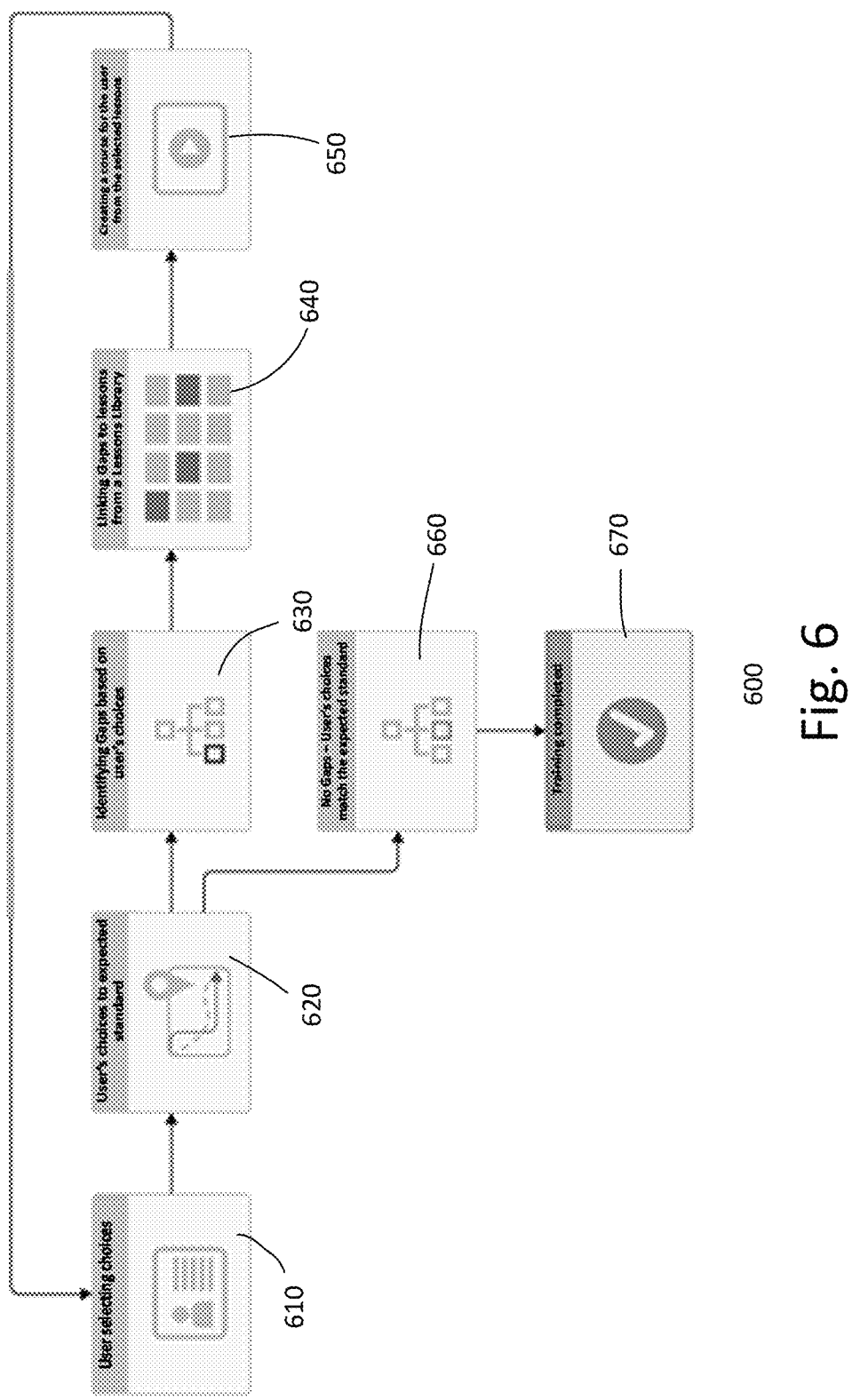
FIG. 6 shows an exemplary workflow of a maze framework integrated with a content and learning management platform.

FIG. 6 shows a workflow 600 of a maze framework integrated with a content and learning management platform (integrated platform). Integrating the maze framework with the content and learning management platform facilitates benchmarking which will be used to dynamically create custom maze courses with only relevant content for a specific student. For example, the workflow can be employed to create custom maze courses for one or more students. The workflow creates a custom course based on a student's individual level of knowledge or knowledge gap to strengthen the student's weaknesses.

In one embodiment, a student user starts a maze training session at 610 of a selected maze program. The training session, for example, is the first training session by the student of the selected maze program. Upon completion, results of the training session are stored in the memory of the platform. The results of the first training session serve as a benchmark for the student user's current state of knowledge.

Analytics is performed on the results of the first training program at 620. In one embodiment, the platform is configured to automatically perform analytics on the results of the first training session. In some cases, the trainer user may manually instruct the platform to perform analytics on the results of the first training session. Analytics include, in one embodiment, comparing the results of the first training session with that of the ideal session path at 630. For example, the training session path is compared with an ideal session path. From the analytics, gaps in the training session path are identified at 640. A gap refers to when the student's choice is different from an ideal choice, causing the path to diverge from the ideal session path. Gaps refer to when the choices of the student diverge from the ideal choices, causing a divergence between the training session path and the ideal session path. For example, gap-choice pairings cause divergence in the training session and ideal session paths.

The platform may include a library of 3D courses, such as maze courses. In one embodiment, the lessons are specifically created for an entity, such as a corporation. Other types of entities may also be useful. The student, for example, is affiliated (such as an employee) with the entity. Accordingly, the maze course is located in the entity's library or in a library which is only accessible by the entity. The lessons may include tags for identifying lesson types. The tags may also be used to identify purposes of the lessons, such as types of gap-choice pairings the lessons address. The gap-choice parings may be linked to specific lessons in the library. In one embodiment, gap-choice pairings may be performed by the administrator. For example, a scenario may be linked specifically by tags to one or more specific lessons by the administrator user.

Based on the gap-choice parings, lessons which are linked are selected from the library and are used to form a new course at 650. In one embodiment, the platform is configured to automatically create the new course based on the selected lessons linked to the gap-choice pairings. Alternatively, the new course may be manually generated by the trainer or administrator based on the gap-choice pairings. In one embodiment, creating the new course may be achieved by combining the lessons together. The new course, for example, is only accessible by the student. For example, the new course is a custom-tailored course for the student to address the gaps. The new course, for example, is similar to the maze program of the first training session but includes minor changes based on the gap-choice pairings to address the gaps. The new course is recommended for the student to take.

The student may take the new course at 610. Alternatively, the student may retake the same maze program as the first time. Preferably, the student takes the newly generated course. This is because taking the newly generated course which is slightly different from the previous maze program avoids the user from intentionally not making certain choices based on his/her past experience with the previous maze program.

The workflow at 610, 620, 630, 640 and 650 repeats until there are no gaps identified from the training session at 660. At 670, the student has successfully completed the training.

In some embodiments, the integrated platform may include live assessment of the training session, such as with a live audience. For example, after the student has completed the program successfully through the platform, the student may take the maze program on live. The live assessment feature allows the student to prove to his/her peers that he/she has successfully learned the lesson.

Figure 7:
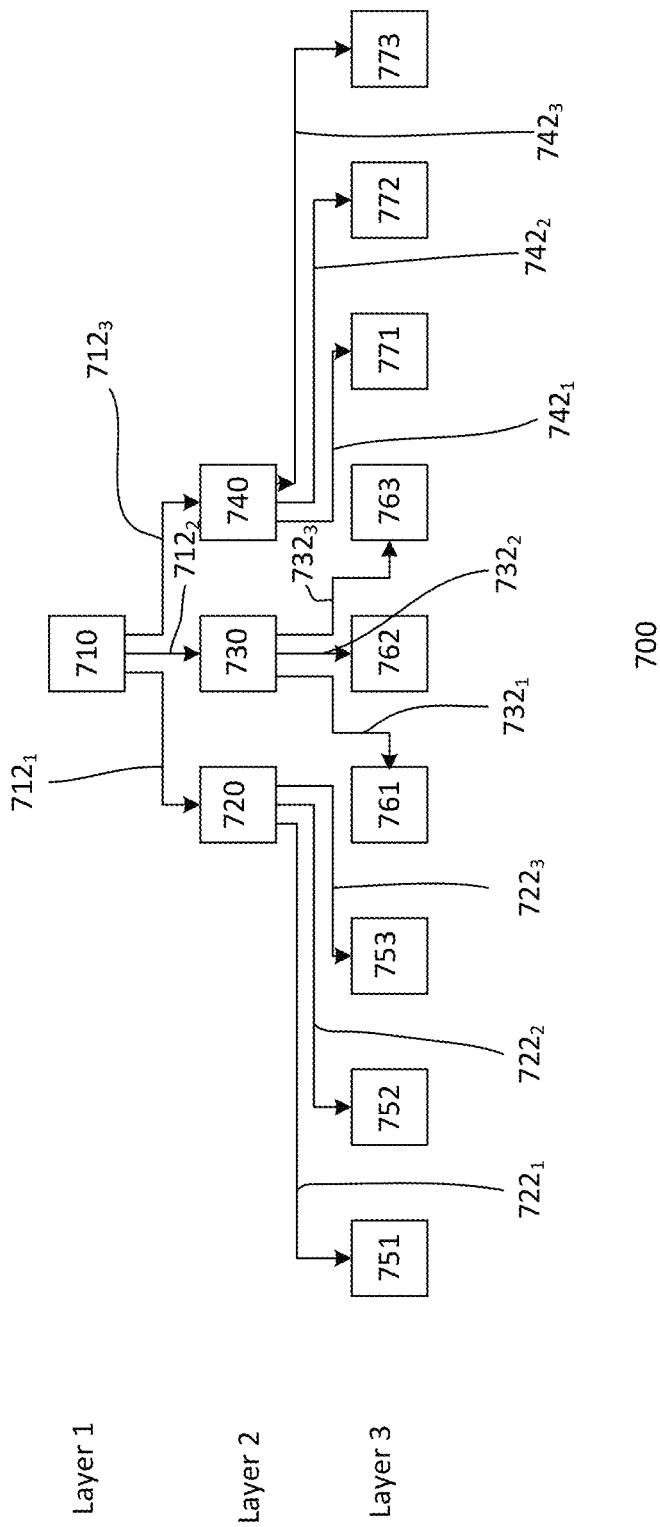
FIG. 7 shows an exemplary embodiment of a maze structure of a maze program.

FIG. 7 shows an exemplary embodiment of a maze structure 700 of a maze program. As shown, the maze structure includes 3 maze layers, layer 1, layer 2 and layer 3. Layer 1 of the maze structure is the highest level layer while layer 3 is the lowest level layer of the structure. At the highest level layer, there is one scenario 710. For example, the scenario is a starting scenario of the maze program. Illustratively, the scenarios of the maze program each include 3 choices or answers. It is understood that the scenarios may have other numbers of options as well as different numbers of options for different scenarios.

For layer 2, there are 3 scenarios 720, 730 and 740, corresponding to the 3 choices of the scenario at layer 1, as indicated by links or paths $712_1$-$712_3$. As shown, each of the scenarios at layer 2 has 3 choices, which lead to scenarios at layer 3. For example, scenario 720 links to scenarios 751, 752 and 753 by paths $722_1$-$722_3$, scenario 730 links to scenarios 761, 762 and 763 by paths $732_1$-$732_3$, and scenario 740 links to scenarios 771, 772 and 773 by paths $742_1$-$742_3$. In this example, the scenarios at layer 1 and layer 2 are choice scenarios while scenarios in layer 3 are end state scenarios. For example, end state scenarios correspond to the end of the training session. It is understood that the exemplary maze structure is merely for illustration purposes and that a maze structure, as discussed, may deviate from the exemplary structure.

Figure 8A:
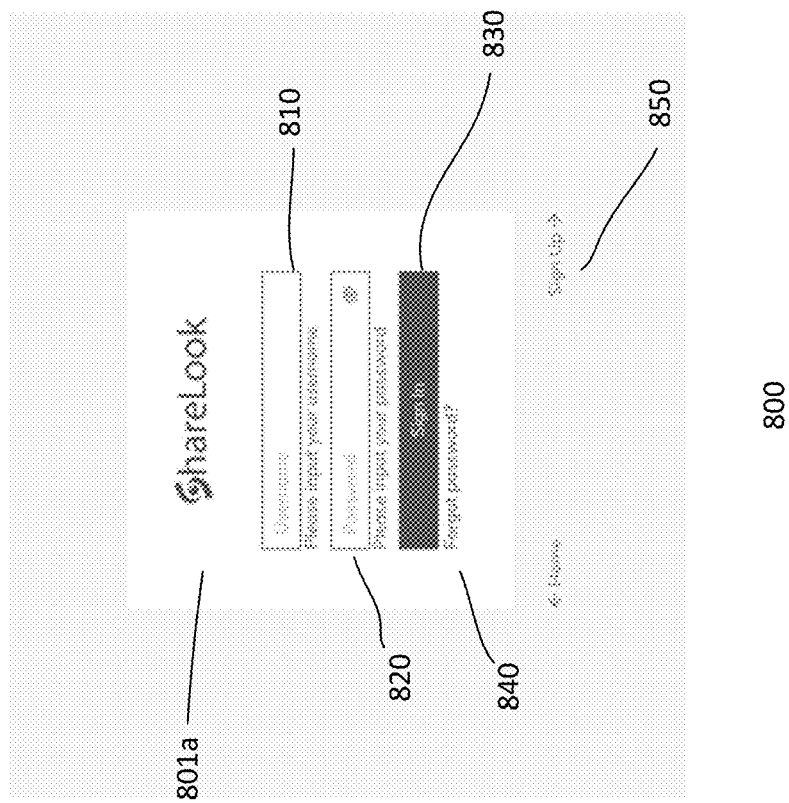
FIGS. 8a-8j show various exemplary pages or views displayed during various processes of a maze framework.

FIGS. 8a-8j show various screenshots of exemplary pages or views of the platform 800 in different stages of creating a 3D program. Referring to FIG. 8a, an embodiment of a login page 801a is shown. The login page includes input boxes for inputting login information and action selectors for performing selected actions. In one embodiment, the login page includes a username input box 810 and a password input box 820 for inputting username of the user and password of the account. As for action selectors, the login page includes a sign in action selector 830, sign up action selector 850 and a forgot password action selector 840. Clicking on the sign up selector causes the login page to direct the user to a sign up page which collects information of the user for the user account, such as name, password, address, type of account (e.g., student, builder, or administrator), organization, title as well as other information. A registered user, after inputting login information, may click on the sign in selector which will direct the user to an overview page of the platform.

Figure 8B:
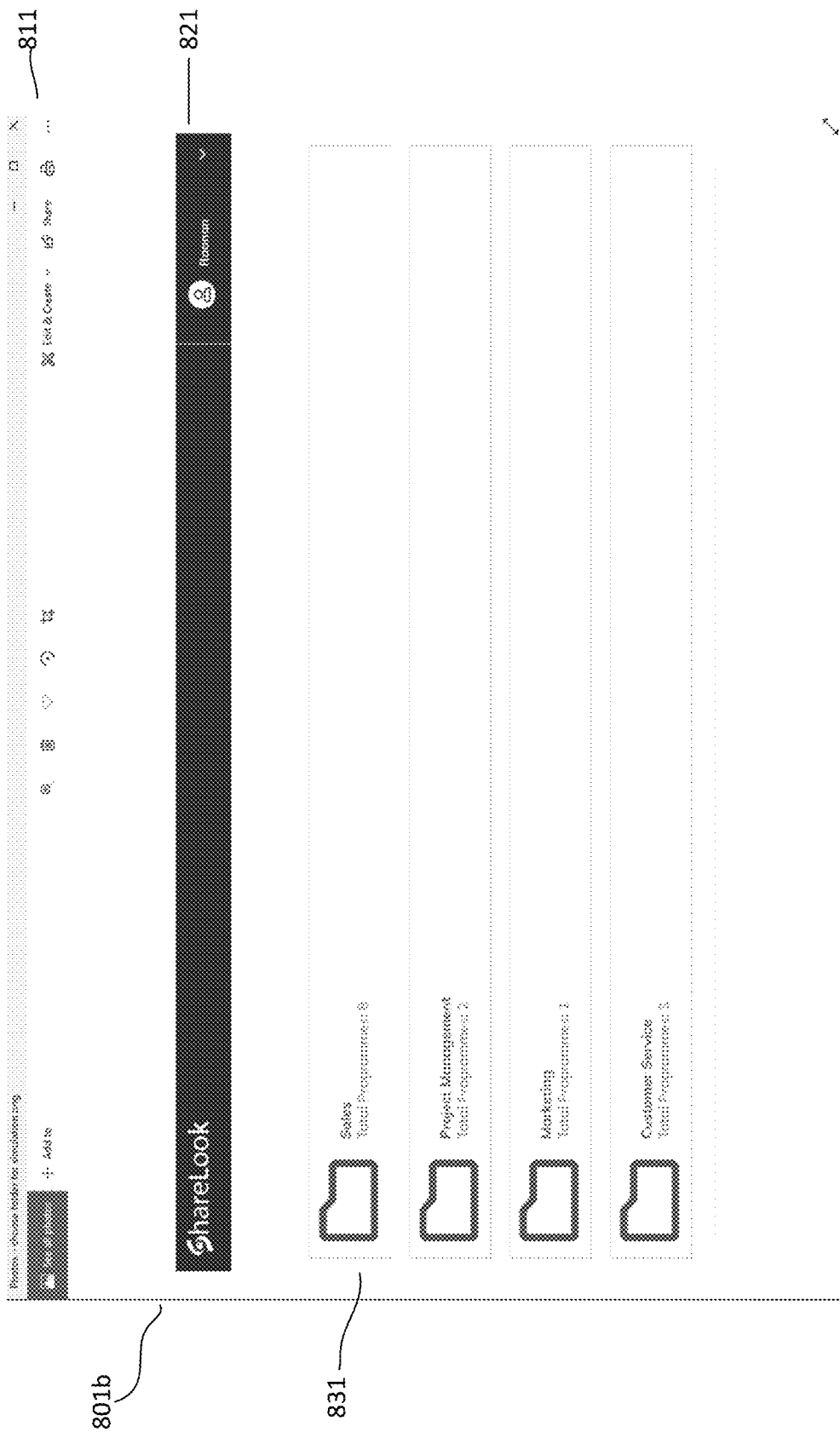

FIG. 8b shows an embodiment of an overview page 801b of the platform. The overview page may be displayed, for example, after logging into the platform or after saving a 3D program by a builder user. The overview page, as shown, includes a ribbon 811 with various commands, an information bar 821 and a program overview section 831. The ribbon includes various commands. For example, the ribbon may include a show all photos command, a magnify command, a delete command, an edit and create command, a share command and a print command. Providing other commands for the ribbon may also be useful. As for the information bar, it includes information of the user, such as username. Also, the information bar may include the platform name. Providing other types of information may also be useful.

The program overview section displays folders containing 3D programs. As shown, the 3D programs are organized by folders. For example, each folder may contain a category of 3D programs. Illustratively, the 3D programs are grouped into 4 folders, a sales folder, a project management folder, a marketing folder and a customer service folder. Additional information, such as a number of 3D programs within the folder, is also provided. To view the programs in a folder, a user may click on the folder. For example, clicking on a folder causes the programs within the folder to be displayed. A 3D program may be selected by the user, for example, for editing.

Figure 8C:
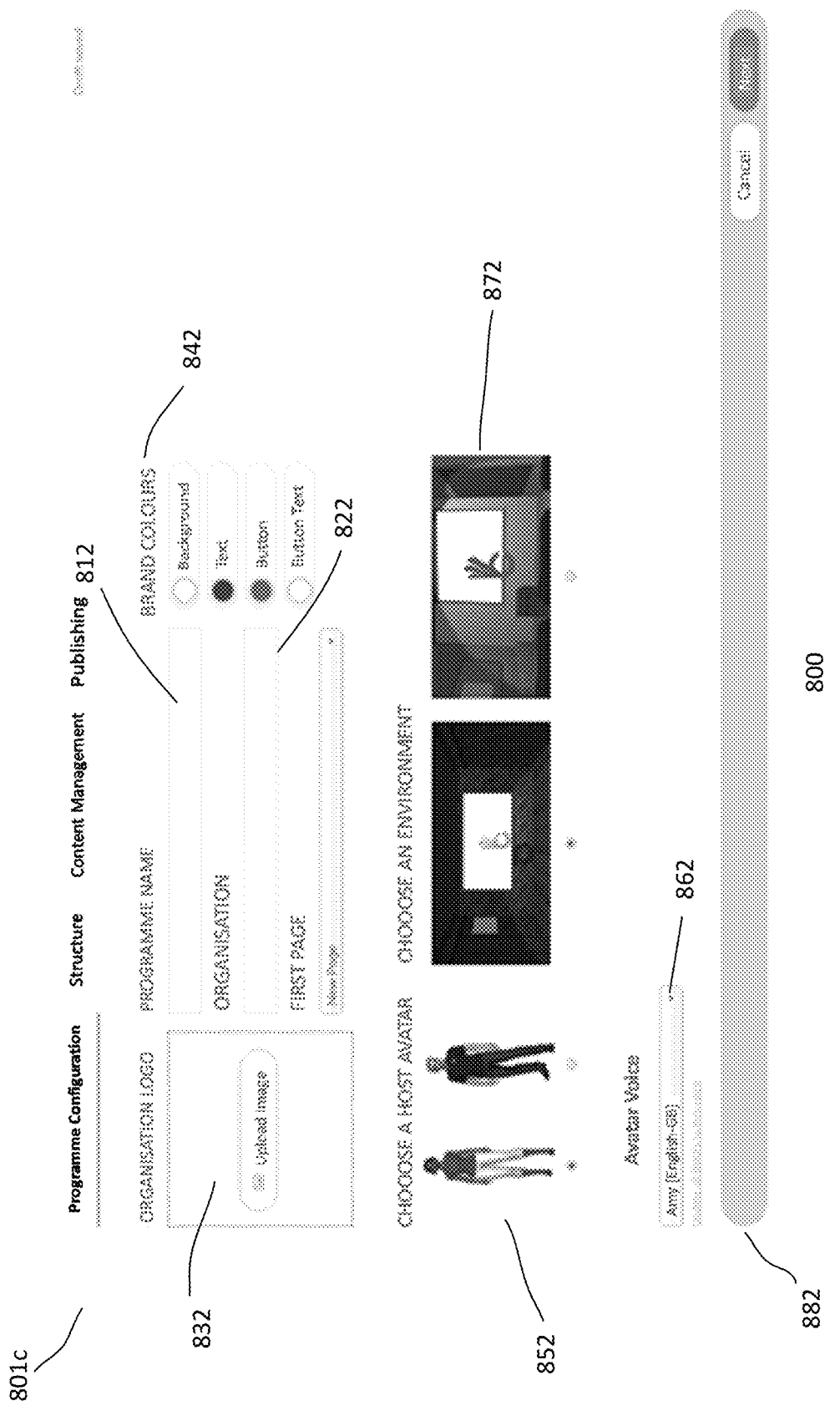

FIG. 8c shows an embodiment of a program configuration section view 801c of a program creation page within the platform 800. The program configuration section view, in one embodiment, is a first of four section views for the program creation page. For example, the program creation page includes a program configuration section view, a structure section view, a content management section view and a publishing section view. The different section views may be accessible by clicking on a desired section view to select it for display.

The program configuration section view includes features for initial or basic setup of the 3D program, such as the maze program. For example, input boxes 812 and 822 are provided for a name of the 3D program and an organization associated with the program. The program section view may also include an image upload section 832 for uploading an image, such as an image of the organization logo. A brand colors selection section 842 is provided to select different colors for different components of a training page, such as background color, text color, button color and button text color.

In one embodiment, the program configuration section view further includes an avatar select section 852, an avatar voice select section 862 and an environment select section 872. The avatar select section may include available avatars for a user to select as a host or trainer. As shown, the avatar select section includes 2 available avatars. Providing an avatar select section with other numbers of avatars may also be useful. The avatar voice select section includes a drop down menu of voices, including language, for the user to select. As for the environment select section, it includes environments in which the training is conducted. As shown, the environment select section includes 2 available environments from which to select. Providing other numbers of environments in the environment select section may also be useful.

An action bar 882 may also be provided by the program configuration section view. As shown, the action bar includes a cancel button and a next button. Selecting the next button, for example, causes the next section view to display, such as the structure view.

Figure 8D:
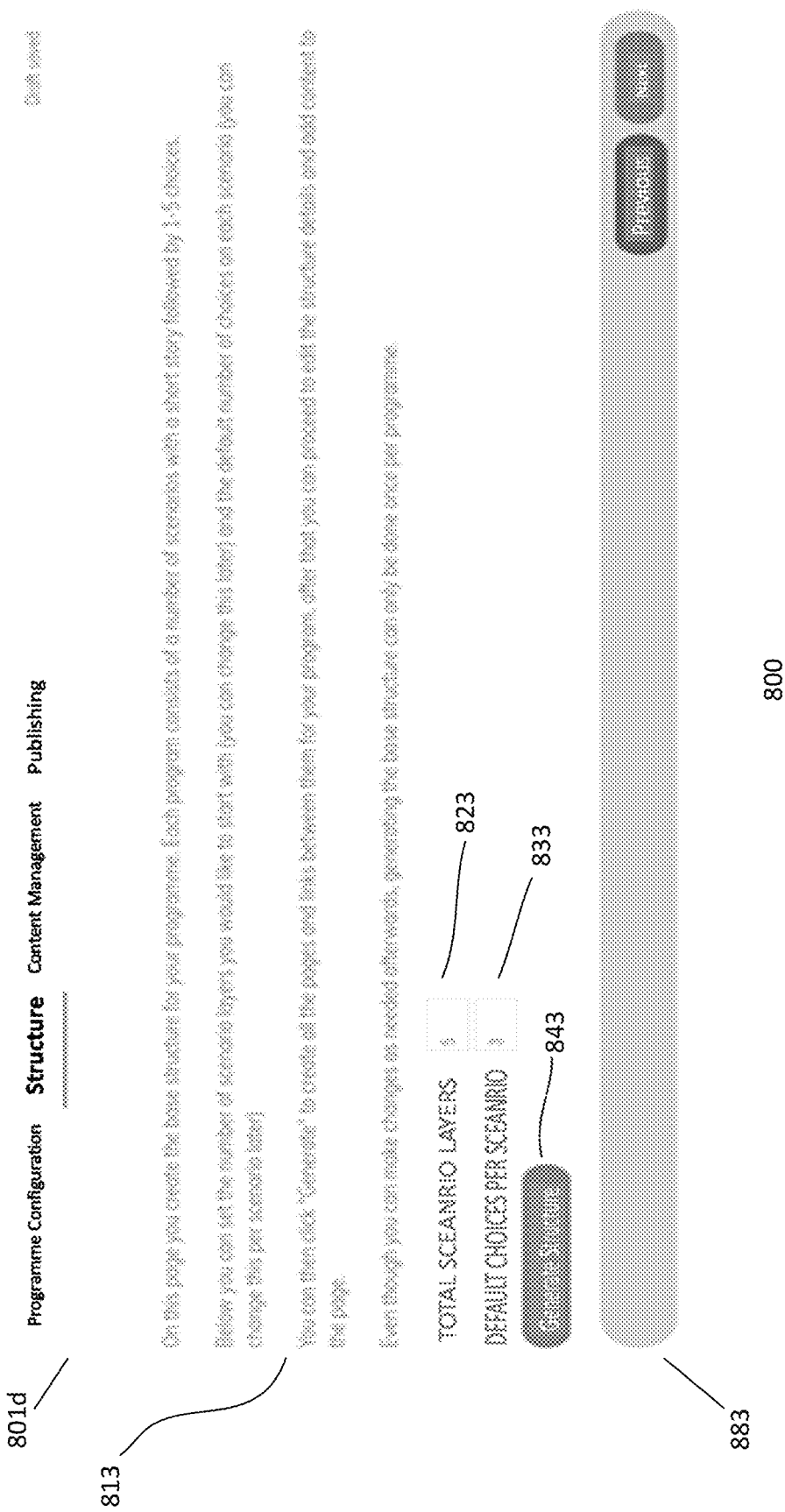

FIG. 8d shows an embodiment of a structure section view 801d of a program creation page within the platform 800. The structure section view, for example, may be a second of the four section views for the program creation page. The different section views may be accessible by clicking on a desired section view to select it for display. Alternatively, the structure section view may be accessed by clicking the next button on the program configuration section view.

The structure section view includes features for defining the base structure of the maze program. In one embodiment, the structure section view includes an information section 813, a total scenario layers input box 823, a default choices per scenario input box 833 and a generate structure action button 843. The information section includes information informing a builder user how to generate a base structure. The builder user may input a desired number of scenario layers in the total scenario layers input box and a desired number of choices per scenario in the default choices per scenario input box. Once the information is provided in the input box, the builder user may click on the generate structure action button, causing the platform to generate the base structure accordingly.

The structure section view also includes an action bar 883. As shown, the action bar includes a previous button and a next button. Clicking on the previous button causes the platform to display the previous section view (e.g., program configuration section view) while clicking on the next button causes the platform to display the next section view (e.g., content management section view).

Figure 8E:
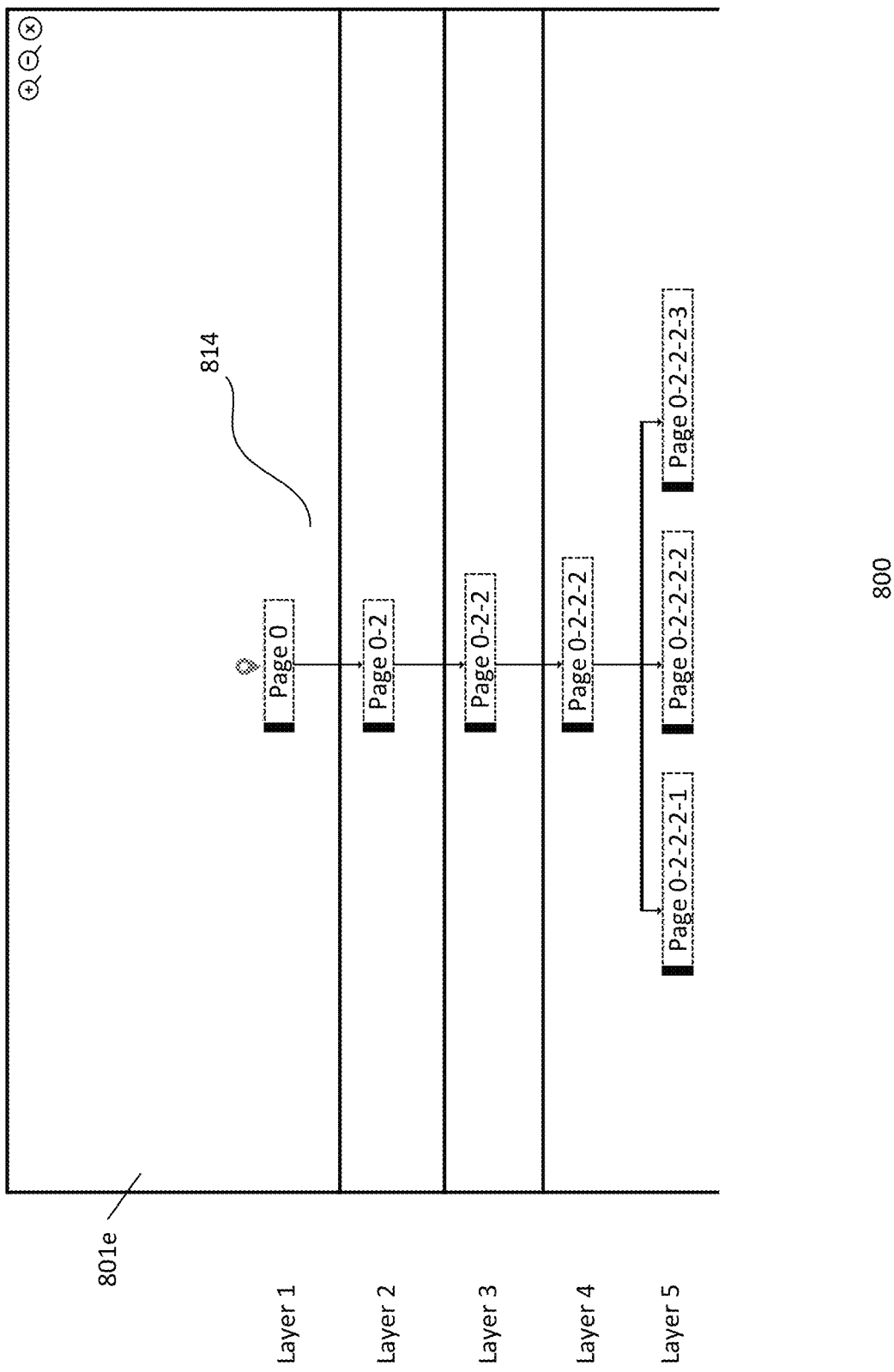

FIG. 8e shows an embodiment of a map view 801e of a base structure of a 3D program within the platform 800. As shown, the map view is generated by the platform based on user input in the base structure section view. For example, the map view shows a base structure with 5 layers, each with scenarios indicated as boxes. The map view shown is only a portion of the map view. For example, the portion shown includes a top scenario in layer 1, a layer 2 scenario in layer 2 which corresponds to one of the 3 choices of the top scenario, a layer 3 scenario in layer 3 which corresponds to one of the 3 choices of the layer 2 scenario shown, a layer 4 scenario in layer 4 which corresponds to one of the 3 choices of the layer 3 scenario shown, and 3 layer 5 scenarios corresponding to the 3 choices of the layer 4 scenario shown. The scenarios in layer 1 to 4 are choice scenarios while the scenarios in layer 5 are end state scenarios.

Although shown is only a portion of the base structure, it is understood that the complete base structure includes other scenarios. For example, layer 2 includes 3 choice scenarios, layer 3 includes 9 choice scenarios, layer 4 includes 27 choice scenarios and layer 5 includes 81 end-state scenarios. The number of scenarios shown may depend on, for example, a size of the display. The larger the display, the more scenarios can be shown in the map view. A user may navigate the map by using a pointer or mouse.

As shown, a scenario is represented by a rectangular component. Choice or next scenarios are connected by lines to a previous scenario. A designator 814, such as a location pin, may be used to indicate a selected scenario. For example, a user may select a scenario to define by clicking on it. At the beginning, a scenario may be provided with a page number designed by the system. However, the user may assign a title to each scenario. The title may be input directly into the scenario component. In addition, the map view may include commands, such as a magnify command, a shrink command or a close command.

Figure 8F:
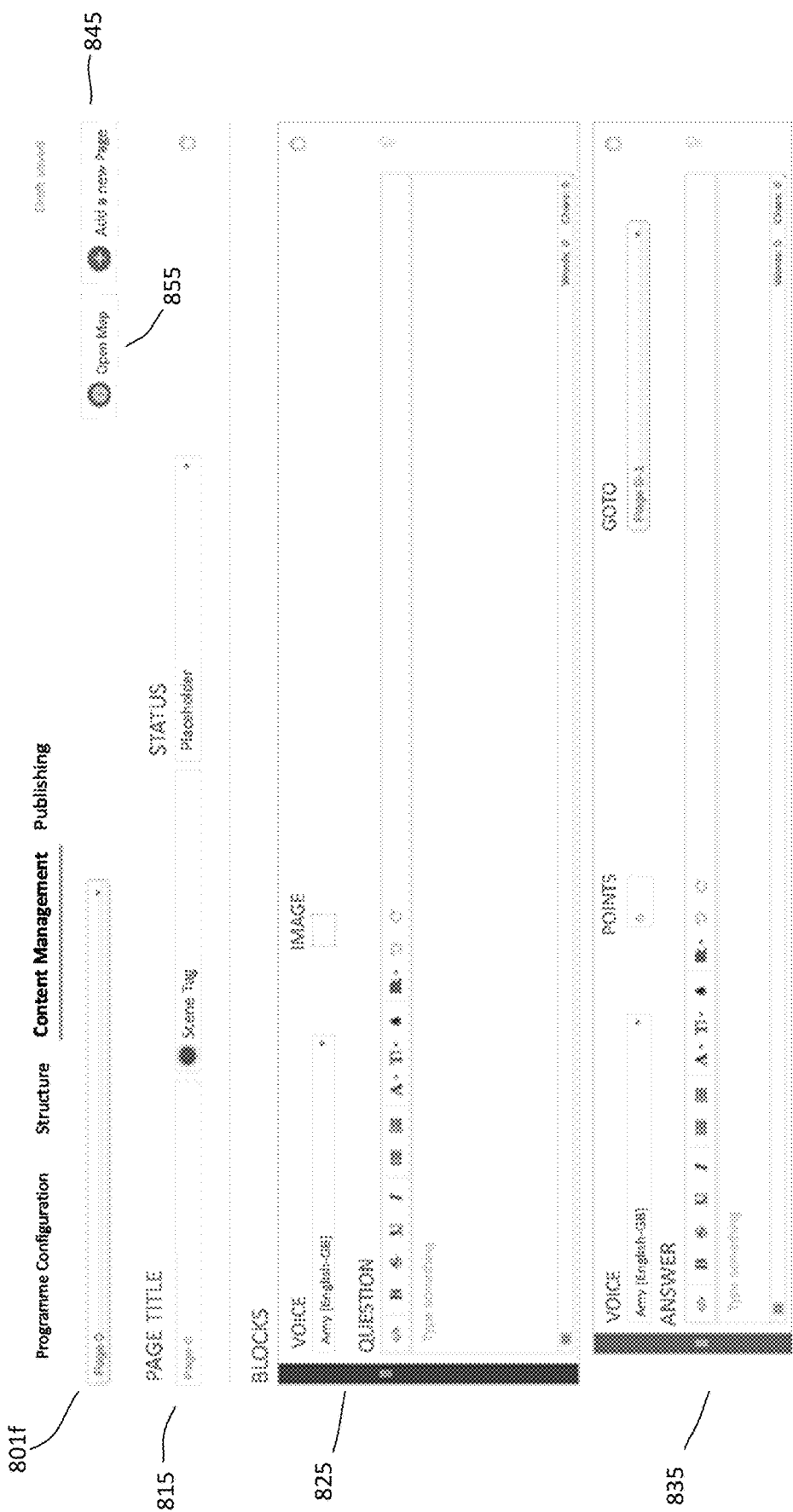

FIG. 8f shows an embodiment of a content management section view 801f of a selected choice scenario within the platform 800. The content management view may be accessed by selecting next button in the action bar of the previous section view page. The content management section view may also be accessed by other techniques. For example, clicking on a scenario in the map view or clicking on the content management option may access the content management section view.

The content management section view incudes basic setup 815 of the scenario. For example, basic setup includes a title input box, a scene tag selector and a status indicator. A builder user may input a title of the scenario into the title input box, select the scene tag and define the status of the scenario.

The content management section view further includes a content block. In the case of a choice scenario, the content block includes content sub-blocks. For example, the content block includes a question content sub-block 825 and answer content sub-blocks 835 corresponding to choices of the scenario. Although only one answer content sub-block is shown, it is understood that there is one answer content sub-block for each choice of the scenario. For example, in the case of a scenario having 3 choices, 3 answer content sub-blocks are provided.

In one embodiment, the question content sub-block includes a setup section. The setup section includes a voice selector. The voice selector, for example, is a dropdown menu with a list of voices and language for the builder user to select. In addition, an image may be uploaded to serve as an environment of the scenario. A body text field is provided to enter a question associated with the scenario. The body text field may include various editing or formatting functions, such as those functions available in a text editor or word processor.

As for the answer content sub-block, a setup section is included. The setup section includes a voice selector. The voice selector, for example, is a dropdown menu with a list of voices and language for the builder user to select. In addition, the setup section includes points input and goto input boxes. The points input indicates points associated with a selection of the answer and the goto input indicates a next scenario to go to based on a selection of the answer. Also, a body text field is provided to enter a answer for the scenario. The body text field may include various editing or formatting functions, such as those functions available in a text editor or word processor. As discussed, one answer block is provided for each choice of the scenario.

The content management view section further includes an open map command 855 and an add new page command 845. The open map command enables a user to switch to the map view while the adding new page command enables a user to add a new scenario.

Figure 8G:
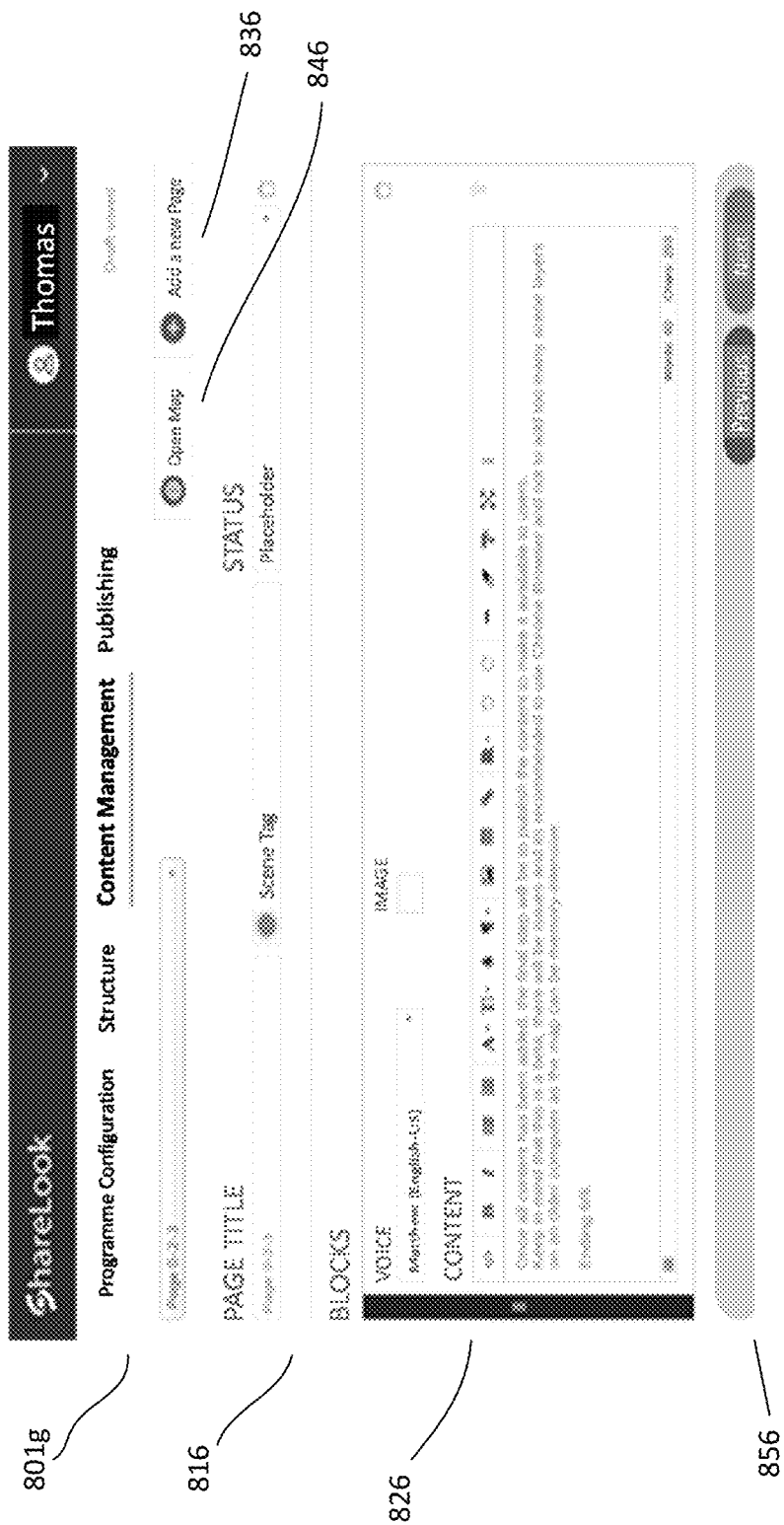

FIG. 8g shows an embodiment of a content management section view 801g for a selected end state scenario within the platform 800. The content management section view includes basic setup 816 of the end state scenario. For example, a basic setup includes a title input box, a scene tag selector and a status indicator. The content management section view further includes a content block 826. In the case of an end state scenario, the content block includes an end state content block. In one embodiment, the content block includes a setup section. The setup section includes a voice selector. In addition, an image may be uploaded to serve as an environment of the scenario. A body text field is provided to enter a final message related to the end state scenario. The body text field may include various editing or formatting functions, such as those functions available in a text editor or word processor.

The content management view section further includes an open map command 846 and an add new page command 836. The open map command enables a user to switch to the map view while adding new page command enables a user to add a new scenario. Also, an action bar 856 may be provided with action buttons which include a previous button and a publish button. Clicking on the publish button, for example, publishes the maze program for access by other users.

Figure 8H:
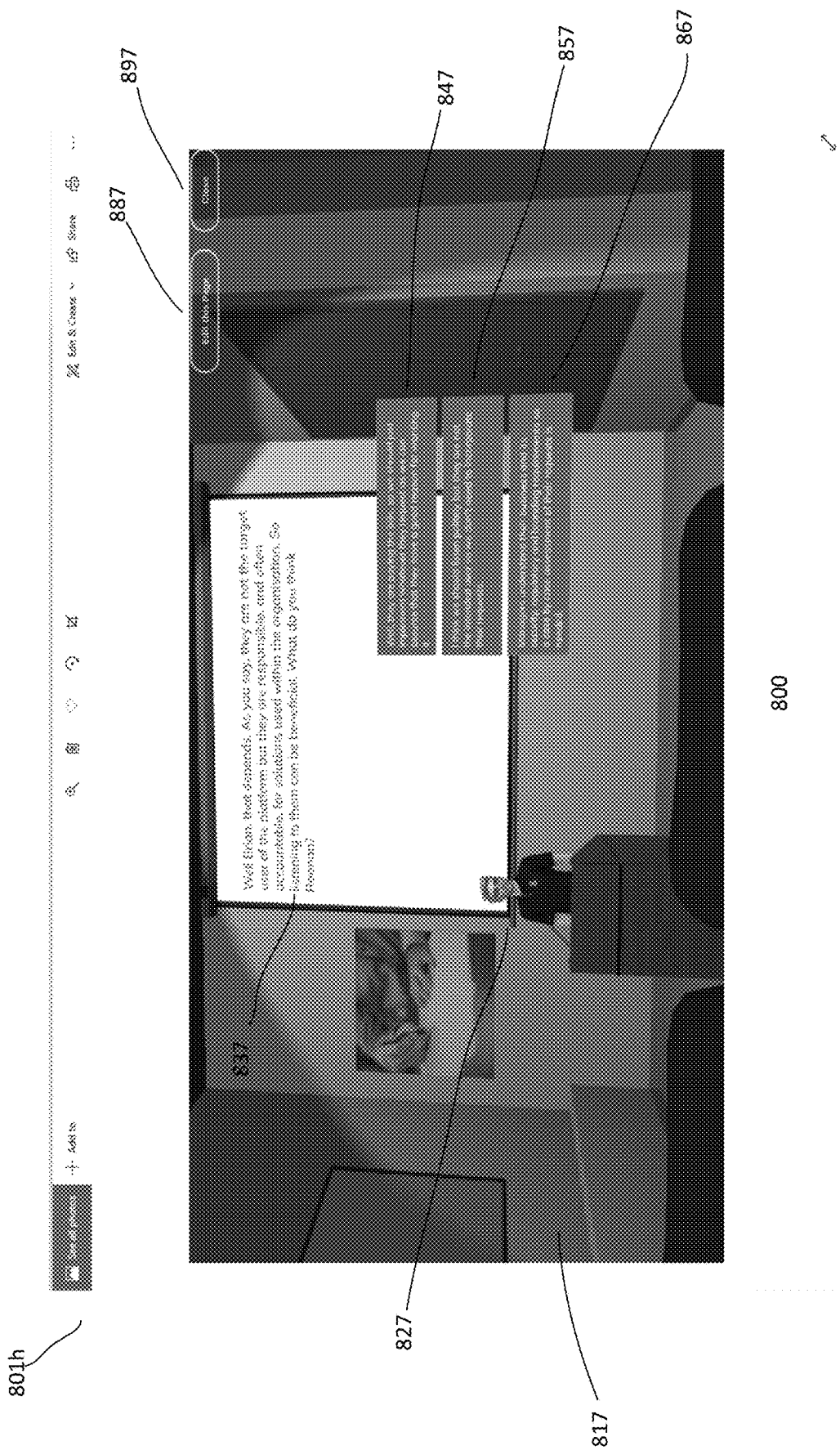

FIG. 8h shows an exemplary 3D view page of a choice scenario 801h as defined by the user builder within the platform 800. As shown, the 3D view is in view mode and not in run mode. For example, the builder user may select a view option to view the scenario while in program mode. As shown, the 3D view is set in an environment 817 with an avatar 827 selected by the builder user. A question 837 is presented with available choices 847, 857 and 867. The view page includes commands, such as see all photos, add photos, magnify, delete, edit, share and print. Other commands may also be useful. In addition, an edit this page command 887 and a close page command 897 are provided. Selecting the edit this page command returns the user to the content management page of the scenario.

Figure 8I:
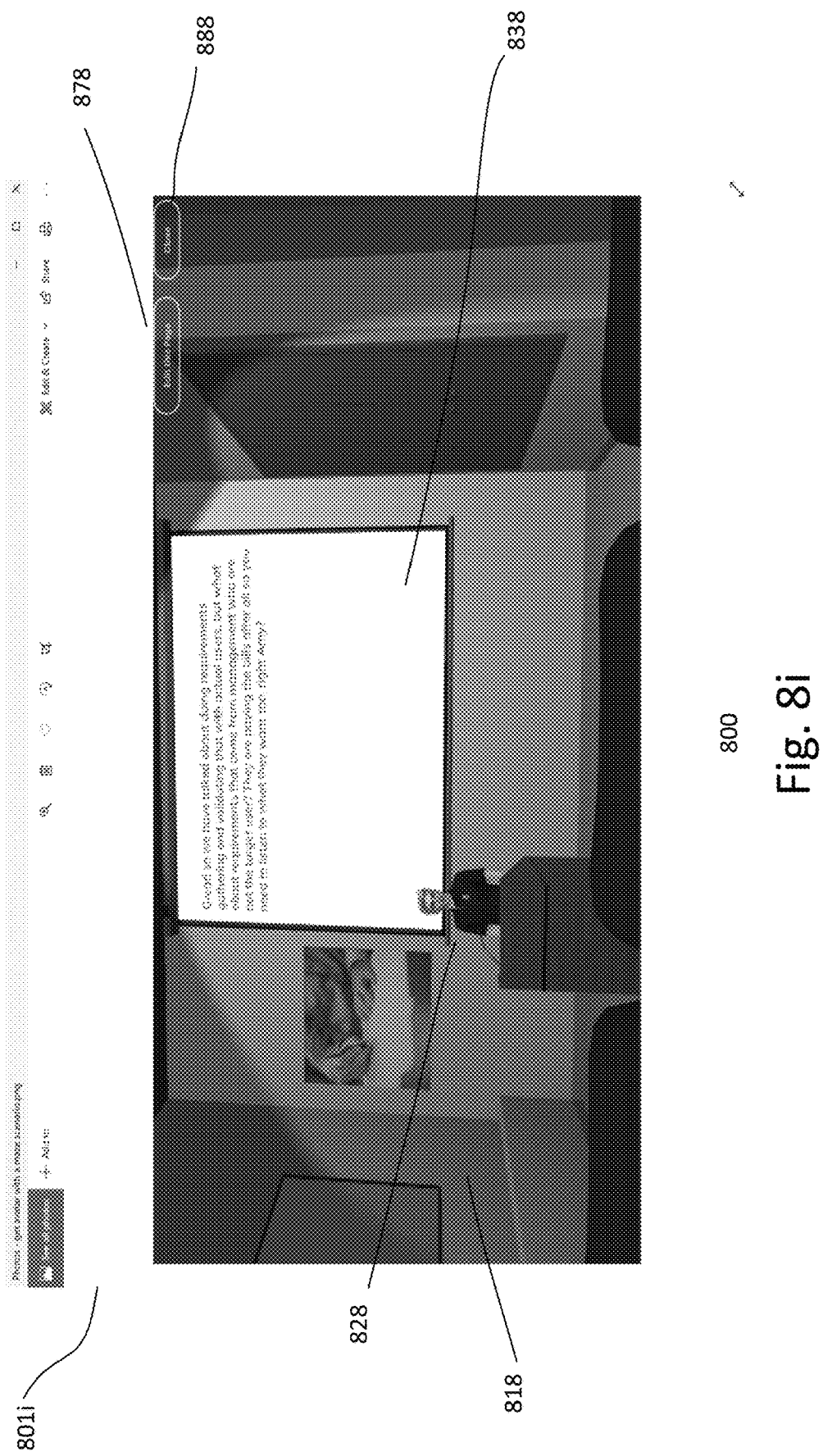

FIG. 8i shows an exemplary 3D view page of an end state scenario 801i as defined by the user builder within the platform 800. As shown, the 3D view is in view mode and not in run mode. The 3D view is set in an environment 818 with an avatar 828 selected by the builder user. A final statement 838 is presented after a choice has been made. The view page includes commands similar to those in the 3D view page of the choice scenario, including an edit this page command 878 and a close page command 888.

Figure 8J:
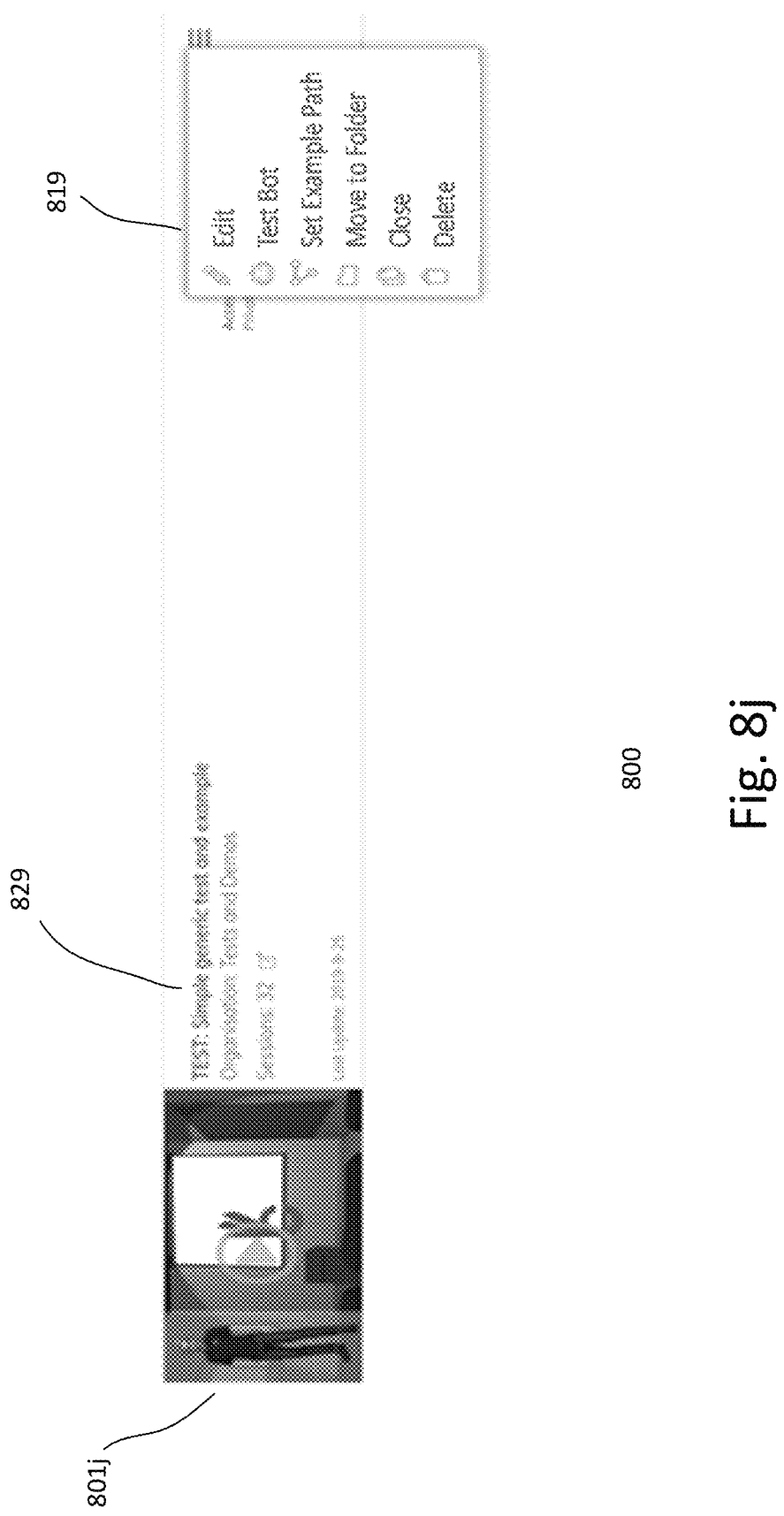

FIG. 8j shows an exemplary overview page 801j with the overview menu 819 displayed within the platform 800. The overview page, for example, may include an overview menu icon. Hovering or clicking on the menu icon displays a menu of various functions which can be performed on a selected 3D program 829. As shown, the overview menu 819 may include editing, test bot, set example path, move to folder, clone and delete functions for the user to select. Providing other functions for the menu may also be useful.

Figure 9A:
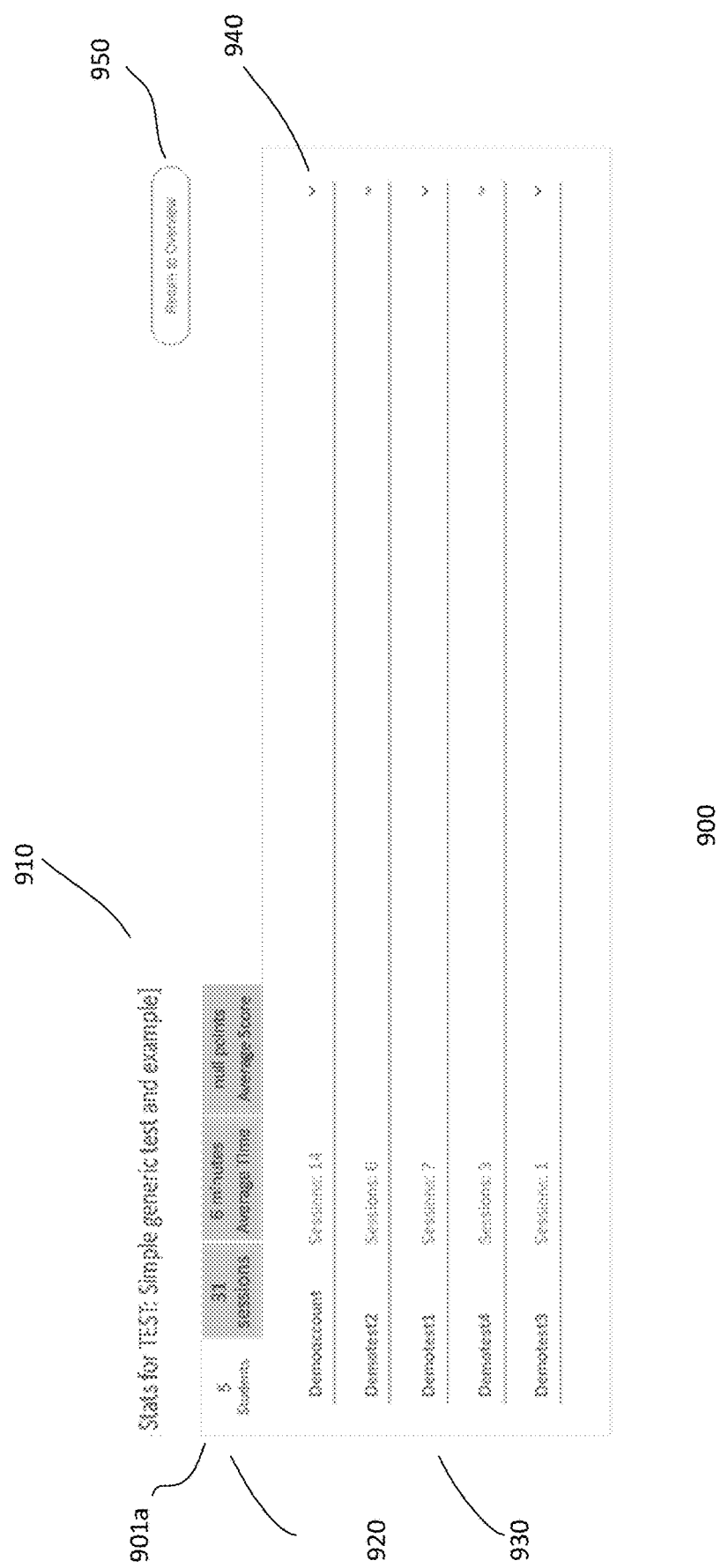
FIGS. 9a-9g show various exemplary sessions analytics of a maze program.

FIGS. 9a-9g show screenshots of sections of an analytics page of the platform 900. Referring to FIG. 9a, an analytics page 901a is shown. The analytics page is for a selected 3D program 910. The analytics page includes various types of analytics information on the selected 3D program. As shown, the analytics page includes an option bar 920 with tabs for selecting different sections to view. In one embodiment, the options bar includes a students tab, a sessions tab, an average time tab and an average score tab. Selecting different tabs causes the corresponding section views to be displayed.

As shown, the students tab is selected, displaying the corresponding students section view. The students tab may include a number of students that have been trained on the selected 3D program. As shown, the tab indicates that 5 students have been trained on the 3D program. The students section view 930 displays all the students who have been trained on the selected 3D program. In one embodiment, the students are listed in a row format along with information related to a number of times that the student has taken the 3D training program. For example, student user Demoaccount has taken the selected 3D program 14 times, user Demotest 2 has taken the selected 3D program 6 times, user Demotest 1 has taken the selected 3D program 7 times, user Demotest 4 has taken the selected 3D program 3 times and user Demotest 3 has taken the selected 3D program 1 time.

Each row corresponding to a student may be considered a sessions folder. For example, each sessions folder includes analytic information of the sessions taken by the student. To view a sessions folder, a user, such as an administrator user clicks on the student sessions selector 940 corresponding to a student user. The sessions taken by the selected student user is then displayed. The sessions, for example, are displayed in a row format. Information displayed may include dates on which the sessions were taken and statuses, such as "completed", "in progress" or "error". Each row may include a session selector. When selected, details of the selected session may be displayed. For example, a session details page is displayed. Details of a session may include user information, date and time that the session was started, status of the session, details related to the session, such as total score of the session, time required to complete the session, choices made at each scenario of the session, score at each scenario (or scenario page) of the session and time taken at each scenario of the session. The analytics page further includes a return to overview option 950. Clicking on the return to overview option displays back the overview page.

Figure 9B:
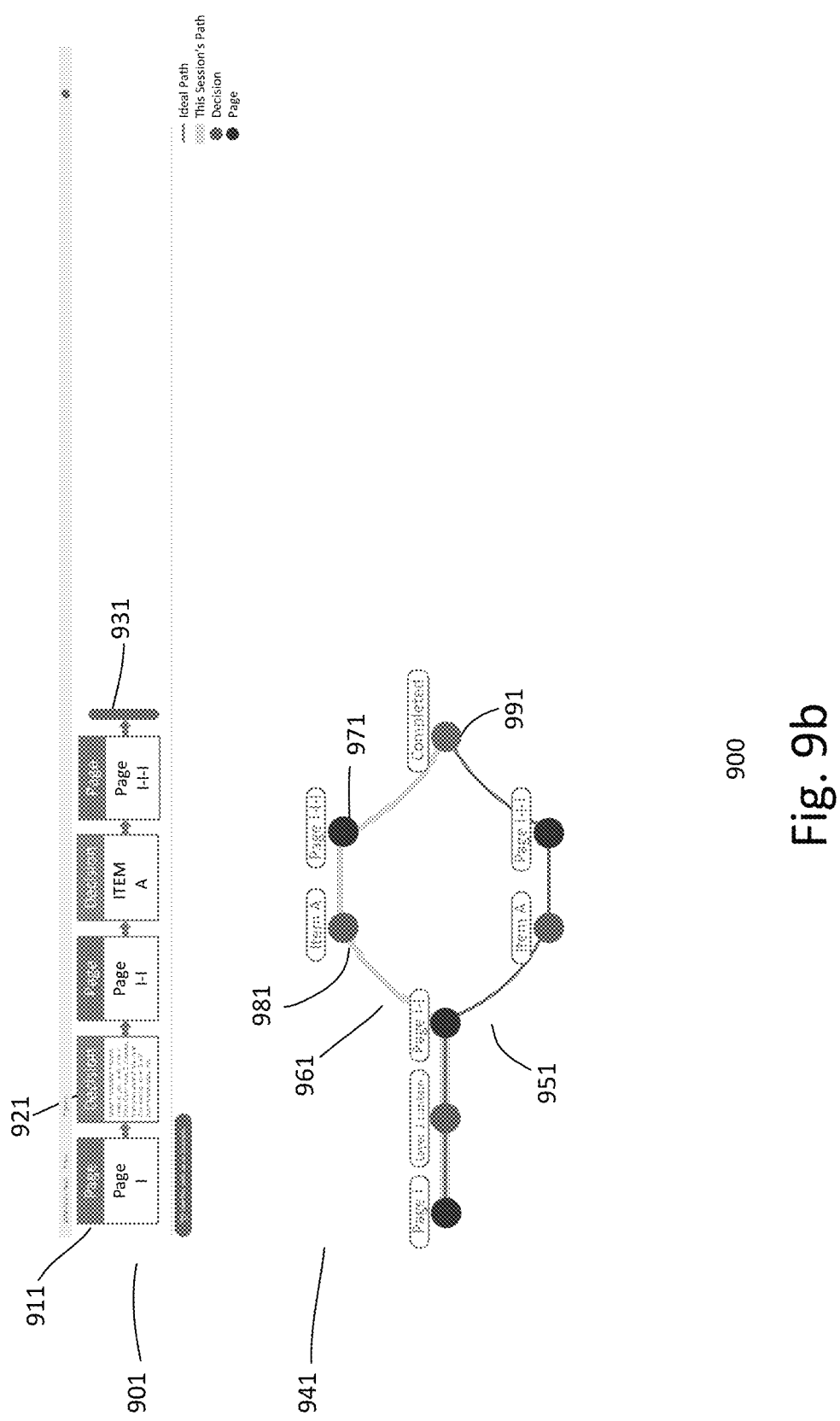

FIG. 9b shows an exemplary session detail page 900. As shown, the session detail page illustrates a session which has been completed. For example, the status of the session is designated as being completed. As shown, details of a sequence of scenarios encountered based on choices made are displayed in a session pane 901. For example, the session pane includes details of a scenario in a scenario description panel 911 and the decision selected in a decision panel 921. Based on a decision made, a next scenario is encountered, until the session is completed, as indicated by a completion bar 931.

The session path taken may be displayed in a session path graph 941 in a graph pane. In one embodiment, a session path taken 961 is overlaid over an ideal path 951. A path includes scenario nodes 971 and decision nodes 981. A scenario node corresponds to a scenario of the session and a decision node corresponds to a decision made by the student which leads to a next scenario, until the training session is completed at a final session node 991. Providing both the path taken and the ideal path enables an evaluator to quickly access a session result graphically. For example, an evaluator can quickly identify where the student deviated from the ideal path.

The various components may be color coded. For example, different colors may be assigned to easily identify the components. For example, gray may be used to indicate the path taken, green may be used to indicate the ideal path, dark blue may be used for scenario nodes, light blue may be used for decision nodes, green may be used to indicate the final node, dark grey may be used for the scenario panels and light blue may be used for the decision panels.

Figure 9C:
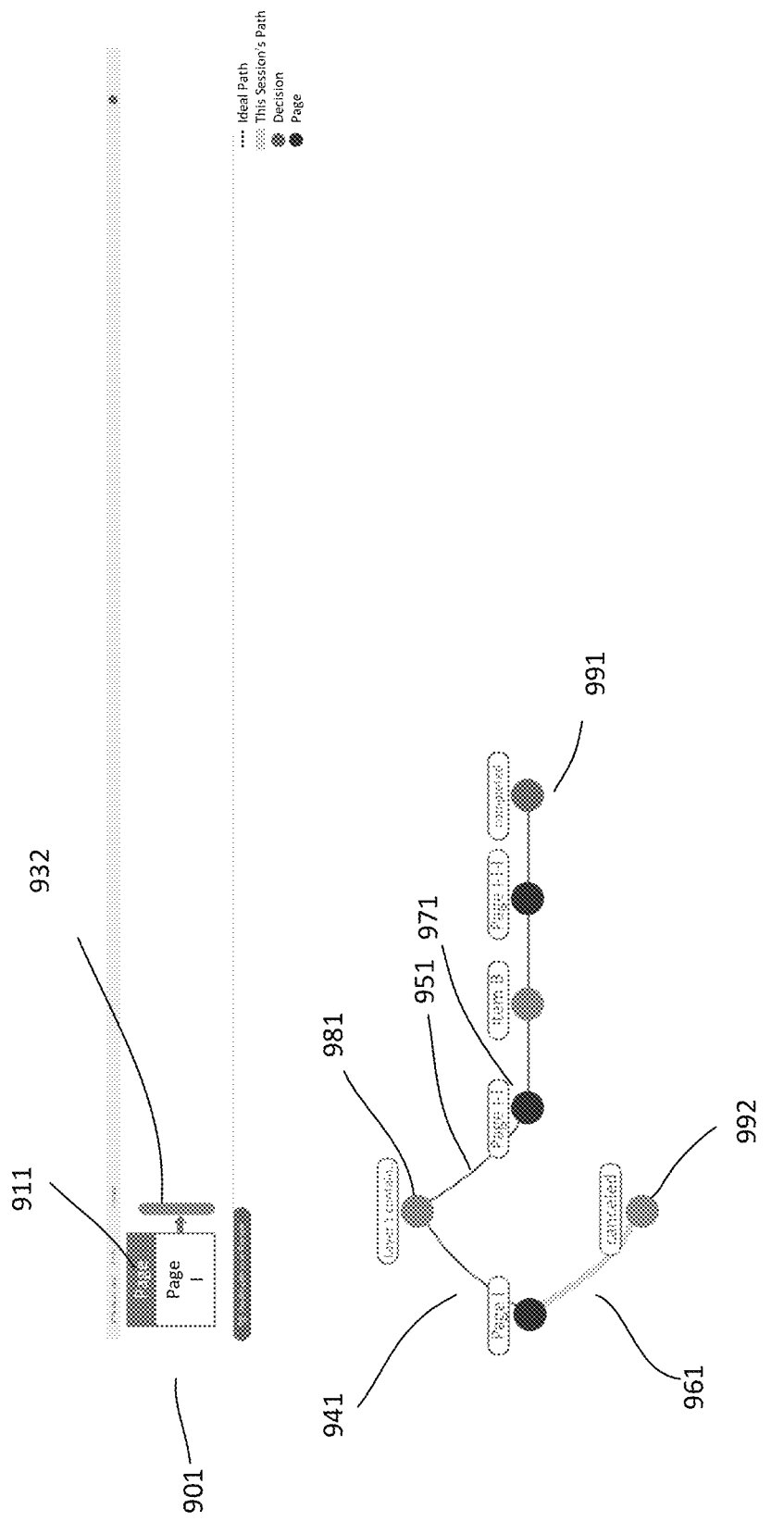

FIG. 9c shows another exemplary session detail page 900. As shown, the session detail page 901 illustrates a session which has been canceled by the student. For example, a status of the session is designated as being canceled. This may occur when the student started the session but canceled it before it is completed. As shown, the session pane includes one description panel 911 and a canceled bar 932. This indicates that the session was canceled by the student after encountering the first scenario without making any decisions. Since the session has been canceled after the first scenario, there is essentially no session path taken, only an ideal path 951 is shown in the session path graph 941. The ideal path includes scenario nodes 971, decision nodes 981 and a final session node 991. The graph also includes a canceled node 992 after the first scenario node. The colors assigned to the different components may be similar to that described in FIG. 9b. In addition, orange may be assigned to the canceled node and canceled bar.

In some cases, the session may be canceled after encountering more than one scenario and making one or more decisions. In such cases, the session pane will include scenario panels encountered and decision panels for decisions made and a canceled bar at the point where the session was canceled. Similarly, the graph will include a partial path 961 taken with a canceled node at the point where the session was canceled.

A session detail page for an error status may be similar to that described for the canceled session detail page. For example, instead of a canceled node, an error node is provided. The error node indicates a point of the session where the error occurred. The color assigned to an error node and bar may be red.

Figure 9D:
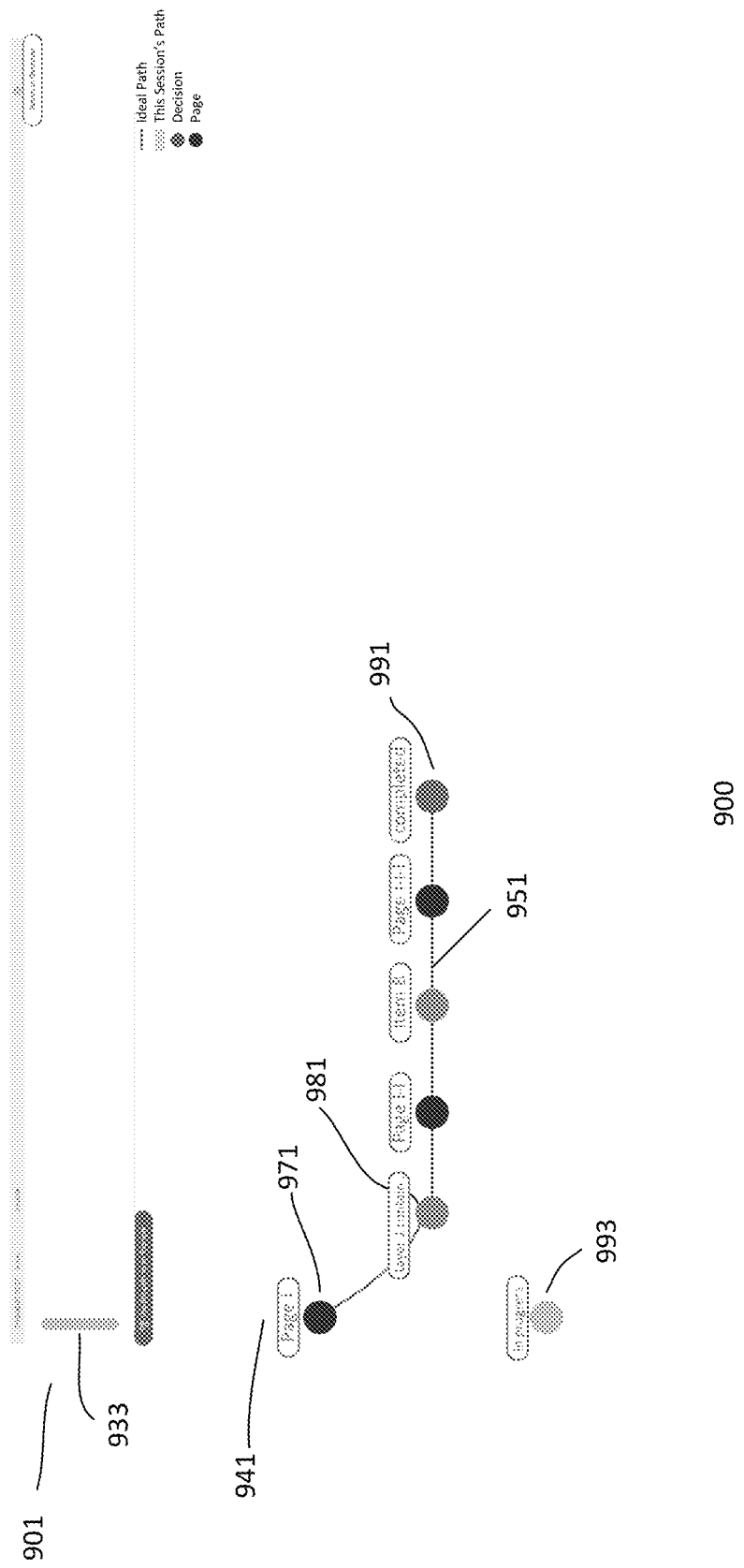

FIG. 9d shows another exemplary session detail page 900. As shown, the session detail page 901 illustrates a session which is in progress. As shown, the session pane includes only an in progress bar 933. This indicates that the session has been started, although no scenarios have been encountered or choices made. Since the session has just been started, there is no session path taken, only an ideal path 951 is shown in the session path graph 941. The ideal path includes scenario nodes 971, decision nodes 981 and a final session node 991. The graph also includes a not started node 993 below the first scenario node. The colors assigned to the different components may be similar to that described in FIG. 9b-9c. In addition, gold may be assigned to the in progress node or in progress bar.

In the case that one or more scenarios have been encountered and one or more choices made, the graph will include scenario and choice nodes to the point where the session has been stopped by the student. Similarly, the session pane includes scenario and decision panels up to the point where the session was stopped.

As discussed, the analytics page also includes a comparative function. The comparative function compares multiple sessions, whether completed or not, against each other along with the ideal session. Using a filtering function, the trainer can select the sessions to be compared. For example, student users may be grouped by categories. The trainer may select the sessions of the desired group of users to be compared. The filtering function may be used to select the latest sessions of the users or all sessions from a user. Other filtering configurations may also be useful.

Figure 9E:
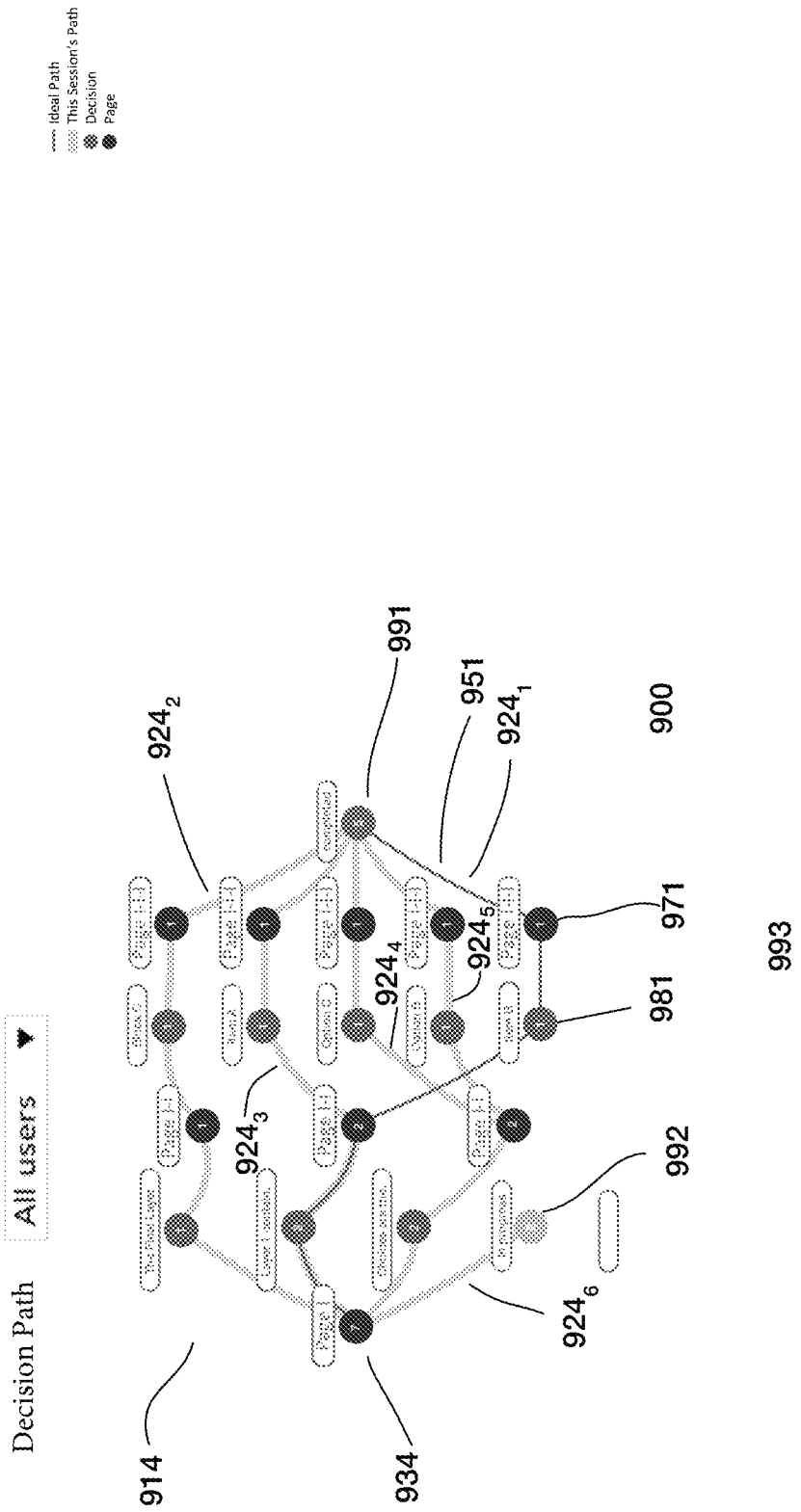

FIG. 9e shows a session detail page 900 comparing multiple sessions. A graph 914 depicts paths taken of the various sessions. Among the paths taken, the paths may include an ideal path 951. As shown, the graph includes paths $924_{1-6}$ and the ideal path 951. As shown, the graph includes six paths $924_{1-6}$ taken by students. The first path $924_1$ corresponds to the ideal path. A path includes scenario nodes 971 and decision nodes 981. A first scenario of a session is represented by a start scenario node 934. If the session is a completed session, the path will include a final session node 991. If a session is in progress (not completed) by the student, such as path $924_6$, an in progress node 992 is provided at a point where the session is. If a session was canceled, a canceled node may be provided for the session path at a point where the session was canceled. In the case that an error has occurred during the session, an error node may be provided for the session path at an error point.

The various components of the graph may be color coded, as previously described to easily identify what they represent. In addition, the nodes may include a number, which indicates a number of times that the nodes were reached from the sessions. The graph provides an evaluator a quick and easy way to assess results of the sessions. For example, an evaluator can easily identify how many sessions followed the ideal path and how many sessions deviated from it as well as those which were canceled or resulted in an error.

Figure 9F:
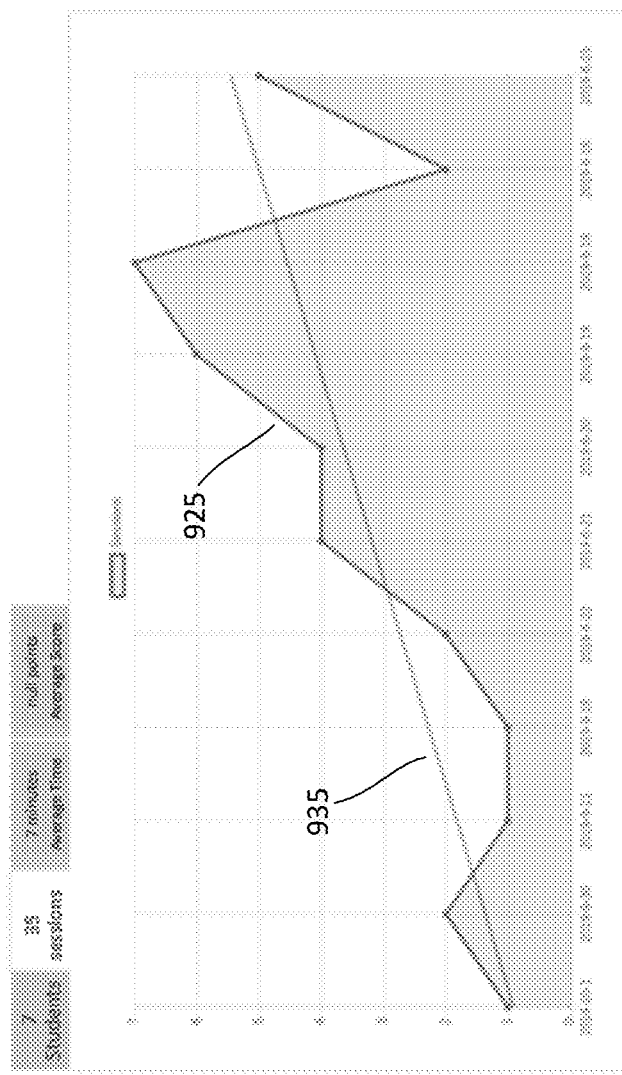

Selecting the sessions tab causes the program analytics page to display the sessions taken by all users. FIG. 9f shows a graph 902 of session information of sessions taken by all users. As shown, the graph charts a number of sessions and dates taken. For example, line 925 charts the number of sessions taken for corresponding dates. Line 935 charts an average number of sessions taken over time.

Figure 9G:
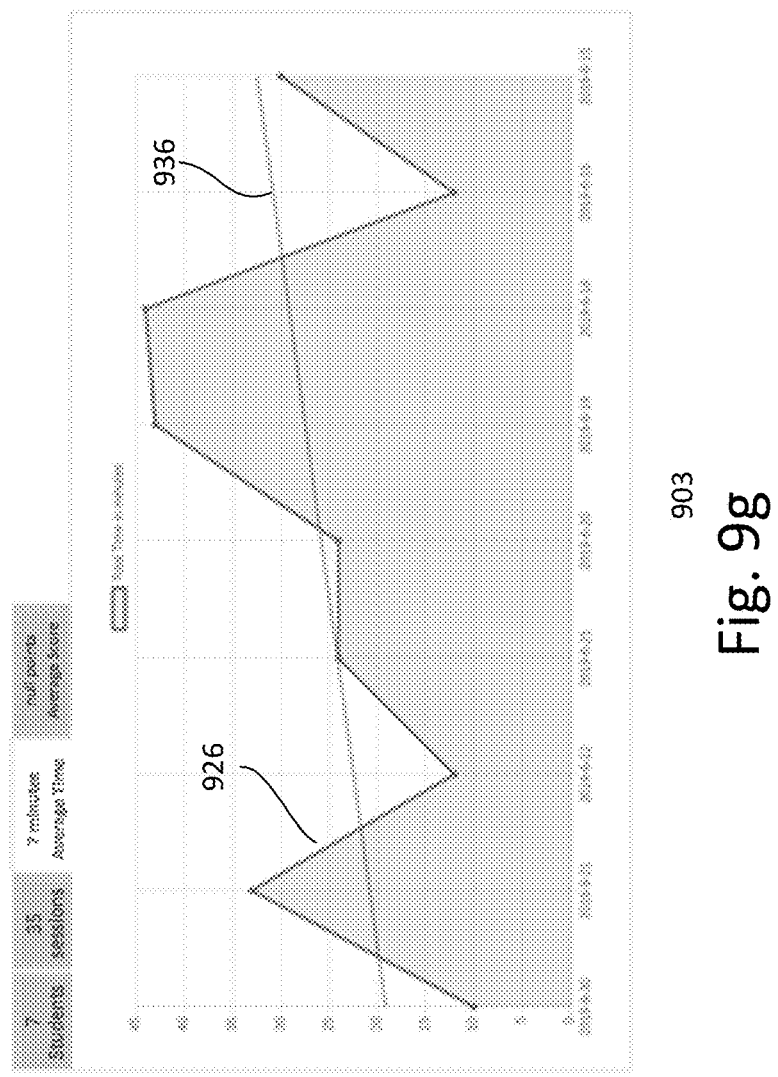

Selecting the average time tab causes the program analytics page to display the average time of the sessions taken by all users. FIG. 9g shows a graph 903. Line 926 charts a time required to finish a session and a date that the session was taken. Line 936 charts an average time required to finish the sessions over time.

Figure 9H:
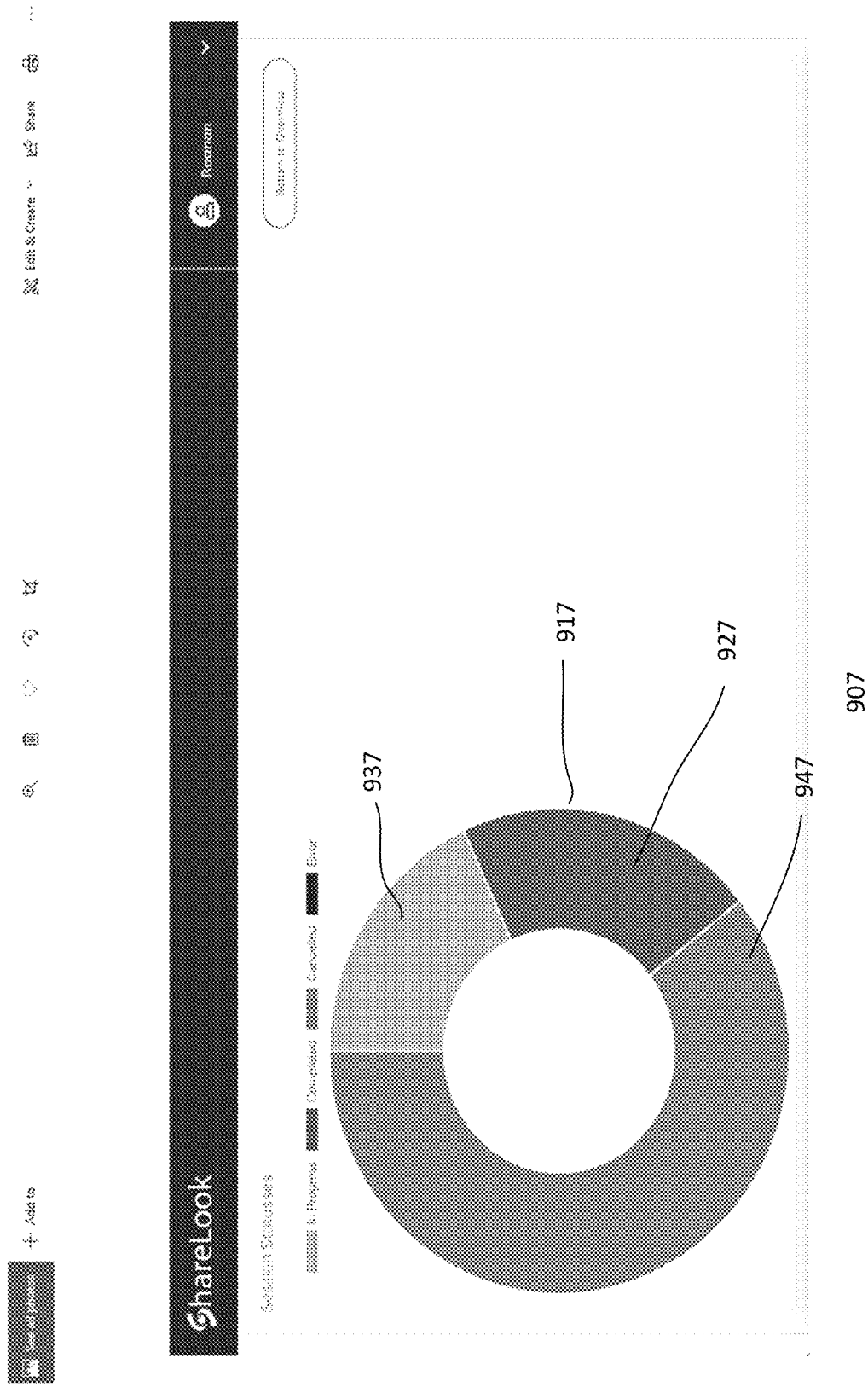
FIGS. 9h-9i shows exemplary page views of a maze program.

FIG. 9h shows an exemplary session status page 907 for a user. The page graphically shows statuses of sessions of a user. The session status, for example, is represented by a ring-shaped graph 917 which includes segments corresponding to the statuses of sessions. For example, segment 927 corresponds to sessions which have been completed, segment 937 corresponds to sessions which are in progress and segment 947 corresponds to sessions which have been canceled. A size of the segments corresponds to a percentage of sessions having the designated status.

Figure 9I:
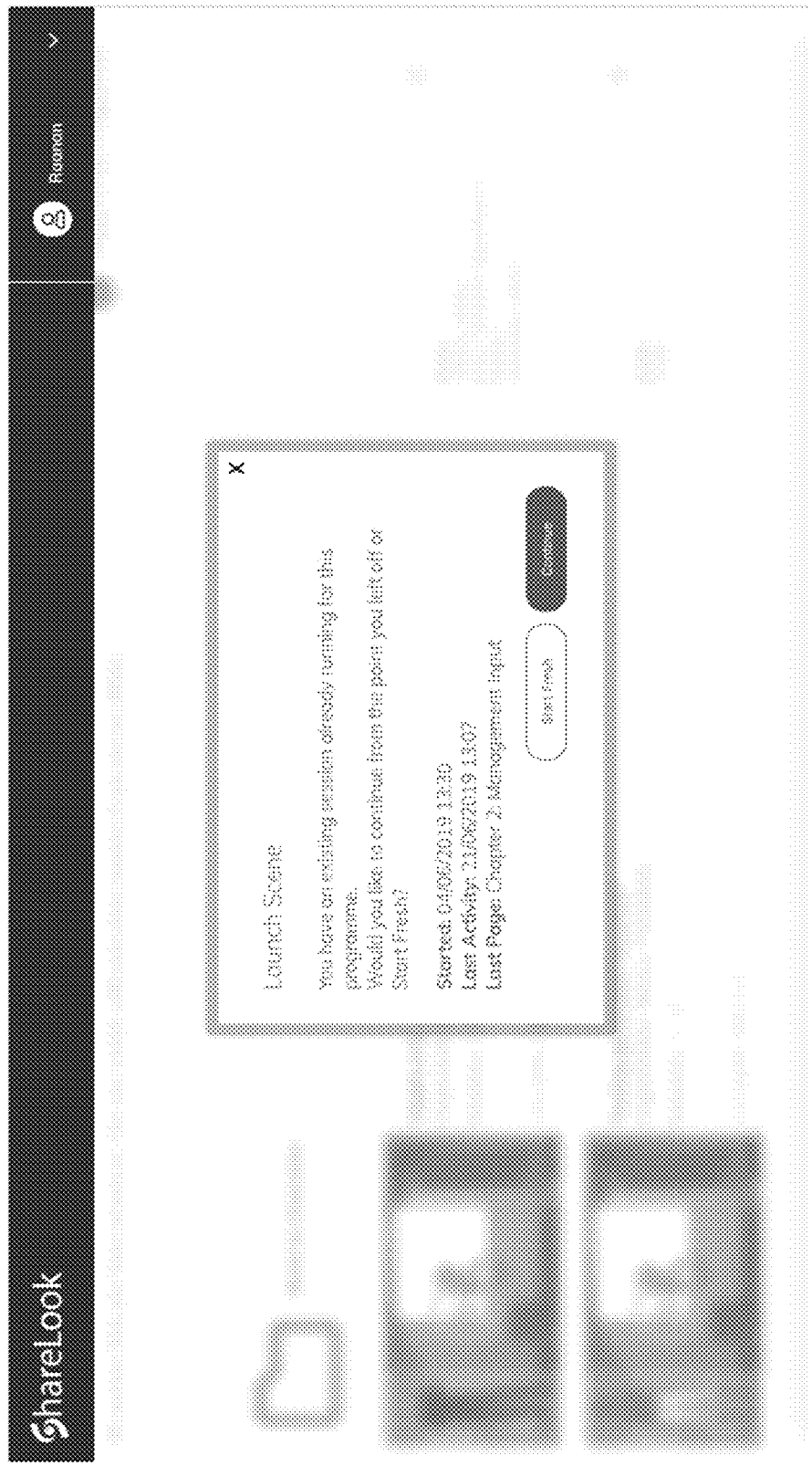

FIG. 9i shows an exemplary session start page 908. For example, after a user has selected a program for training, the system launches the session start page of the program on the user device. As shown, the user has selected a program which has been previously started. For example, a status of the session is "in progress". In such case, the system informs the user that the program is already running and whether the user would like to continue from the previous point or start from the beginning. Based on the user selection, the appropriate scenario is displayed to commence or continue the session.

Figure 10A:
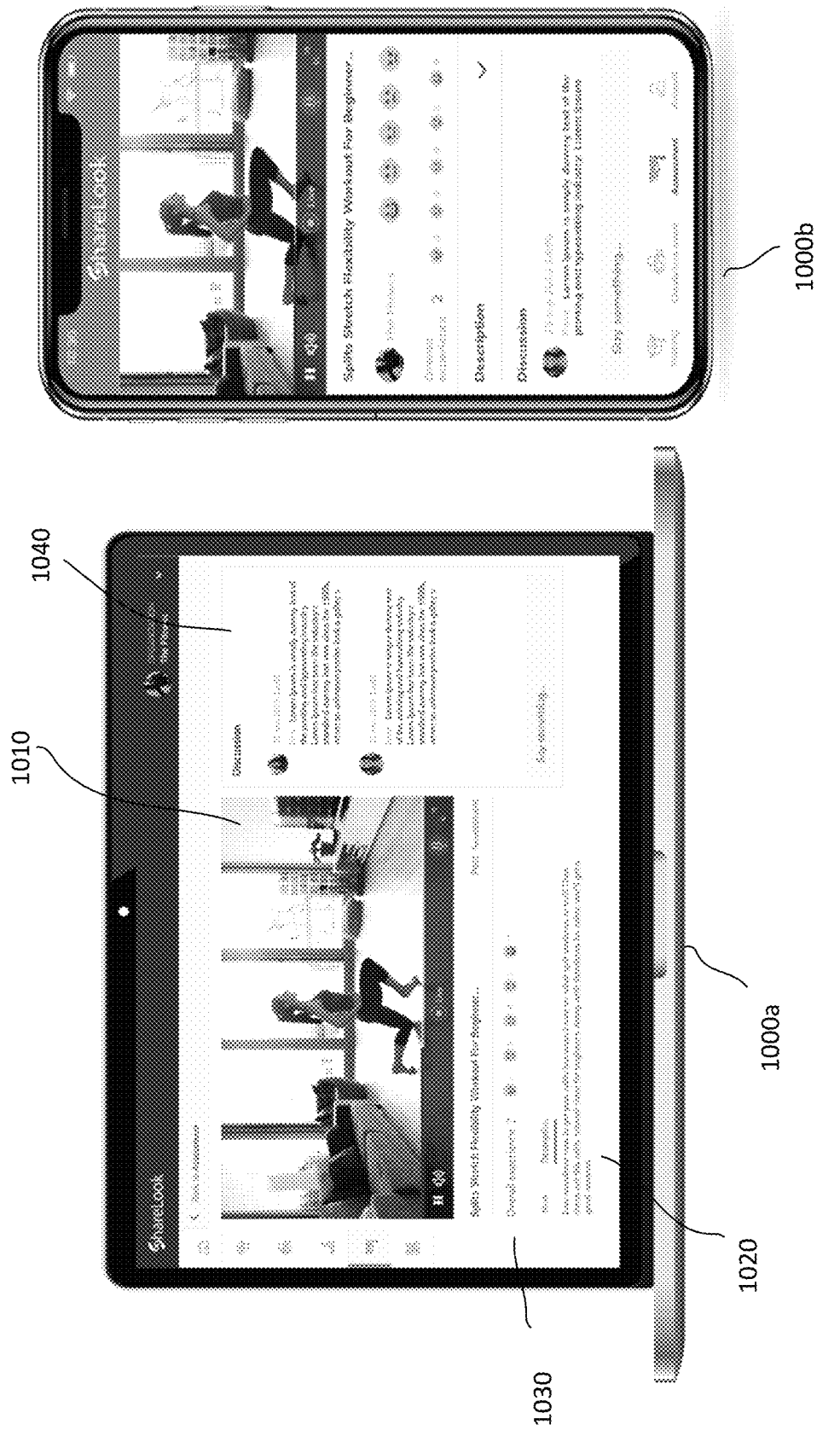
FIGS. 10a-10b show various exemplary views of a live assessment or a live broadcast.
Figure 10B:

FIGS. 10a-10b show various interfaces of a live assessment or a live broadcast on user devices of viewers. Referring to FIG. 10a, a live assessment interface 1000a is displayed on a user device, such as a laptop or a device with a larger display. As shown, the interface includes a broadcast pane 1010 containing the topic of the broadcast. For example, the trainer is performing a flexibility workout. The interface includes a description pane 1020 which provides a description of the live assessment. An overall experience pane 1030 is provided for views to rate an experience of the live broadcast. In addition, a discussion pane 1040 is provided. Viewers can provide their comments on content of the broadcast. A viewer may also interactively respond to comments of other viewers.

Alternatively, the live assessment interface 1000b may be displayed on a smaller display, such as on a smart phone. The contents of the smaller form factor display is the same as on a larger form factor display, except that it may be condensed or contracted to fit into the smaller display.

In FIG. 10b, another live assessment interface 1001a is shown. The interface 1001a, for example, is displayed on a user device, such as a laptop or a device with a larger display. The live assessment interface 1000b is similar to live assessment interface 1000a, except that it is tailored for smaller displays. As shown, the interface includes a broadcast pane 1010 containing a topic of the broadcast. For example, the trainer is performing a flexibility workout. An overall experience pane 1030 is provided for views to rate an experience of the live broadcast. In addition, a discussion pane 1040 is provided. Viewers can provide their comments on content of the broadcast. A viewer may also interactively respond to comments of other viewers.

Unlike the interface of FIG. 10a, the description pane is switched to display a live scoring pane 1050. The live scoring pane shows scores or experiences of views live over time. For example, as the program continues, viewers continue to rate or score the broadcast.

The implementations of the computer or computer devices (e.g., client devices and server computers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. As used herein, the term "processor" should be understood as encompassing any of the foregoing hardware, either singly or in combination. Further, portions of each of the client devices and each of the server computers described herein do not necessarily have to be implemented in the same manner.

At least one implementation of the present disclosure relates to an apparatus for performing the operations/functionalities described herein. This apparatus may comprise special purpose computers/processors, or a general-purpose computer, selectively activated or reconfigured by a computer program stored on a non-transitory computer-readable storage medium that can be accessed by the computer.

All or a portion of the implementations of the disclosure can take the form of a computer program product accessible from, for example, a non-transitory computer usable or computer-readable medium. The computer program, when executed, can carry out any of the respective operations, methods, functionalities and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, ROM, RAM, EPROM (erasable programmable read-only memory), EEPROM (electrically erasable programmable read-only memory), magnetic or optical cards, ASICs, or any type of media suitable for tangibly containing, storing, communicating, or transporting electronic instructions.

Also, the particular division of functionality between the various system components described herein is merely exemplary, and not mandatory; functions performed by a single system component may instead be performed by multiple components, and functions performed by multiple components may instead performed by a single component. Operations that are described as being performed by a single processor, computer, or device can be distributed across a number of different processors, computers or devices. Similarly, operations that are described as being performed by different processors, computers, or devices can, in some cases, be performed by a single processor, computer or device.

Unless specifically stated otherwise, it is appreciated that throughout the description, discussions utilizing terms such as, for example, "processing", "computing", "calculating", "displaying", "determining", "establishing", "analyzing", "checking", or the like, refer to operation(s) and/or process(es) of a computer, a computing platform, a computing system, or other electronic computing device, that manipulate and/or transform data represented as physical (e.g., electronic) quantities within the computer's memories and/or registers into other data similarly represented as physical quantities within the computer's memories and/or registers or other information storage medium that may store instructions to perform operations and/or processes.

The term "trainer" as used herein includes, for example, a teacher, an instructor, a designated learner acting in a role of a trainer, an education providing person, a member of an education system, a person that conveys information or knowledge to a group of learners in a computerized environment (e.g., digital learning platform), a person that performs teaching activities remotely, or the like.

The term "learner" as used herein includes, for example, a minor, a minor student, an adult, an adult student, a person acting in a learning role, a learning person, a person that receives information or knowledge from a trainer in a computerized environment (e.g., digital learning platform), a person that performs learning activities remotely, or the like.

The term "a group of learners" as used herein includes, for example, a grouping of learners who may be associated with a teaching activity or a learning activity; a grouping of learners who may spatially separated over one or more geographical locations and are associated with a course, performing a learning activity remotely, or attending a live event remotely; a grouping of learners which may include learners learning from their homes, learners learning from remote locations (e.g., a library, a remote computing station, a portable computer); or the like.

The term "performer" as used herein includes, for example, a trainer, a learner, a learner acting in the role of a trainer, a person performing an act of interest in a live event, a person who is the center of attention in a live event, a person in a live event who is being viewed by a plurality of other persons from remote locations (e.g., a library, a remote computing station, a portable computer), a person communicating information or knowledge to a group of learners in a computerized environment (e.g., digital learning platform), a person that is associated with a site and is engaged in any interpersonal interaction at the site with another person not associated with the site, a person that is performing in what may be viewed by learners as a performance of interest.

The term "performance" as used herein includes, for example, a teaching performance, a performance by a trainer, a performance during a teaching/learning activity conducted by a trainer, a performance during a live event involving a trainer during which that trainer is in communication with a group of learners remotely viewing a stream of the live event, a live service performance, a performance by one or more representatives of a commercial entity, a performance at a remote walk-in service premise owned by the commercial entity, a performance during an interaction between the one or more representatives of the business entity in a non-customer facing work setting, a performance during a live event involving at least one video feed (e.g., image and audio feed) of the one or more representative of the business entity interacting with a third party, and a performance during a meeting involving an individual of interest with one or more third parties during which that individual is practicing a specific behavior.

The term "live accessor" as used herein includes, for example, a person conducting a live assessment event, a customer not adept at evaluating the quality of live service performances, a reviewer adept at evaluating the quality of live service performances, a designated trainer acting in a role of a live accessor, and a person employed in a position other than that of the performer's direct supervisor, manager or team leader.

The term "viewer" as used herein includes, for example, any individual remotely viewing a live event provided on the learning platform.

The term "or" as used herein is intended to mean an inclusive "or" rather than an exclusive "or", unless specified otherwise, or clear from context. In addition, the articles "a" and "an" as used herein should generally be construed to mean "one or more" unless specified otherwise or clear from context to be directed to a singular form.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

What is claimed is:

1. A method for adaptive learning on an adaptive learning platform comprising:
   providing the adaptive learning platform comprising
      a backend system, the backend system includes a creation module, the creation module is configured to create a three-dimensional (3D) maze lesson including
         generating a maze framework of the 3D maze lesson based on a level input and a choice input, wherein the maze framework includes x levels of nodes based on the level input and y number of choices at each node based on the choice input, wherein the nodes correspond to scenarios of the 3D maze lesson, a number of nodes at a level is equal to $y^{i-1}$, where i is from 1 to x and is an $i^{th}$ level of the maze framework, where 1 is a highest level and x is a lowest level, a parent node of an $i^{th}$ level has y child nodes in a next level ($i^{th}$+1), wherein a path of the parent node to one of the y child nodes in the next level is based on one of y selected choices, nodes having no child nodes correspond to termination nodes, and updating a status of each node of the maze framework during creation of the 3D maze lesson to provide progress information; and providing a frontend system configured to execute on a user device, the frontend system includes a user interface to access various modules of the backend system, and wherein the user interface is configured to access the creation module for a trainer user to create a new 3D maze lesson.

2. The method of claim 1 further comprises creating the new 3D maze lesson by the trainer user accessing the creation module, wherein creating the new 3D maze lesson includes inputting the level input and the choice input, generating a base structure of the maze framework based on the inputted level and choice input, displaying a maze map for navigation across the nodes of the maze framework, the maze map is configured to display information of the nodes, generating content with questions and choices for other nodes of the maze framework, generating final message content in the termination nodes, storing the new 3D maze lesson when completed as a private storage in the backend system, and publishing the new 3D maze lesson for other users to access by transferring it from the backend system to a cloud storage.

3. The method of claim 2 wherein creating the new 3D maze lesson further comprises modifying the generated base structure by adding and deleting nodes from the maze framework.

4. The method of claim 3 wherein creating the new 3D maze lesson further comprises updating a status of each node before, during and after generating content for the each node, wherein the status of the nodes provides progress information of the new 3D maze lesson.

5. The method of claim 4 wherein creating the new 3D maze lesson further comprises defining an environment of the new 3D maze lesson including selecting an avatar from an avatar library, selecting a voice of the avatar from a voice library, defining a language of the avatar from a language library, and copying a 3D scenario from a scenario library.

6. The method of claim 1 wherein the creation module is configured to validate the new 3D maze lesson when completed using a test bot.

7. The method of claim 1 wherein the backend system further comprises a training module configured to enable selection of a 3D maze lesson (selected 3D maze lesson) for training from a plurality of available 3D maze lessons;

run the selected 3D maze lesson on the user interface of the user device using the frontend system;

generate a training session path of a learner user training in the selected 3D maze lesson, wherein the training session path is based on based on selected choices and indicates a path taken by the learner user from a parent node in the $i^{th}$ level having y child nodes to one of the y child nodes in the next level ($i^{th}$+1) until a termination node is reached; and collect training results of the learner user for storing, the training results include the training session path, a time to complete the selected 3D maze lesson, and an overall score based on the selected choices.

8. The method of claim 1 wherein the backend system further comprises an analytics module, the analytics module is configured to perform analytics on training results of learner users after completion of a 3D maze lesson, wherein performing the analytics for each learner user includes retrieving training results including a training session path of the learner user, wherein the training session path is based on based on selected choices and indicates a path taken by the learner user from a parent node in the $i^{th}$ level having y child nodes to one of the y child nodes in the next level ($i^{th}$+1) until a termination node is reached, comparing the learner user's training session path to an ideal session path to identify gaps, wherein a gap is identified when the learner user's selected choice is different from an ideal choice, and recommending next relevant courses to address the identified gaps.

9. The method of claim 8 wherein recommending the next relevant courses includes recommending a new course configured to address the identified gaps, the new course is formed by combining 3D maze lessons from the plurality of available 3D maze lessons.

10. The method of claim 9 wherein the plurality of available 3D maze lessons includes 3D maze lessons categorized with tags, wherein the tags identify different groups of 3D maze lessons configured to address different types of gaps.

11. The method of claim 8 wherein performing the analytics for each learner user further includes determining a current skill level of the learner user by comparing the learner user's training results to an ideal session results; and recommending next relevant courses to improve the learner user's skill level.

12. An adaptive learning platform for adaptive learning comprising:

a backend system, the backend system includes a creation module, the creation module is configured to create a three-dimensional (3D) maze lesson including generating a maze framework of the 3D maze lesson based on a level input and a choice input, wherein the maze framework includes x levels of nodes based on the level input and y number of choices at each node based on the choice input, wherein the nodes correspond to scenarios of the 3D maze lesson, a number of nodes at a level is equal to $y^{i-1}$, where i is from 1 to x and is an $i^{th}$ level of the maze framework, where 1 is a highest level and x is a lowest level, a parent node of an $i^{th}$ level has y child nodes in a next level ($i^{th}$+1), wherein a path of the parent node to one of the y child nodes in the next level is based on one of y selected choices, and nodes having no child nodes correspond to termination nodes, and updating a status of each node of the maze framework during creation of the 3D maze lesson to provide progress information; and a frontend system configured to execute on a user device, the frontend system includes a user interface to access various modules of the backend system, and wherein the user interface is configured to access the creation module for a trainer user to create a new 3D maze lesson.

13. The platform of claim 12 wherein the creation module is further configured to:

generate a base structure of the maze framework based on the level input and the choice input;

display a maze map for navigation across the nodes of the maze framework, the maze map is configured to display information of the nodes;

generate content with questions and choices for other nodes of the maze framework;

generate final message content in the termination nodes;

store the new 3D maze lesson when completed as a private storage in the backend system; and publish the new 3D maze lesson for other users to access by transferring it from the backend system to a cloud storage.

14. The platform of claim 13 wherein the creation module is further configured to:

modify the generated base structure by adding and deleting nodes from the maze framework; and updating a status of each node before, during and after generating content for the each node, wherein the status of the nodes provides progress information of the new 3D maze lesson.

15. The platform of claim 14 wherein the creation module is further configured to define an environment of the new 3D maze lesson including selecting an avatar from an avatar library, selecting a voice of the avatar from a voice library, defining a language of the avatar from a language library, and copying a 3D scenario from a scenario library.

16. The platform of claim 12 further comprises a training module, the training module is configured to enable selection of a 3D maze lesson (selected 3D maze lesson) for training from a plurality of available 3D maze lessons, run the selected 3D maze lesson on the user interface of the user device using the frontend system, generate a training session path of a learner user training in the selected 3D maze lesson, wherein the training session path is based on based on selected choices and indicates a path taken by the learner user from a parent node in the $i^{th}$ level having y child nodes to one of the y child nodes in the next level ($i^{th}$+1) until a termination node is reached, and collect training results of the learner user for storing, the training results include the training session path, a time to complete the selected 3D maze lesson, and an overall score based on the selected choices.

17. The platform of claim 12 further comprises an analytics module, the analytics module is configured to perform analytics on training results of learner users after completion of a 3D maze lesson, wherein performing the analytics for each learner user includes retrieving training results including a training session path of the learner user, wherein the training session path is based on based on selected choices and indicates a path taken by the learner user from a parent node in the $i^{th}$ level having y child nodes to one of the y child nodes in the next level ($i^{th}$+1) until a termination node is reached, comparing the learner user's training session path to an ideal session path to identify gaps, wherein a gap is identified when the learner user's selected choice is different from an ideal choice, and recommending next relevant courses to address the identified gaps.

18. The platform of claim 17 wherein recommending the next relevant courses includes recommending a new course configured to address the identified gaps, the new course is formed by combining 3D maze lessons from the plurality of available 3D maze lessons.

19. The platform of claim 18 wherein the plurality of available 3D maze lessons includes 3D maze lessons categorized with tags, wherein the tags identify different groups of 3D maze lessons configured to address different types of gaps.

20. The platform of claim 17 wherein performing the analytics for each learner user further includes determining a current skill level of the learner user by comparing the learner user's training results to an ideal session results; and recommending next relevant courses to improve the learner user's skill level.

* * * * *